(12) United States Patent
Seo et al.

(10) Patent No.: US 12,498,139 B2
(45) Date of Patent: Dec. 16, 2025

(54) AIR CONDITIONER AND CONTROL METHOD THEREOF

(71) Applicant: Samsung Electronics Co., Ltd., Suwon-si (KR)

(72) Inventors: Beomseok Seo, Suwon-si (KR); Youngjin Kim, Suwon-si (KR); Hyokyu Lee, Suwon-si (KR); Youngju Joo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 131 days.

(21) Appl. No.: 18/432,607

(22) Filed: Feb. 5, 2024

(65) Prior Publication Data

US 2024/0353144 A1 Oct. 24, 2024

Related U.S. Application Data

(63) Continuation of application No. PCT/KR2024/001050, filed on Jan. 23, 2024.

(30) Foreign Application Priority Data

Apr. 20, 2023 (KR) .................. 10-2023-0052259
Jul. 7, 2023 (KR) .................. 10-2023-0088691

(51) Int. Cl.
*F24F 13/22* (2006.01)
*F24F 1/027* (2019.01)
(Continued)

(52) U.S. Cl.
CPC ............ *F24F 13/224* (2013.01); *F24F 1/027* (2013.01); *F24F 11/70* (2018.01); *F24F 2110/10* (2018.01);
(Continued)

(58) Field of Classification Search
CPC .......... F24F 13/224; F24F 1/027; F24F 11/70; F24F 2110/10; F24F 2110/20;
(Continued)

(56) References Cited

U.S. PATENT DOCUMENTS 6,804,975 B2 10/2004 Park
10,302,314 B2 5/2019 Choi et al.
11,796,193 B2 10/2023 Kim et al.

FOREIGN PATENT DOCUMENTS

JP H06109281 A 4/1994
JP H06213475 A * 8/1994 ............... F24F 1/02
(Continued)

OTHER PUBLICATIONS

JP H06213475 A Translation (Year: 1994).*
(Continued)

*Primary Examiner* — Jerry-Daryl Fletcher
*Assistant Examiner* — Dario Antonio Deleon
(74) *Attorney, Agent, or Firm* — Nixon & Vanderhye, P.C.

(57) ABSTRACT

Disclosed herein is an air conditioner and a control method thereof. The air conditioner includes: a housing including a base, a first heat exchanger disposed inside the housing and configured to exchange heat with outdoor air, a second heat exchanger disposed inside the housing and configured to exchange heat with indoor air, a compressor configured to compress a refrigerant for a heat exchange operation performed by the first heat exchanger and the second heat exchanger, a first fan disposed inside the housing and configured to move air along a flow path passing through the first heat exchanger, a drainage device configured to move condensed water condensed on the second heat exchanger inside the housing and collected in the base to the first heat exchanger, and a controller including at least one processor, (Continued)

comprising processing circuitry, individually and/or collectively, configured to, based on the stop of the operation of the compressor, control the drainage device to move the condensed water collected in the base to the first heat exchanger during a drainage time determined based on an operation time of the compressor, and to control the first fan to move air during the drainage time.

20 Claims, 28 Drawing Sheets

(51) Int. Cl.
*F24F 11/70* (2018.01)
*F24F 110/10* (2018.01)
*F24F 110/20* (2018.01)
*F24F 140/30* (2018.01)

(52) U.S. Cl.
CPC ....... *F24F 2110/20* (2018.01); *F24F 2140/30* (2018.01)

(58) Field of Classification Search
CPC . F24F 2140/30; F24F 13/222; F25B 2600/01; F25B 2600/0251
See application file for complete search history.

(56) References Cited

FOREIGN PATENT DOCUMENTS

| | | |
|---|---|---|
| JP | H08136001 A | 5/1996 |
| JP | 2005-055107 | 3/2005 |
| JP | 3157941 B2 | 2/2010 |
| JP | 4519698 | 8/2010 |
| JP | 6003154 B2 | 9/2016 |
| JP | 6468335 | 2/2019 |
| JP | 7630710 | 2/2025 |
| KR | 10-2003-0065313 | 8/2003 |
| KR | 10-1299506 | 8/2013 |
| KR | 10-2019-0032942 | 3/2019 |
| KR | 10-2020-0093840 | 8/2020 |
| KR | 102186677 B1 | 12/2020 |
| KR | 20210004654 A | 1/2021 |
| KR | 102326708 B1 | 11/2021 |
| KR | 10-2396941 | 5/2022 |
| KR | 102442407 B1 | 9/2022 |
| KR | 102481303 B1 | 12/2022 |
| KR | 10-2024-0104900 | 7/2024 |

OTHER PUBLICATIONS

International Search Report and Written Opinion dated May 8, 2023 issued in International Patent Application No. PCT/KR2024/001050.

* cited by examiner

FIG. 3
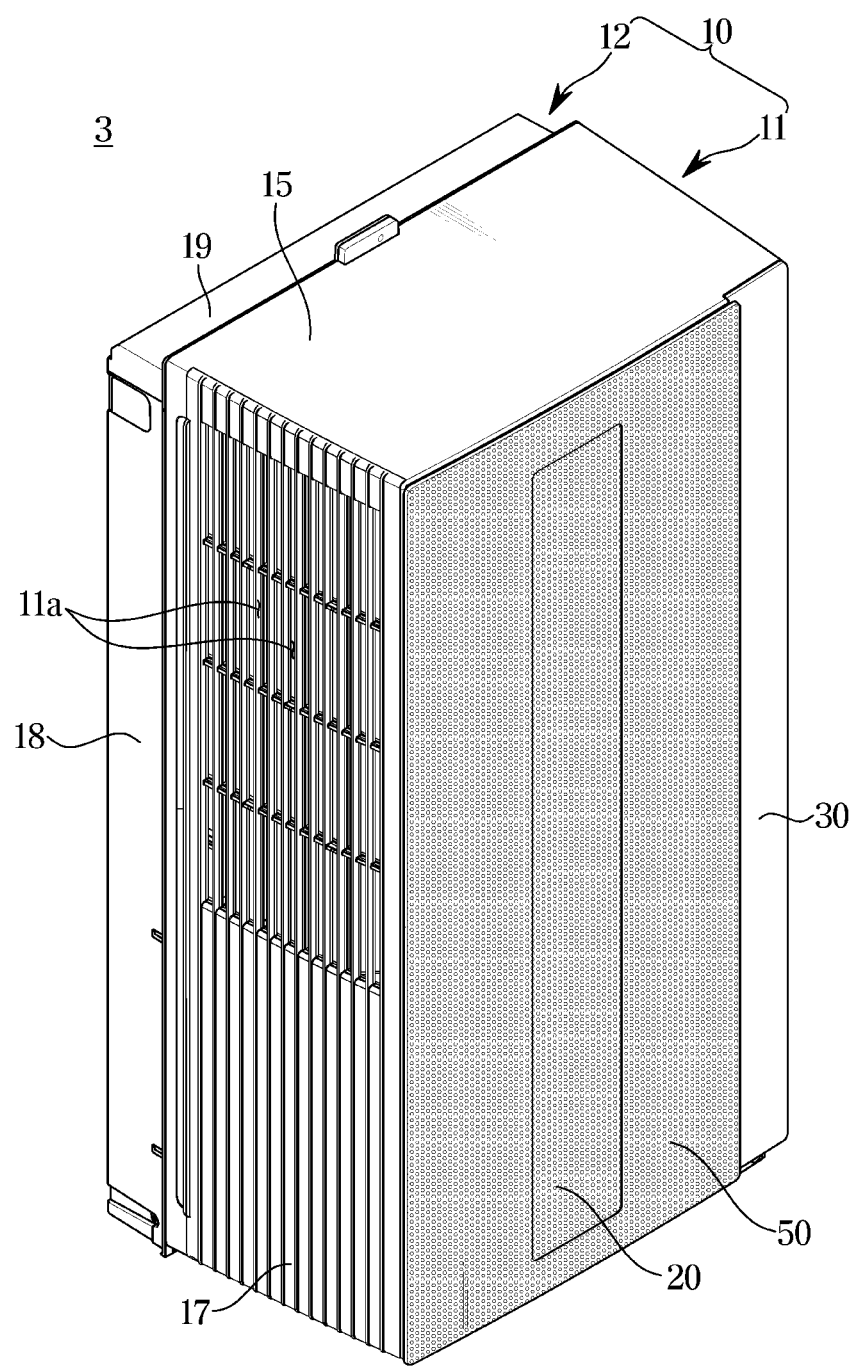
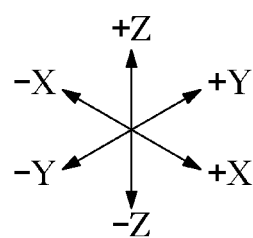

FIG. 22

| | | LESS THAN REFERENCE TEMPERATURE DIFFERENCE | GREATER THAN OR EQUAL TO REFERENCE TEMPERATURE DIFFERENCE |
|---|---|---|---|
| LESS THAN FIRST OPERATION TIME | LESS THAN REFERENCE HUMIDITY RANGE | FIRST DRAINAGE TIME | SECOND DRAINAGE TIME |
| | WITHIN REFERENCE HUMIDITY RANGE | THIRD DRAINAGE TIME | SECOND DRAINAGE TIME |
| | GREATER THAN OR EQUAL TO REFERENCE HUMIDITY RANGE | SECOND DRAINAGE TIME | SECOND DRAINAGE TIME |
| GREATER THAN OR EQUAL TO FIRST OPERATION TIME BUT LESS THAN SECOND OPERATION TIME | LESS THAN REFERENCE HUMIDITY RANGE | THIRD DRAINAGE TIME | SECOND DRAINAGE TIME |
| | WITHIN REFERENCE HUMIDITY RANGE | THIRD DRAINAGE TIME | SECOND DRAINAGE TIME |
| | GREATER THAN OR EQUAL TO REFERENCE HUMIDITY RANGE | SECOND DRAINAGE TIME | SECOND DRAINAGE TIME |
| GREATER THAN OR EQUAL TO SECOND OPERATION TIME | LESS THAN REFERENCE HUMIDITY RANGE | SECOND DRAINAGE TIME | SECOND DRAINAGE TIME |
| | WITHIN REFERENCE HUMIDITY RANGE | SECOND DRAINAGE TIME | SECOND DRAINAGE TIME |
| | GREATER THAN OR EQUAL TO REFERENCE HUMIDITY RANGE | SECOND DRAINAGE TIME | SECOND DRAINAGE TIME |

FIRST DRAINAGE TIME< THIRD DRAINAGE TIME< SECOND DRAINAGE TIME

AIR CONDITIONER AND CONTROL METHOD THEREOF

CROSS-REFERENCE TO RELATED APPLICATIONS

This application is a continuation of International Application No. PCT/KR2024/001050 designating the United States, filed on Jan. 23, 2024, in the Korean Intellectual Property Receiving Office and claiming priority to Korean Patent Application Nos. 10-2023-0052259, filed on Apr. 20, 2023, and 10-2023-0088691, filed on Jul. 7, 2023, in the Korean Intellectual Property Office, the disclosures of each of which are incorporated by reference herein in their entireties.

BACKGROUND

Field

The disclosure relates to an air conditioner and a control method thereof.

Description of Related Art

An air conditioner is a device that performs functions such as air purification, ventilation, humidity control, cooling, or heating in an air conditioning space, and refers to a device equipped with at least one of these functions.

The air conditioner may cool or heat a space using a refrigeration cycle. The air conditioner may include a compressor, a condenser, an expansion device, an evaporator, and a pipe. A refrigerant may circulate along the pipes through the compressor, the condenser, the expansion device, and the evaporator.

The air conditioners may be classified into a separate air conditioner and an integrated air conditioner. The separate air conditioner may include an indoor unit disposed indoors and an outdoor unit disposed outdoors. In the integrated air conditioner, both an indoor unit and an outdoor unit may be disposed in a single housing.

SUMMARY

Embodiments of the disclosure provide an air conditioner including an improved structure capable of automatically removing water collected in a housing, and a control method thereof.

Embodiments of the disclosure provide an air conditioner including an improved structure capable of efficiently removing water collected in a housing, and a control method thereof.

Embodiments of the disclosure provide an air conditioner including an improved structure capable of efficiently removing water collected in a housing after an operation is terminated, and a control method thereof.

Additional aspects of the disclosure will be set forth in part in the description which follows and, in part, will be apparent from the description.

According to an example embodiment of the disclosure, an air conditioner includes: a housing including a base, a first heat exchanger disposed inside the housing and configured to exchange heat with outdoor air, a second heat exchanger disposed inside the housing and configured to exchange heat with indoor air, a compressor configured to compress a refrigerant for a heat exchange operation performed by the first heat exchanger and the second heat exchanger, a first fan disposed inside the housing and configured to move air along a flow path passing through the first heat exchanger, a drainage device configured to move condensed water condensed on the second heat exchanger inside the housing and collected in the base to the first heat exchanger, and a controller including at least one processor comprising processing circuitry, wherein at least one processor, individually and/or collectively is, based on the stop of the operation of the compressor, configured to control the drainage device to move the condensed water collected in the base to the first heat exchanger during a drainage time determined based on an operation time of the compressor, and configured to control the first fan to move air during the drainage time.

According to an example embodiment of the disclosure, a method of controlling an air conditioner including a first heat exchanger configured to exchange heat with outdoor air, a second heat exchanger configured to exchange heat with indoor air, a compressor configured to compress a refrigerant, and a housing provided to accommodate the first heat exchanger, the second heat exchanger and the compressor, the control method includes: stopping an operation of the compressor, operating a drainage device to move condensed water collected in the housing to the first heat exchanger during a drainage time determined based on an operation time of the compressor, and operating a first fan to move air along a flow path passing through the first heat exchanger during the drainage time.

According to an example embodiment of the disclosure, an air conditioner includes: a housing including a base, an outdoor heat exchanger disposed inside the housing and configured to exchange heat with outdoor air, a compressor configured to compress for a cooling operation, an outdoor fan disposed inside the housing and configured to move air along a flow path passing through the outdoor heat exchanger, a drainage device disposed inside the housing to move water collected in the base to the outdoor heat exchanger, and a controller, including at least one processor, comprising processing circuitry, individually and/or collectively, configured to control an operation of the compressor, the outdoor fan and the drainage device. Based on the start of the cooling operation, at least one processor of the controller, individually and/or collectively, is configured to control the drainage device to move the water collected in the base to the outdoor heat exchanger; based on the stop of the cooling operation, control the drainage device to move the water collected in the base to the outdoor heat exchanger during a drainage time determined based on a period of time in which the cooling operation is performed, and control the outdoor fan to move air during the drainage time.

BRIEF DESCRIPTION OF THE DRAWINGS

These and/or other aspects, features and advantages of certain embodiments of the present disclosure will be more apparent from the following detailed description, taken in conjunction with the accompanying drawings, in which:

FIG. 3 is a perspective view illustrating the air conditioner viewed from another direction according to various embodiments;

FIG. 22 is a table illustrating an example of a drainage time determined according to each condition in the air conditioner according to various embodiments;

DETAILED DESCRIPTION

Figure 1:
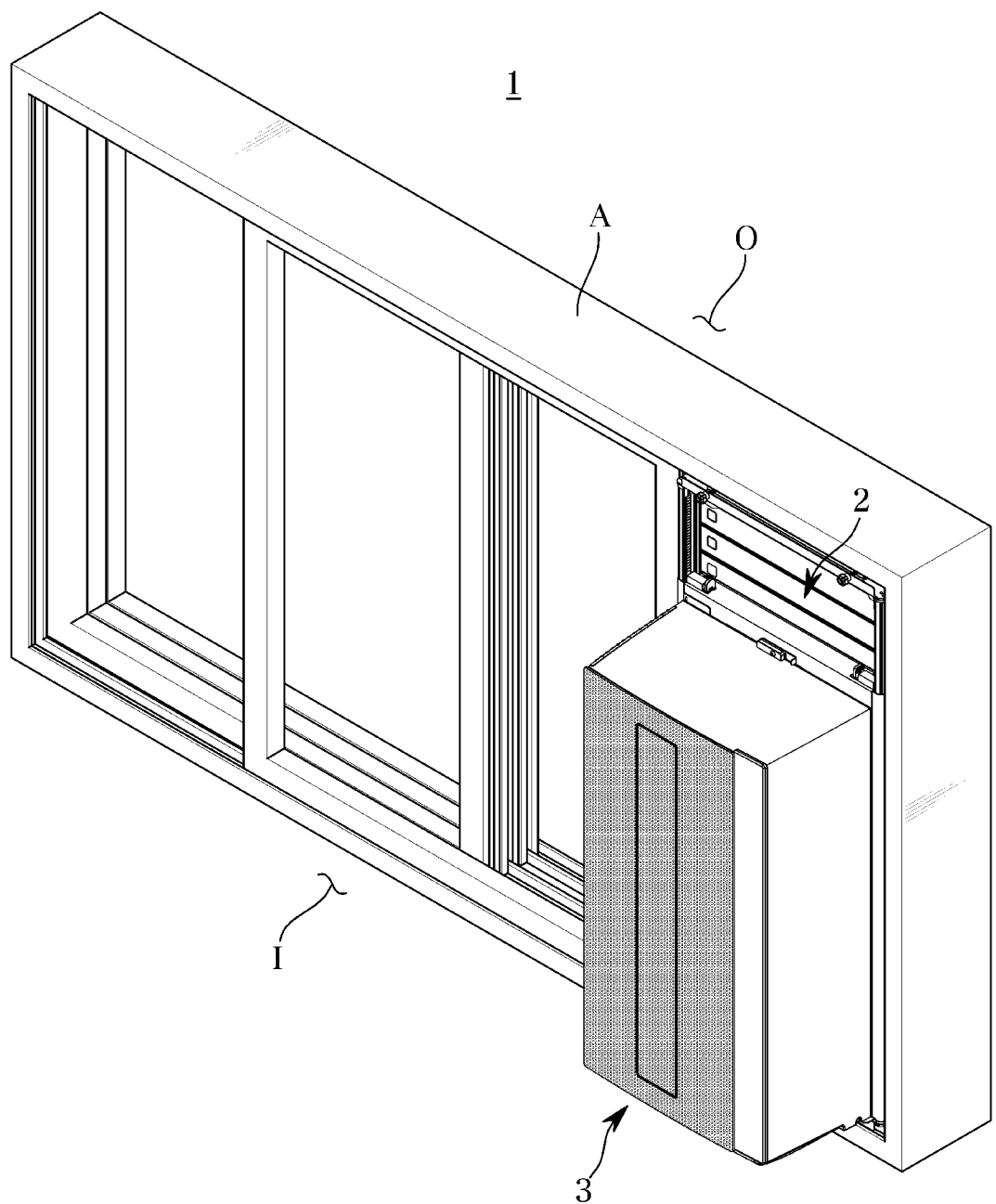
FIG. 1 is a perspective view illustrating an air conditioning system according to various embodiments.

Various example embodiments and the terms used therein are not intended to limit the technology disclosed herein to specific forms, and the disclosure should be understood to include various modifications, equivalents, and/or alternatives to the corresponding embodiments.

In describing the drawings, similar reference numerals may be used to designate similar elements.

A singular expression may include a plural expression unless otherwise indicated herein or clearly contradicted by context.

The terms "A or B," "at least one of A or/and B," or "one or more of A or/and B," A, B or C," "at least one of A, B or/and C," or "one or more of A, B or/and C," and the like used herein may include any and all combinations of one or more of the associated listed items.

The term of "and/or" includes a plurality of combinations of relevant items or any one item among a plurality of relevant items.

The term of "part", "module", or "component" may be implemented in hardware or software. In various embodiments, a plurality of "parts", "modules", and "components" may be implemented as a single component, or a single of "part", "module", or "component" may include multiple components.

Herein, the expressions "a first", "a second", "the first", "the second", etc., may simply be used to distinguish an element from other elements, but is not limited to another aspect (e.g., importance or order) of elements.

When an element (e.g., a first element) is referred to as being "(functionally or communicatively) coupled," or "connected" to another element (e.g., a second element), the first element may be connected to the second element, directly (e.g., wired), wirelessly, or through a third element.

In this disclosure, the terms "including", "having", and the like are used to specify features, numbers, steps, operations, elements, components, or combinations thereof, but do not preclude the presence or addition of one or more of the features, elements, steps, operations, elements, components, or combinations thereof.

When an element is said to be "connected", "coupled", "supported" or "contacted" with another element, this includes not only when elements are directly connected, coupled, supported or contacted, but also when elements are indirectly connected, coupled, supported or contacted through a third element.

Throughout the disclosure, when an element is "on" another element, this includes not only when the element is in contact with the other element, but also when there is another element between the two elements.

An air conditioner according to various embodiments may refer to a device that performs functions such as purification, ventilation, humidity control, cooling or heating in an air conditioning space (hereinafter referred to as "indoor space"), and particularly a device having at least one of these functions.

According to an embodiment, an air conditioner may include a heat pump device to perform a cooling function or a heating function. The heat pump device may include a refrigeration cycle in which a refrigerant is circulated through a compressor, a first heat exchanger, and an expansion device and a second heat exchanger. All components of the heat pump device may be embedded in one housing forming an exterior of an air conditioner, which includes a window-type air conditioner or a portable air conditioner. On the other hand, some components of the heat pump device may be divided and embedded in a plurality of housings forming a single air conditioner, which includes a wall-mounted air conditioner, a stand-type air conditioner, and a system air conditioner.

The air conditioner including the plurality of housings may include at least one outdoor unit installed outdoors and at least one indoor unit installed indoors. For example, the air conditioner may be provided in such a way that a single outdoor unit and a single indoor unit are connected through a refrigerant pipe. The air conditioner may be provided in such a way that a single outdoor unit is connected to two or more indoor units through a refrigerant pipe. The air conditioner may be provided in such a way that two or more outdoor units and two or more indoor units are connected through a plurality of refrigerant pipes.

The outdoor unit may be electrically connected to the indoor unit. For example, information (or commands) for controlling the air conditioner may be received through an input interface provided in the outdoor unit or the indoor unit. The outdoor unit and the indoor unit may operate simultaneously or sequentially in response to a user input.

The air conditioner may include an outdoor heat exchanger provided in the outdoor unit, an indoor heat exchanger provided in the indoor unit, and a refrigerant pipe connecting the outdoor heat exchanger and the indoor heat exchanger.

The outdoor heat exchanger may be configured to exchange heat between a refrigerant and outdoor air through a phase change of the refrigerant (e.g., evaporation or condensation). For example, while the refrigerant is condensed in the outdoor heat exchanger, the refrigerant may radiate heat to the outdoor air. While the refrigerant flowing in the outdoor heat exchanger evaporates, the refrigerant may absorb heat from the outdoor air.

The indoor unit may be installed indoors. For example, according to the arrangement method of the indoor unit, the air conditioner may be classified into a ceiling-type indoor unit, a stand-type indoor unit, a wall-mounted indoor unit, and the like. For example, the ceiling-type indoor unit may be classified into a 4-way type indoor unit, a 1-way type indoor unit, a duct type indoor unit and the like according to a method of discharging air.

As described above, the indoor heat exchanger may be configured to exchange heat between a refrigerant and outdoor air through a phase change of the refrigerant (e.g., evaporation or condensation). For example, while the refrigerant evaporates in the indoor unit, the refrigerant may absorb heat from the indoor air. The indoor space may be cooled by blowing the indoor air cooled through the cooled indoor heat exchanger. While the refrigerant is condensed in the indoor heat exchanger, the refrigerant may radiate heat to the indoor air. The indoor space may be heated by blowing the indoor air heated through the high-temperature indoor heat exchanger.

In other words, the air conditioner may perform a cooling or heating function through a phase change process of a refrigerant circulating between the outdoor heat exchanger and the indoor heat exchanger. To circulate the refrigerant, the air conditioner may include a compressor for compressing the refrigerant. The compressor may intake refrigerant gas through an inlet and compress the refrigerant gas. The compressor may discharge high-temperature and high-pressure refrigerant gas through an outlet. The compressor may be disposed inside the outdoor unit.

Through the refrigerant pipe, the refrigerant may be sequentially circulated through the compressor, the outdoor heat exchanger, the expansion device, and the indoor heat exchanger or sequentially circulated through the compressor, the indoor heat exchanger, the expansion device, and the outdoor heat exchanger.

For example, in the air conditioner, when a single outdoor unit and a single indoor unit are directly connected through a refrigerant pipe, the refrigerant may be circulated between the single outdoor unit and the single indoor unit through the refrigerant pipe.

For example, in the air conditioner, when a single outdoor unit is connected to two or more indoor units through a refrigerant pipe, the refrigerant may flow from the single outdoor unit to the plurality of indoor units through branched refrigerant pipes. Refrigerants discharged from the plurality of indoor units may be combined and circulated to the outdoor unit. For example, through a separate refrigerant pipe, each of the plurality of indoor units may be directly connected in parallel to the single outdoor unit.

Each of the plurality of indoor units may be operated independently according to an operation mode set by a user. In other words, some of the plurality of indoor units may be operated in a cooling mode while others of the plurality of indoor units is operated in a heating mode. The refrigerant may be selectively introduced into each indoor unit in a high-pressure state or a low-pressure state, discharged, and circulated to the outdoor unit along a circulation path that is designated through a flow path switching valve to be described in greater detail below.

For example, in the air conditioner, when two or more outdoor units and two or more indoor units are connected through the plurality of refrigerant pipes, refrigerants discharged from the plurality of outdoor units may be combined and flow through one refrigerant pipe, and then diverged again at a certain point and introduced into the plurality of indoor units.

All of the plurality of outdoor units may be driven or at least some of the plurality of outdoor units may not be driven according to a driving load according to an operation amount of the plurality of indoor units. Through a flow path switching valve, the refrigerant may be provided to be introduced into and circulated to an outdoor unit that is selectively driven. The air conditioner may include the expansion device to lower the pressure of the refrigerant flowing into the heat exchanger. For example, the expansion device may be disposed inside the indoor unit or inside the outdoor unit, or disposed inside the indoor unit and the outdoor unit.

The expansion device may lower a temperature and pressure of the refrigerant using a throttling effect. The expansion device may include an orifice configured to reduce a cross-sectional area of a flow path. A temperature and pressure of the refrigerant passing through the orifice may be lowered.

For example, the expansion device may be implemented as an electronic expansion valve configured to adjust an opening ratio (a ratio of a cross-sectional area of a flow path of a valve in a partially opened state to a cross-sectional area of the flow path of the valve in a fully open state). According to the opening ratio of the electronic expansion valve, the amount of refrigerant passing through the expansion device may be adjusted.

The air conditioner may further include a flow path switching valve disposed on the refrigerant circulation path. The flow path switching valve may include a 4-way valve. The flow path switching valve may determine a refrigerant circulation path depending on an operation mode of the indoor unit (e.g., cooling operation or heating operation). The flow path switching valve may be connected to the outlet of the compressor.

The air conditioner may include an accumulator. The accumulator may be connected to the inlet of the compressor. A low-temperature and low-pressure refrigerant, which is evaporated in the indoor heat exchanger or the outdoor heat exchanger, may flow into the accumulator.

When a refrigerant mixture of refrigerant liquid and refrigerant gas is introduced, the accumulator may separate the refrigerant liquid from the refrigerant gas, and supply the refrigerant gas, from which the refrigerant liquid is separated, to the compressor.

An outdoor fan may be provided near the outdoor heat exchanger. The outdoor fan may blow outdoor air to the outdoor heat exchanger to promote heat exchange between the refrigerant and the outdoor air.

The outdoor unit of the air conditioner may include at least one sensor. For example, the sensor of the outdoor unit may be provided as an environment sensor. The outdoor unit sensor may be disposed at a certain position of the inside or the outside of the outdoor unit. For example, the outdoor unit sensor may include a temperature sensor configured to detect an air temperature around the outdoor unit, a humidity sensor configured to detect air humidity around the outdoor unit, or a refrigerant temperature sensor configured to detect a refrigerant temperature in a refrigerant pipe passing through the outdoor unit, or a refrigerant pressure sensor configured to detect a refrigerant pressure in a refrigerant pipe passing through the outdoor unit.

The outdoor unit of the air conditioner may include an outdoor unit communication circuitry. The outdoor unit communication circuitry may be configured to receive a control signal from an indoor unit controller of the air conditioner, which will be described later. Based on a control signal received through the outdoor unit communication circuitry, the outdoor unit may control the operation of the compressor, the outdoor heat exchanger, the expansion device, the flow path switching valve, the accumulator, or the outdoor fan. The outdoor unit may transmit a sensing value detected by the outdoor unit sensor to the indoor unit controller through the outdoor unit communication circuitry.

The outdoor unit communication circuitry may include at least one of a short-range communication module or a long-range communication module.

The indoor unit of the air conditioner may include a housing, a blower configured to circulate air inside or outside the housing, and the indoor heat exchanger configured to exchange heat with air introduced into the housing.

The housing may include an inlet. Indoor air may flow into the housing through the inlet.

The indoor unit of the air conditioner may include a filter provided to filter out foreign substance in air that is introduced into the inside of the housing through the inlet.

The housing may include an outlet. Air flowing inside the housing may be discharged to the outside of the housing through the outlet.

An airflow guide configured to guide a direction of air discharged through the outlet may be provided in the housing of the indoor unit. For example, the airflow guide may include a blade positioned in the outlet. For example, the airflow guide may include an auxiliary fan for regulating an exhaust airflow, but is not limited thereto. Alternatively, the airflow guide may be omitted.

The indoor heat exchanger and the blower arranged on a flow path connecting the inlet and the outlet may be disposed inside the housing of the indoor unit.

The blower may include an indoor fan and a fan motor. For example, the indoor fan may include an axial fan, a mixed flow fan, a crossflow fan and a centrifugal fan.

The indoor heat exchanger may be arranged between the blower and the outlet or between the inlet and the blower. The indoor heat exchanger may absorb heat from air introduced through the inlet or transfer heat to air introduced through the inlet.

The indoor heat exchanger may include a heat exchange tube through which a refrigerant flows, and a heat exchanger fin in contact with the heat exchange tube to increase a heat transfer area.

The indoor unit of the air conditioner may include a drain tray disposed below the indoor heat exchanger to collect condensed water generated in the indoor heat exchanger. The condensed water contained in the drain tray may be drained to the outside through a drain hose. The drain tray may be provided to support the indoor heat exchanger.

The indoor unit of the air conditioner may include an input interface. The input interface may include any type of user input means including, for example, and without limitation, a button, a switch, a touch screen and/or a touch pad. A user can directly input setting data (e.g., desired indoor temperature, cooling/heating/dehumidifying/air cleaning operation mode setting, outlet selection setting, and/or air volume setting) through the input interface.

The input interface may be connected to an external input device. For example, the input interface may be electrically connected to a wired remote controller. The wired remote controller may be installed at a specific location (e.g., a part of a wall) in an indoor space. A user can input setting data related to the operation of the air conditioner by manipulating the wired remote controller. An electrical signal corresponding to the setting data obtained through the wired remote controller may be transmitted to the input interface. Further, the input interface may include an infrared sensor. A user can remotely input the setting data for the operation of the air conditioner using a wireless remote controller. The setting data received through the wireless remote controller may be transmitted to the input interface as an infrared signal.

Further, the input interface may include a microphone. A user's voice command may be obtained through the microphone. The microphone may convert a user's voice command into an electrical signal and transmit the electrical signal to the indoor unit controller. The indoor unit controller may control components of the air conditioner to execute a function corresponding to the user's voice command. The setting data obtained through the input interface (e.g., desired indoor temperature, cooling/heating/dehumidifying/ air cleaning operation mode setting, outlet selection setting, and/or air volume setting) may be transmitted to the indoor unit controller to be described later. For example, the setting data obtained through the input interface may be transmitted to the outside, that is, to the outdoor unit or a server through an indoor unit communication circuitry to be described later.

The indoor unit of the air conditioner may include a power module. The power module may be connected to an external power source to supply power to components of the indoor unit.

The indoor unit of the air conditioner may include an indoor unit sensor. The indoor unit sensor may be an environment sensor disposed inside or outside the housing. For example, the indoor unit sensor may include one or more temperature sensors and/or humidity sensors disposed in a predetermined space inside or outside the housing of the indoor unit. For example, the indoor unit sensor may include a refrigerant temperature sensor configured to detect a refrigerant temperature of a refrigerant pipe passing through the indoor unit. For example, the indoor unit sensor may include a refrigerant temperature sensor configured to detect a temperature of an entrance, a middle portion and/or an exit of the refrigerant pipe passing through the indoor heat exchanger.

For example, each environmental information detected by the indoor unit sensor may be transmitted to the indoor unit controller to be described later or transmitted to the outside through the indoor unit communication circuitry to be described later.

The indoor unit of the air conditioner may include the indoor unit communication circuitry. The indoor unit communication circuitry may include at least one of a short-range wireless communication module and a long-range wireless communication module. The indoor unit communication circuitry may include at least one antenna for wirelessly communicating with other devices. The outdoor unit may include the outdoor unit communication circuitry. The outdoor unit communication circuitry may also include at least one of a short-range wireless communication module and a long-range wireless communication module.

The short-range wireless communication module may include various communication circuitry, including, for example, a Bluetooth communication module, a Bluetooth Low Energy (BLE) communication module, a near field communication module, a WLAN (Wi-Fi) communication module, and a Zigbee communication module, an infrared data association (IrDA) communication module, a Wi-Fi Direct (WFD) communication module, an ultrawideband (UWB) communication module, an Ant+ communication module, a microwave (uWave) communication module, etc., but is not limited thereto.

The long-range wireless communication module may include a communication module including various communication circuitry that performs various types of long-range wireless communication, and may include a mobile communication circuitry. The mobile communication circuitry transmits and receives radio signals with at least one of a base station, an external terminal, and a server on a mobile communication network.

The indoor unit communication circuitry may communicate with an external device such as a server, a mobile device and other home appliances through an access point (AP). The access point (AP) may connect a local area network (LAN), to which an air conditioner or a user device is connected, to a wide area network (WAN) to which a server is connected. The air conditioner or the user device may be connected to the server through the wide area network (WAN). The indoor unit of the air conditioner may include the indoor unit controller configured to control components of the indoor unit including the blower. The outdoor unit of the air conditioner may include an outdoor unit controller configured to control components of the outdoor unit including the compressor. The indoor unit controller may communicate with the outdoor unit controller through the indoor unit communication circuitry and the outdoor unit communication circuitry. The outdoor unit communication circuitry may transmit a control signal generated by the outdoor unit controller to the indoor unit communication circuitry, or transmit a control signal, which is transmitted from the indoor unit communication circuitry, to the outdoor unit controller. In other words, the outdoor unit and the indoor unit may perform bi-directional communication. The outdoor unit and the indoor unit may transmit and receive various signals generated during operation of the air conditioner.

The outdoor unit controller may be electrically connected to components of the outdoor unit and may control operations of each component. For example, the outdoor unit controller may adjust a frequency of the compressor and control the flow path switching valve to change a circulation direction of the refrigerant. The outdoor unit controller may adjust a rotational speed of the outdoor fan. Further, the outdoor unit controller may generate a control signal for adjusting the opening degree of the expansion valve. Under the control of the outdoor unit controller, the refrigerant may be circulated along the refrigerant circulation circuit including the compressor, the flow path switching valve, the outdoor heat exchanger, the expansion valve, and the indoor heat exchanger.

Various temperature sensors included in the outdoor unit and the indoor unit may transmit electrical signals corresponding to detected temperatures to the outdoor unit controller and/or the indoor unit controller. For example, the humidity sensors included in the outdoor unit and the indoor unit may respectively transmit electrical signals corresponding to the detected humidity to the outdoor unit controller and/or the indoor unit controller.

The indoor unit controller may obtain a user input from a user device including a mobile device through the indoor unit communication circuitry, or directly obtain a user input through the input interface or the remote controller. The indoor unit controller may control components of the indoor unit including the blower in response to the received user input. The indoor unit controller may transmit information related to the received user input to the outdoor unit controller of the outdoor unit.

The outdoor unit controller may control components of the outdoor unit including the compressor based on the information related to the user input received from the indoor unit. For example, when a control signal corresponding to a user input for selecting an operation mode such as a cooling operation, a heating operation, a fan operation, a defrosting operation, or a dehumidifying operation is received from the indoor unit, the outdoor unit controller may control components of the outdoor unit to perform an operation of the air conditioner corresponding to the selected operation mode.

The outdoor unit controller and indoor unit controller may include a processor and a memory, respectively. The indoor unit controller may include at least one first processor and at least one first memory, and the outdoor unit controller may include at least one second processor and at least one second memory.

The memory may memorize/store various types of information necessary for the operation of the air conditioner. The memory may store instructions, applications, data and/or programs necessary for the operation of the air conditioner. For example, the memory may store various programs for the cooling operation, the heating operation, the dehumidifying operation, and/or the defrosting operation of the air conditioner. The memory may include volatile memory such as a static random access memory (S-RAM) and a dynamic random access memory (D-RAM) for temporarily storing data. In addition, the memory may include a non-volatile memory such as a read only memory (ROM), an erasable programmable read only memory (EPROM), and an electrically erasable programmable read only memory (EEPROM) for long-term storage of data.

The processor may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor may generate a control signal for controlling an operation of the air conditioner based on instructions, applications, data, and/or programs stored in the memory. The processor may be hardware and may include a logic circuit and an arithmetic circuit. The processor may process data according to a program and/or instructions provided from the memory, and may generate a control signal according to a processing result. The memory and the processor may be implemented as one control circuit or as a plurality of circuits.

The indoor unit of the air conditioner may include an output interface. The output interface may be electrically connected to the indoor unit controller, and output information related to the operation of the air conditioner under the control of the indoor unit controller. For example, the output interface may output information such as an operation mode selected by a user input, a wind direction, a wind volume, and a temperature. Further, the output interface may output sensing information obtained from the indoor unit sensor or the outdoor unit sensor, and output warning/error messages.

The output interfaces may include a display and a speaker. The speaker may be a sound device and configured to output various sounds. The display may display information, which is input by a user or provided to a user, as various graphic elements. For example, operation information of the air conditioner may be displayed as at least one of an image and text. Further, the display may include an indicator providing specific information. The display may include a liquid crystal display (LCD) panel, a light emitting diode (LED) panel, an organic light emitting diode (OLED) panel, a micro-LED panel, and/or a plurality of LEDs.

Reference will now be made in greater detail below to various example embodiments of the disclosure, examples of which are illustrated in the accompanying drawings.

Hereinafter for convenience of description, a window-type air conditioner installed on a window and/or a window frame will be described as an example. However, contents of the disclosure may also be applied to other types of air conditioners. For example, contents of the disclosure may also be applied to portable air conditioners, wall-mounted air conditioners, ceiling-type air conditioners, and floor-type air conditioners.

In the following detailed description, the terms of "upward", "downward", "forward", "rearward" and the like may be defined by drawings, but the shape and the location of the component is not limited by the term. For example, referring to FIG. 1, when an air conditioner 3 according to an embodiment of the disclosure is mounted on a mounting assembly 2, a direction in which the air conditioner 3 faces an indoor space may be defined as forward (+X direction), and a direction in which the air conditioner 3 faces an outdoor space may be defined as rearward (−X direction). Further, when the air conditioner 3 is mounted on the mounting assembly 2, a direction in which the air conditioner 3 faces vertically upward may be defined as upward (+Z direction), and, a direction in which the air conditioner 3 faces vertically downward may be defined as downward (−Z direction). Further, when the air conditioner 3 is mounted on the mounting assembly 2, directions parallel to +Y direction and −Y direction may be defined as left and right directions based on the drawing.

FIG. 1 is a perspective view illustrating an example air conditioning system according to various embodiments.

Referring to FIG. 1, an air conditioning system 1 according to an embodiment of the disclosure may include a mounting assembly 2.

The mounting assembly 2 may be provided to mount the air conditioner 3, which will be described in greater detail below. The mounting assembly 2 may allow the air conditioner 3 to be mounted on a structure A.

The mounting assembly 2 may be provided to be installable on the structure A. The mounting assembly 2 may be provided to be mountable on the structure A. The mounting assembly 2 may be provided to be fixable to the structure A.

The mounting assembly 2 may provide a seal between the air conditioner 3 and the structure A. The mounting assembly 2 may provide a seal between an indoor space I and an outdoor space O.

For example, the structure A may include a window and/or a window frame. However, the disclosure is not limited thereto. The structure A may be provided in various ways according to the type of air conditioner 3. For example, the structure A may include at least one of a wall, a ceiling, or a floor.

The air conditioning system 1 according to an embodiment of the disclosure may include the air conditioner 3.

The air conditioner 3 may be provided to be mounted on the mounting assembly 2. The air conditioner 3 may be provided to be mounted on the structure A by being mounted on the mounting assembly 2. The air conditioner 3 may be installed in the structure A through the mounting assembly 2. However, the disclosure is not limited thereto. For example, the air conditioner 3 may be mounted on the structure A without the mounting assembly 2. For example, the air conditioner 3 may be configured to perform an air conditioning function without being mounted on the structure A.

The air conditioner 3 may be configured to cool or heat the indoor space I. The air conditioner 3 may be configured to exchange heat between indoor air and outdoor air, respectively. For example, the air conditioner 3 may perform a heat exchange operation using a refrigerant cycle, and may be configured to exchange heat with indoor air and the refrigerant, and may be configured to exchange heat with the outdoor air and the refrigerant. The air conditioner 3 may be configured to absorb heat from indoor air and transfer heat to outdoor air when cooling the indoor space I. Additionally, the air conditioner 3 may be configured to transfer heat to indoor air and absorb heat from outdoor air when heating the indoor space I.

A portion of the air conditioner 3 may be arranged to face the indoor space I. Another portion of the air conditioner 3 may be arranged to face the outdoor space O.

The air conditioning system 1 described above with reference to FIG. 1 is merely an example of a system for installing and operating an air conditioner in an air conditioning system according to the disclosure, and the disclosure is not limited thereto.

Figure 2:
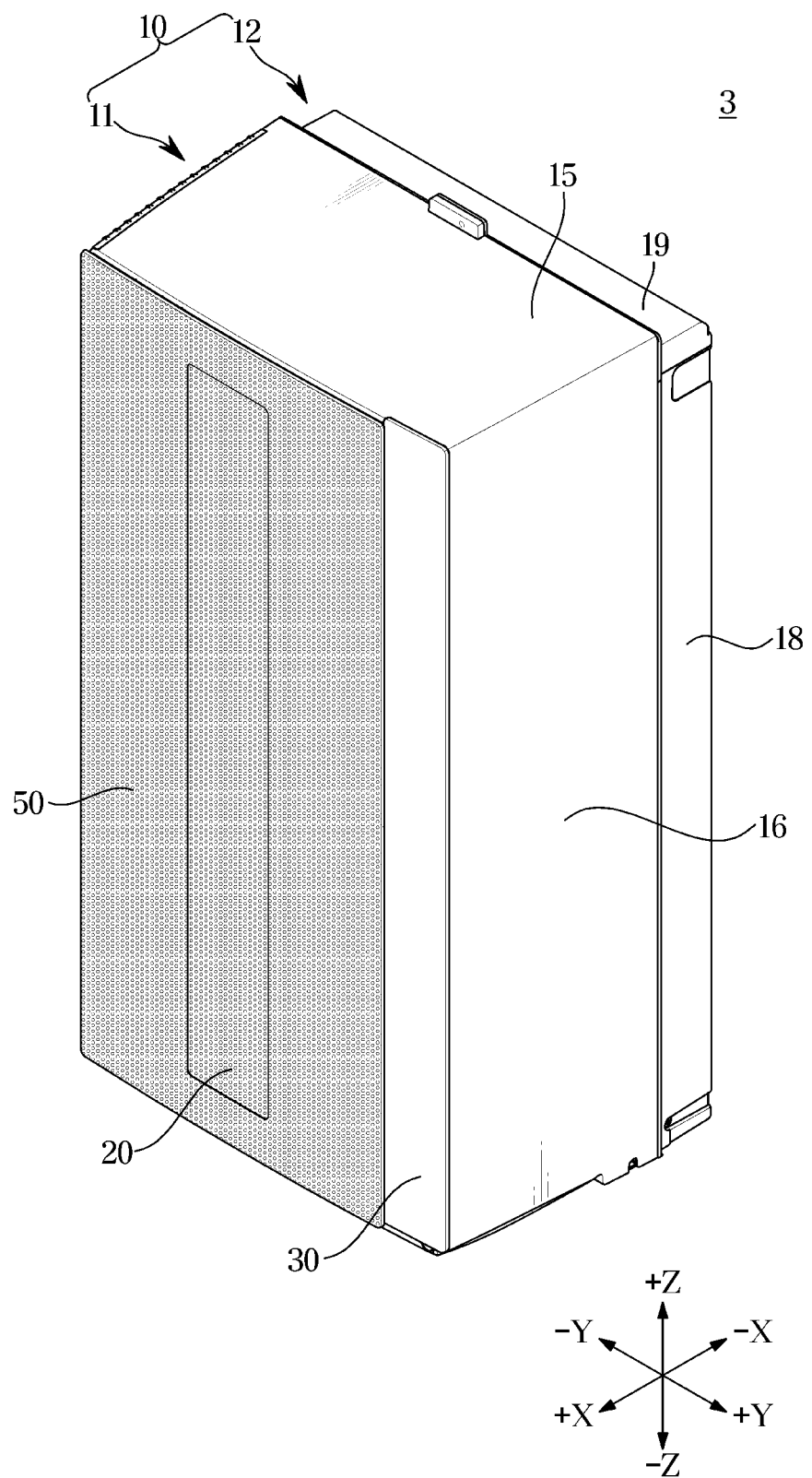
FIG. 2 is a perspective view illustrating an air conditioner viewed from one direction according to various embodiments.
Figure 4:
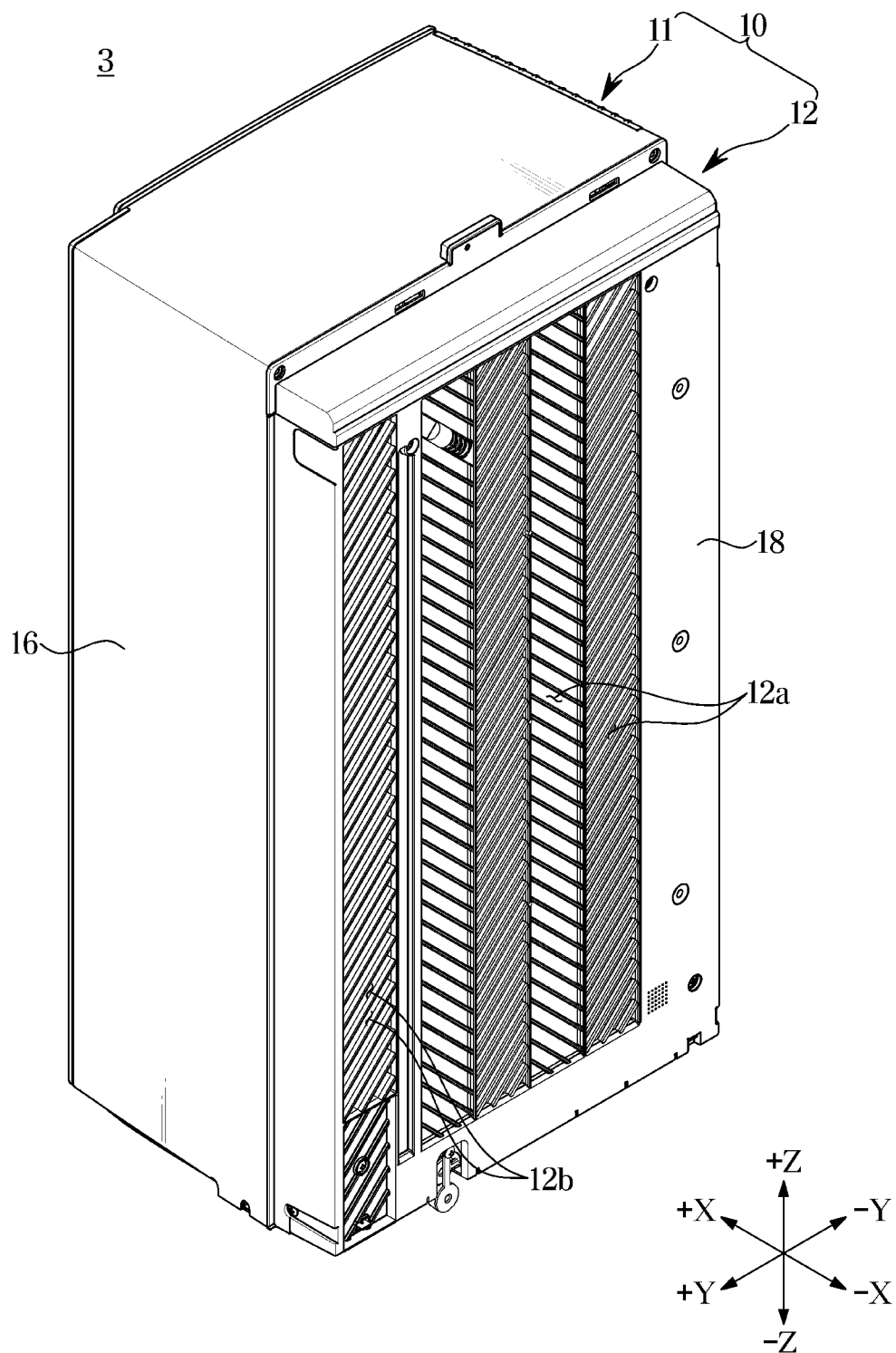
FIG. 4 is a rear perspective view of the air conditioner according to various embodiments.
Figure 5:
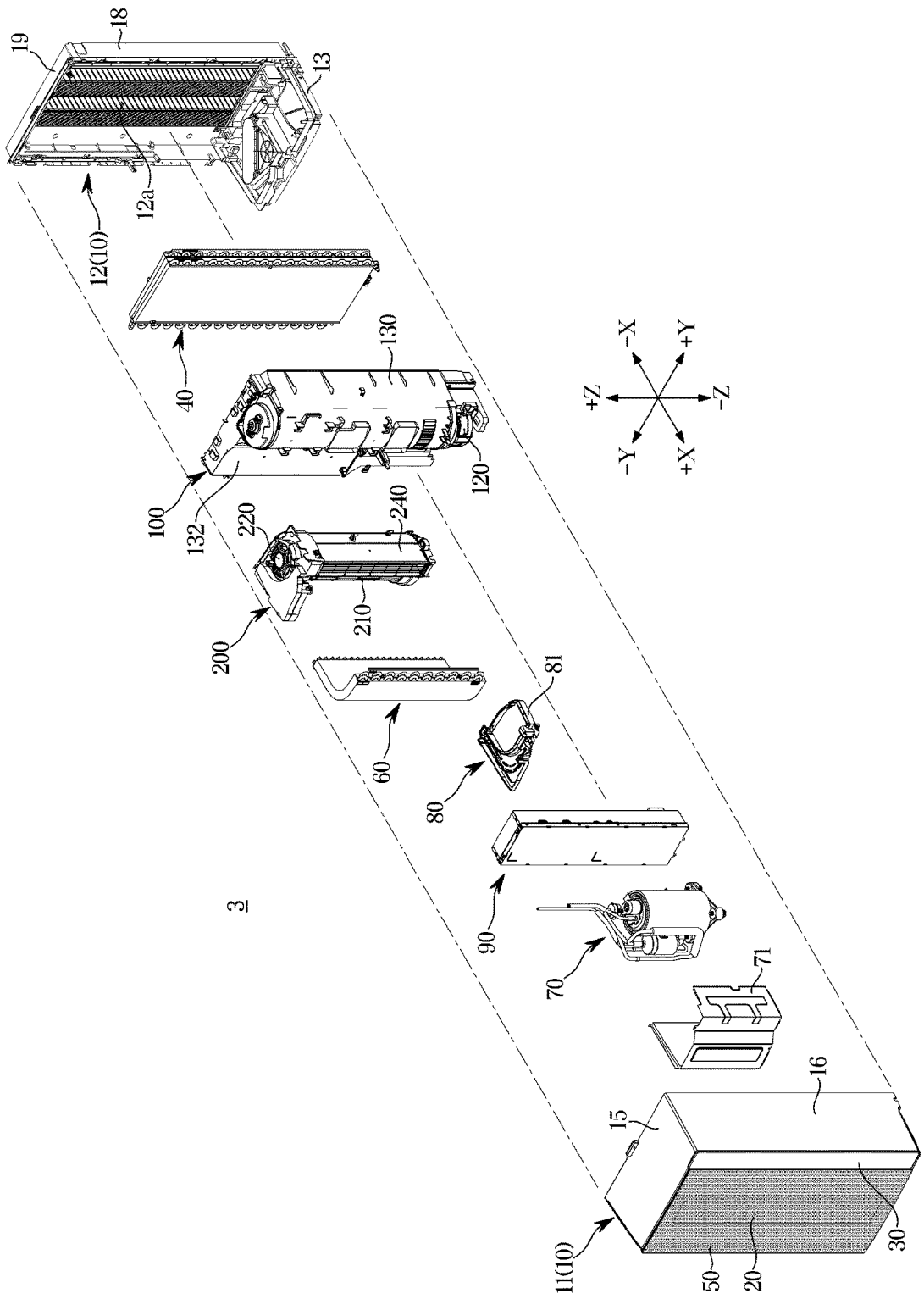
FIG. 5 is an exploded perspective view of the air conditioner according to various embodiments.
Figure 6:
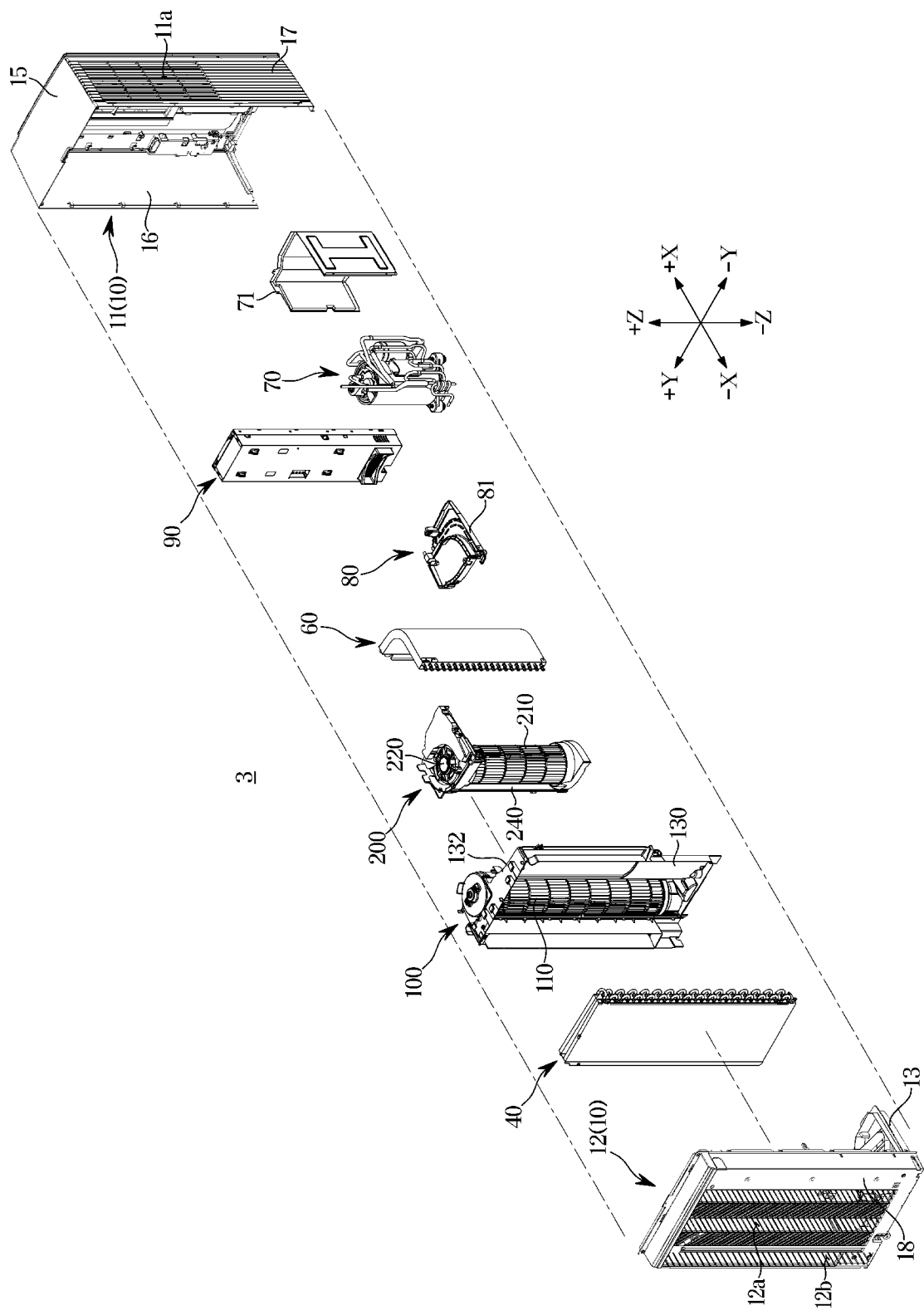
FIG. 6 is an exploded perspective view of the air conditioner according to various embodiments.
Figure 7:
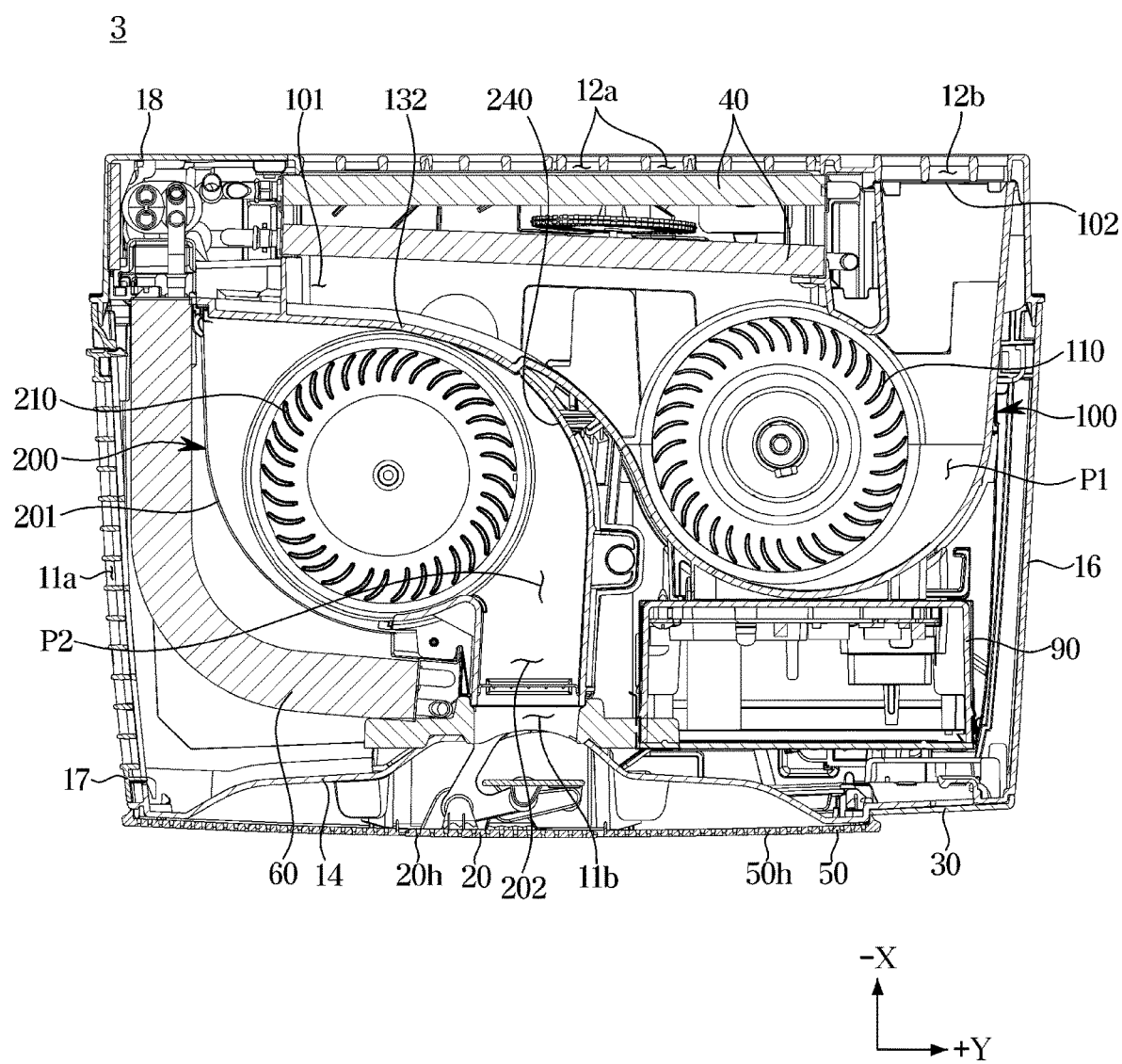
FIG. 7 is a cross-sectional view of the air conditioner according to various embodiments.

FIG. 2 is a perspective view illustrating the air conditioner when viewed from one direction according to various embodiments. FIG. 3 is a perspective view illustrating the air conditioner when viewed from another direction according to various embodiments. FIG. 4 is a rear perspective view of the air conditioner according to various embodiments. FIG. 5 is an exploded perspective view of the air conditioner according to various embodiments. FIG. 6 is an exploded perspective view of the air conditioner according to various embodiments. FIG. 7 is a cross-sectional view of the air conditioner according to various embodiments.

Referring to FIGS. 2, 3, 4, 5, 6 and 7 (which may be referred to herein as FIGS. 2 to 7), the air conditioner 3 according to an embodiment of the disclosure may include a housing 10. The housing 10 may be provided to form an overall appearance of the air conditioner 3. The housing 10 may form at least a portion of an outer surface of the air conditioner 3. The housing 10 may be provided to accommodate various components of the air conditioner 3. The housing 10 may have a substantially box shape.

For example, the housing 10 may include a front case 11. For example, housing 10 may include a rear case 12. The front case 11 may be provided to be detachably couplable to the rear case 12.

The front case 11 may be arranged to face the indoor space I (refer to FIG. 1). For example, the front case 11 may be provided to form at least a portion of a front exterior of the air conditioner 3.

The rear case 12 may be arranged to face the outdoor space O (refer to FIG. 1). For example, the rear case 12 may be provided to form at least a portion of a rear exterior of the air conditioner 3.

For example, the housing 10 may include a front panel 14. The front panel 14 may form at least a portion of a front surface of the housing 10. A second outlet 11b, which will be described later, may be formed on the front panel 14.

The front panel 14 may be at least partially covered by a discharge panel 50, which will be described in greater detail below. For example, as shown in FIGS. 2 to 7, the front panel 14 may be substantially entirely covered by the discharge panel 50, and as a result, the front panel 14 may not be visible on the front exterior of the air conditioner 3. However, it is not limited thereto, and a portion of the front panel 14 may be covered by the discharge panel 50, but the other portion of the front panel 14 may not be covered by the discharge panel 50 and thus exposed to the outside. Accordingly, the front panel 14 may form a portion of the front exterior of the air conditioner 3.

For example, the housing 10 may include a top panel 15. The top panel 15 may form an upper surface of the air conditioner 3.

For example, the housing 10 may include a first side panel 16. The first side panel 16 may form a right surface of both sides surfaces in a horizontal direction (Y direction) of the air conditioner 3.

For example, the housing 10 may include a second side panel 17. The second side panel 17 may form a left surface of the both sides surfaces in the horizontal direction (Y direction) of the air conditioner 3. The second side panel 17 may be provided on the opposite side of the first side panel 16.

For example, the housing 10 may include a rear panel 18. The rear panel 18 may form a rear surface of the air conditioner 3.

For example, the housing 10 may include a base 13. The base 13 may form a lower surface of the air conditioner 3. The base 13 may be provided to support at least a part of a configuration disposed inside the air conditioner 3.

For example, the housing 10 may include a top cover 19. For example, the top cover 19 may be provided to form a portion of the upper surface and/or a portion of the rear surface of the air conditioner 3. However, the housing 10 may not include a separate top cover 19. For example, the top cover 19 may be provided as a part of the top panel 15 or as a part of the rear panel 18. For example, a part of the top cover 19 may be provided as a part of the top panel 15, and another part of the top cover 19 may be provided as a part of the rear panel 18.

For example, referring to FIGS. 2 to 7, it is illustrated that the front case 11 includes the front panel 14, the top panel 15, the first side panel 16, and the second side panel 17, but the disclosure is not limited thereto. For example, the front case 11 may be formed to include only the front panel 14 and the top panel 15. For example, the front case 11 may further include components other than the front panel 14, the top panel 15, the first side panel 16, and the second side panel 17.

For example, referring to FIGS. 2 to 7, it is illustrated that the rear case 12 includes the rear panel 18, the base 13, and the top cover 19, but the disclosure is not limited thereto. For example, the rear case 12 may be formed to include only the rear panel 18. For example, the rear case 12 may further include components other than the rear panel 18, the base 13, and the top cover 19.

The housing 10 of the air conditioner 3 described above is only an example of the housing provided in the air conditioner according to the disclosure, and the disclosure is not limited thereto. The air conditioner according to the disclosure may include a housing having various structures and shapes.

The housing 10 may include a first inlet 12a through which outdoor air flows. Outdoor air may flow into the housing 10 through the first inlet 12a.

The first inlet 12a may be arranged to face the outdoor space O (refer to FIG. 1). The first inlet 12a may be in communication with the outdoor space O. For example, the first inlet 12a may be formed in the rear case 12 to allow outdoor air to be introduced. For example, the first inlet 12a may be formed in the rear panel 18. However, the disclosure is not limited thereto, and the first inlet 12a may be formed in various parts of the housing 10 facing the outdoor space O.

The housing 10 may include a first outlet 12b formed to allow air that is heat-exchanged with a first heat exchanger 40 to be discharged to the outdoor space O. Outdoor air introduced into the housing 10 through the first inlet 12a may be heat-exchanged with the first heat exchanger 40 and then discharged to the outdoor space O through the first outlet 12b.

The first outlet 12b may be arranged to face the outdoor space O (refer to FIG. 1). The first outlet 12b may be in communication with the outdoor space O. For example, the first outlet 12*b* may be formed in the rear case 12. For example, the first outlet 12*b* may be formed in the rear panel 18. However, the disclosure is not limited thereto, and the first outlet 12*b* may be formed in various parts of the housing 10 facing the outdoor space O.

The first outlet 12*b* may be distinguished from the first inlet 12*a*. The first outlet 12*b* may be formed to be spaced apart from the first inlet 12*a*.

A first flow path P1 may be formed inside the housing 10. The first flow path P1 may be formed to allow air, which is introduced from the outdoors, to flow. The first flow path P1 may be formed between the first inlet 12*a* and the first outlet 12*b*. For example, the first heat exchanger 40 may be provided on the first flow path P1. For example, a first fan assembly 100 may be provided on the first flow path P1.

The housing 10 may include a second inlet 11*a* through which indoor air flows. Indoor air may flow into the housing 10 through the second inlet 11*a*.

The second inlet 11*a* may be arranged to face the indoor space I (refer to FIG. 1). The second inlet 11*a* may be in communication with the indoor space I. For example, the second inlet 11*a* may be formed in the front case 11 to allow indoor air to be introduced. For example, the second inlet 11*a* may be formed in the second side panel 17. However, the disclosure is not limited thereto, and the second inlet 11*a* may be formed in various parts of the housing 10 facing the indoor space I.

The housing 10 may include a second outlet 11*b* formed to allow air that is heat-exchanged with a second heat exchanger 60 to be discharged to the outside of the housing 10. The indoor air introduced into the housing 10 through the second inlet 11*a* may be heat-exchanged with the second heat exchanger 60 and then discharged to the outside of the housing 10 through the second outlet 11*b*. As will be described later, the air discharged to the outside of the housing 10 through the second outlet 11*b* may be discharged to the indoor space I (refer to FIG. 1) through an opening formed on the discharge panel 50 or a plurality of discharge holes 50*h*, each of which has a smaller size than the opening.

The second outlet 11*b* may be arranged to face the indoor space I (refer to FIG. 1). The second outlet 11*b* may be in communication with the indoor space I. For example, the second outlet 11*b* may be formed in the front case 11. For example, the second outlet 11*b* may be formed in the front panel 14 and may be covered by the discharge panel 50. However, the disclosure is not limited thereto, and the second outlet 11*b* may be formed in various parts of the housing 10 facing the indoor space I.

The second outlet 11*b* may be distinguished from the second inlet 11*a*. The second outlet 11*b* may be formed to be spaced apart from the second inlet 11*a*.

A second flow path P2 may be formed inside the housing 10. The second flow path P2 may be formed to allow air, which is introduced from the indoor space, to flow. The second flow path P2 may be formed between the second inlet 11*a* and the second outlet 11*b*. For example, the second heat exchanger 60 may be provided on the second flow path P2. For example, a second fan assembly 200 may be provided on the second flow path P2.

The first flow path P1 and the second flow path P2 may be arranged to be partitioned from each other. Outdoor air flowing through the first flow path P1 and indoor air flowing through the second flow path P2 may not mix inside the housing 10.

The air conditioner 3 may include the discharge panel 50. The discharge panel 50 may cover at least a portion of the housing 10. Particularly, the discharge panel 50 may cover a portion of the housing 10 in which the second outlet 11*b* is formed. The discharge panel 50 may be disposed on one side of the second outlet 11*b*. The discharge panel 50 may be arranged to be spaced apart from the second outlet 11*b*.

For example, the discharge panel 50 may cover the front panel 14 in which the second outlet 11*b* is formed. The discharge panel 50 may form at least a portion of the front exterior of the air conditioner 3.

The discharge panel 50 may be provided to allow at least a portion of the air, which is discharged through the second outlet 11*b*, to be discharged. That is, after the indoor air, which is introduced into the housing 10 from the indoor space I (refer to FIG. 1) through the second inlet 11*a*, is heat exchanged with the second heat exchanger 60, at least a portion of the heat exchanged air may be sequentially pass through the second outlet 11*b* and the discharge panel 50 and be discharged back into the indoor space I.

For example, the discharge panel 50 may include the plurality of discharge holes 50*h* through which air flowing from the second outlet 11*b* is discharged. The plurality of discharge holes 50*h* formed in the discharge panel 50 may be formed to have a smaller size than the second discharge hole 11*b*.

An opening through which air discharged through the second outlet 11*b* is discharged may be formed in the discharge panel 50. The opening formed in the discharge panel 50 may be formed to have a larger size than each of the plurality of discharge holes 50*h* described above.

The discharge panel 50 may be coupled to housing 10. Particularly, the discharge panel 50 may be coupled to the front case 11. The discharge panel 50 may maintain a fixed position relative to housing 10.

The discharge panel 50 may be formed in a substantially flat plate shape. However, it is not limited thereto, and the discharge panel 50 may be formed in various shapes.

The air conditioner 3 may include a blade 20. The blade 20 may be provided to open or cover the opening of the discharge panel 50. The blade 20 may have a shape that approximately corresponds to the opening of the discharge panel 50.

At a position spaced apart from the second outlet 11*b*, the blade 20 may be provided to cover the opening of the discharge panel 50. The blade 20 may be arranged to be approximately parallel to the discharge panel 50 when covering the opening of the discharge panel 50.

The blade 20 may be provided to be rotatable with respect to the housing 10. Additionally, the blade 20 may be provided to be rotatable with respect to the discharge panel 50. The blade 20 may be coupled to housing 10.

The blade 20 may be provided to guide indoor air discharged through the opening of the discharge panel 50. The blade 20 may be provided to adjust a discharge direction of air discharged into the indoor space through the opening of the discharge panel 50.

In a state of covering the second outlet 11*b* or the opening of the discharge panel 50, the blade 20 may allow a portion of the air discharged from the second outlet 11*b* to be discharged. That is, after the indoor air, which is introduced into the housing 10 from the indoor space I (refer to FIG. 1) through the second inlet 11*a*, is heat exchanged with the second heat exchanger 60, at least a portion of the heat exchanged air may be sequentially pass through the second outlet 11*b* and the blade 20 and be discharged back into the indoor space I.

For example, the blade 20 may include a plurality of discharge holes 20*h* through which air flowing from the second outlet 11*b* is discharged. The plurality of discharge holes 20h formed in the blade 20 may be formed to allow each discharge hole 20h to have a smaller size than the second discharge hole 11b. In a state in which the blade 20 covers the second outlet 11b or the opening of the discharge panel 50, a portion of the air discharged from the second outlet 11b may be discharged through the plurality of discharge holes 20h of the blade 20.

The air conditioner 3 according to an embodiment of the disclosure may operate in a wind-free operation mode to implement a wind-free airflow. The wind-free operation mode may refer, for example, to a low-air volume operation mode in which air is discharged below a certain speed while preventing and/or reducing blowing directly to a user. When the air conditioner 3 operates in the wind-free operation mode, air that is heat exchanged with the heat exchanger 60 may be discharged through the plurality of discharge holes 50h of the discharge panel 50 and/or the plurality of discharge holes 20h of the blade 20. At this time, the blade 20 may be arranged to cover the opening of the discharge panel 50.

When the blade 20 is arranged to open the opening of the discharge panel 50, most of the air heat exchanged with the heat exchanger 60 may be discharged through the opening of the discharge panel 50.

The air conditioner 3 may include the first heat exchanger 40. The first heat exchanger 40 may be configured to exchange heat with outdoor air introduced through the first inlet 12a. The first heat exchanger 40 may be disposed inside the housing 10. The first heat exchanger 40 may be disposed on the first flow path P1. The first heat exchanger 40 may be arranged to face the first inlet 12a. The first heat exchanger 40 may be referred to as an 'outdoor heat exchanger' in that the heat exchanger exchanges heat with outdoor air.

The air conditioner 3 may include the second heat exchanger 60. The second heat exchanger 60 may be configured to exchange heat with indoor air introduced through the second inlet 11a. The second heat exchanger 60 may be disposed inside the housing 10. The second heat exchanger 60 may be disposed on the second flow path P2. At least a portion of the second heat exchanger 60 may be arranged to face the second inlet 11a. For example, the second heat exchanger 60 may be arranged to surround at least a portion of the second fan assembly 200. For example, the second heat exchanger 60 may be provided to cover at least a portion of the second fan assembly 200. The second heat exchanger 60 may also be referred to as an 'indoor heat exchanger' in that the heat exchanger exchanges heat with indoor air.

For example, the first heat exchanger 40 may be provided as a condenser, and the second heat exchanger 60 may be provided as an evaporator. At this time, the air conditioner 3 may be configured to cool the indoor space. However, it is not limited thereto. Alternatively, the first heat exchanger 40 may be provided as an evaporator, and the second heat exchanger 60 may be provided as a condenser. At this time, the air conditioner 3 may be configured to heat the indoor space.

The air conditioner 3 may include a drain pan 80. The drain pan 80 may be configured to collect condensed water generated in the second heat exchanger 60. The drain pan 80 may be provided to support the second heat exchanger 60. The drain pan 80 may be provided to support the second fan assembly 200. For example, the drain pan 80 may include a seating portion 81 on which a base 230 of the second fan assembly 200 is seated.

The air conditioner 3 may include a compressor 70. The compressor 70 may be configured to compress the refrigerant for the heat exchange operation by the first heat exchanger 40 and the second heat exchanger 60. The compressor 70 may be configured to compress the refrigerant to a high-temperature and high-pressure state. The refrigerant compressed in the compressor 70 may flow into the first heat exchanger 40 or the second heat exchanger 60.

For example, the compressor 70 may be disposed below the second fan assembly 200. For example, the compressor 70 may be disposed below the drain pan 80.

The air conditioner 3 may include a compressor cover 71. The compressor cover 71 may be provided to cover the compressor 70. The compressor cover 71 may prevent and/or reduce the compressor 70 from being exposed to the outside. The compressor cover 71 may be provided to protect the compressor 70.

The air conditioner 3 may include an expansion device. The expansion device may be configured to expand the refrigerant discharged from the first heat exchanger 40 or the refrigerant discharged from the second heat exchanger 60.

The air conditioner 3 may include a control box 90. The control box 90 may accommodate a printed circuit board on which various electronic components are mounted.

The air conditioner 3 may include a control panel 30. The control panel 30 may be arranged to obtain a user input. Further, the control panel 30 may be provided to display information about operation, status, various settings, indoor temperature and humidity, etc. of the air conditioner 3. The control panel 30 may be electrically connected to a controller of the air conditioner 3. For example, the control panel 30 may be disposed in front of the front case 11.

The air conditioner 3 may include the first fan assembly 100. The first fan assembly 100 may be configured to move outdoor air within the housing 10. The first fan assembly 100 may be configured to move outdoor air between the first inlet 12a and the first outlet 12b.

For example, a suction side 101 of the first fan assembly 100 may be provided to face the first inlet 12a. For example, a discharge side 102 of the first fan assembly 100 may be provided to face the first outlet 12b.

The first fan assembly 100 may include a first fan 110. For example, the first fan 110 may be arranged to face at least a portion of the first heat exchanger 40.

The first fan assembly 100 may include a first fan motor 120 for driving the first fan 110.

The first fan assembly 100 may include a first frame 130 provided to guide outdoor air. For example, the first frame 130 may extend along an extension direction of the first fan 110. For example, the first frame 130 may have a shape extending approximately in the vertical direction (Z direction).

The air conditioner 3 may include the second fan assembly 200. The second fan assembly 200 may be configured to move indoor air within the housing 10. The second fan assembly 200 may be configured to move indoor air between the second inlet 11a and the second outlet 11b.

For example, a suction side 201 of the second fan assembly 200 may be provided to face the second inlet 11a. For example, a discharge side 202 of the second fan assembly 200 may be provided to face the second outlet 11b. For example, the discharge side 202 of the second fan assembly 200 may be arranged to face the blade 20.

The second fan assembly 200 may include a second fan 210. For example, the second fan 210 may be arranged to face at least a portion of the second heat exchanger 60.

The second fan assembly 200 may include a second fan motor 220 for driving the second fan 210.

The second fan assembly 200 may include a second frame 240 provided to guide indoor air. For example, the second frame 240 may extend along an extension direction of the second fan 210. For example, the second frame 240 may have a shape extending approximately in the vertical direction (Z direction).

Referring to FIG. 7, the first frame 130 and the second frame 240 may be arranged to be in contact with each other. For example, the first frame 130 and the second frame 240 may be provided to allow the first fan 110 and the second fan 210 to be partitioned from each other. For example, a partition 132 of the first frame 130 and the second frame 240 may be provided to couple the first fan 110 and the second fan 210 to each other and to be partitioned from each other. For example, the first frame 130 and the second frame 240 may be provided to allow the first flow path P1 and the second flow path P2 to be partitioned from each other. As a result, indoor air and outdoor air may not mix inside the housing 10.

The configurations of the air conditioner 3 described above with reference to FIGS. 2 to 7 are only examples of configurations provided in the air conditioner according to the disclosure, and the air conditioner according to the disclosure may include various configurations.

Figure 8:
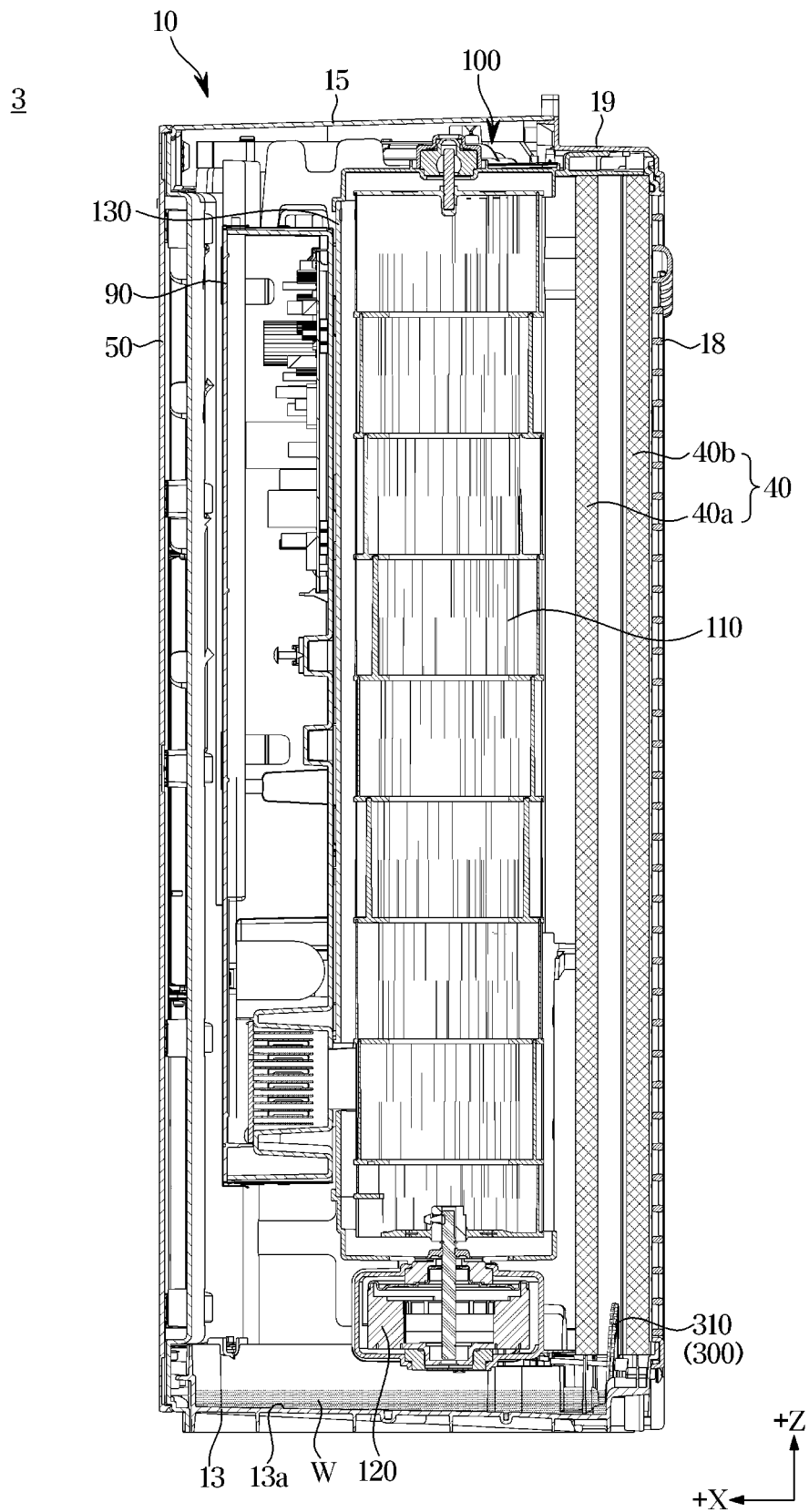
FIG. 8 is a side cross-sectional view of the air conditioner according to various embodiments.

FIG. 8 is a side cross-sectional view of the air conditioner according to various embodiments.

Referring to FIG. 8, the air conditioner 3 according to an embodiment of the disclosure may generate condensed water W in the process of performing the heat exchange operation through the refrigerant cycle.

For example, during a cooling operation of the air conditioner 3, a surface of the second heat exchanger 60, which exchanges heat with indoor air, may be cooled by a refrigerant. In the process of the heat exchange between air containing water vapor and the second heat exchanger 60, condensed water W generated by condensation of water vapor may form on the surface of the cooled second heat exchanger 60.

For example, the condensed water W condensed in the second heat exchanger 60 may be primarily collected in the drain pan 80 (refer to FIGS. 5 and 6) arranged below the second heat exchanger 60. Thereafter, the condensed water W collected in the drain pan 80 may be moved to the base 13 located below the drain pan 80 and collected. However, it is not limited thereto, and the condensed water W condensed in the second heat exchanger 60 may be moved to the base 13 and collected through various processes.

The base 13 may include a water collector 13a provided to collect condensed water W. The water collector 13a may be arranged on one surface of the base 13 facing an internal space of the housing 10.

For example, the water collector 13a may be formed to be inclined with respect to the front and rear direction X of the air conditioner 3. For example, the water collector 13a may be inclined with respect to the front and rear direction X of the air conditioner 3 to extend downward (-Z direction) as being directed to the rear (-X direction) of the air conditioner 3. Accordingly, the condensed water W in the water collector 13a may be moved to the rear (-X direction) of the air conditioner 3.

However, it is not limited thereto, and the water collector 13a may be formed parallel to the front and rear direction X of the air conditioner 3.

The above description is merely an example of the process in which water is collected in the base 13 in the air conditioner 3 according to an embodiment of the disclosure, but water may be collected in the base 13 through various processes. For example, when the air conditioner 3 is in the cooling operation, dew may form on various parts on the flow path, through which cold air passes, in a process in which the cold air generated by the second heat exchanger 40 is discharged through the second outlet 11b, the discharge panel 50, and the blade 20. Accordingly, the dew may be moved to the base 13 and collected by gravity. When the air conditioner 3 is installed in a window (structure A) as illustrated in FIG. 1, the rear panel 18 of the housing 10 may be exposed to the outdoor space O. Therefore, during rainy weather, there is a possibility that rainwater flows into the housing 10 from the outdoor space O through the first inlet 12a and the first outlet 12b formed in the rear panel 18. In this way, not only water generated inside the housing 10, but also water introduced from the outside of the housing 10 for various reasons may be collected in the base 13.

Hereinafter for convenience, a case in which condensed water generated by the second heat exchanger 60 is collected in the base 13 will be described as an example.

Figure 9:
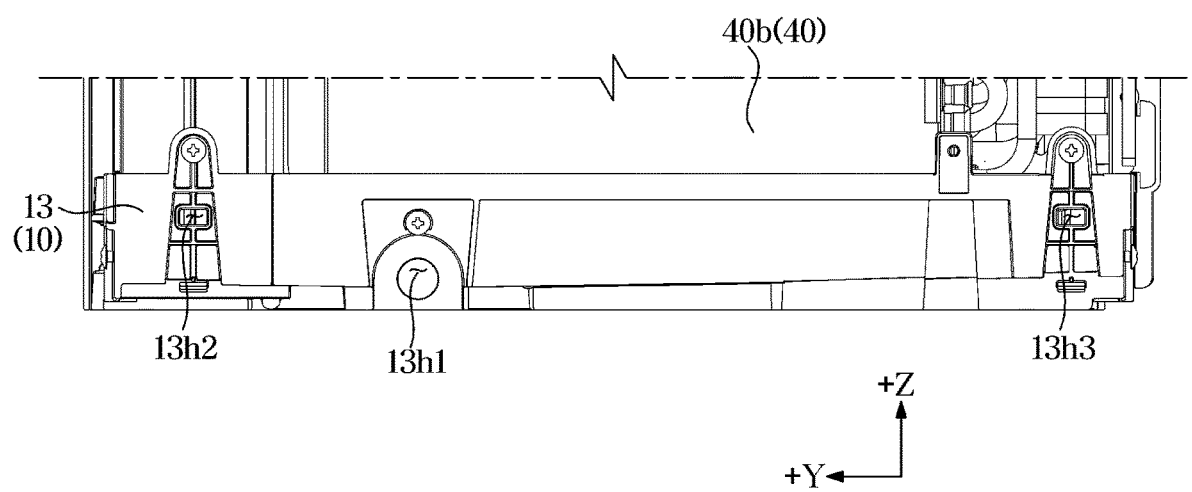
FIG. 9 is a diagram illustrating a rear view of a part of a configuration of the air conditioner according to various embodiments.

FIG. 9 is a diagram illustrating a rear view of a part of a configuration of the air conditioner according to various embodiments.

Referring to FIG. 9, the air conditioner 3 according to an embodiment of the disclosure may include one or more drain holes $13h1$, $13h2$ and $13h3$ provided to discharge condensed water collected in the base 13 to the outside of the housing 10.

For example, the air conditioner 3 may include a first drain hole $13h1$ provided to drain condensed water collected in the base 13 toward the rear of the housing 10 (-X direction). The first drain hole $13h1$ may be formed on a rear surface of the base 13. The 'rear surface' of the base 13 may refer to one surface of the base 13 facing the rear (-X direction), and when the air conditioner 3 is mounted on the structure A by the mounting assembly 2, the 'rear surface' of the base 13 may refer to one surface of the base 13 facing the outdoor space O (refer to FIG. 1).

The first drain hole $13h1$ may be formed to allow the internal space of the housing 10 to communicate with the external space of the housing 10, more particularly, the outdoor space O. The first drain hole $13h1$ may be disposed behind the water collector 13a.

As described above in FIG. 8, when the water collector 13a is inclined to extend downward (-Z direction) as being directed to the rear of the air conditioner 3 (-X direction), the condensed water collected in the water collector 13a may be moved to the rear (-X direction) and drained through the first drain hole $13h1$.

The air conditioner 3 may further include a second drain hole $13h2$ formed on the right side (+Y direction side) with respect to the first drain hole $13h1$, and a third drain hole $13h3$ formed on the left side (-Y direction side) with respect to the first drain hole $13h1$. The second drain hole $13h2$ and the third drain hole $13h3$ may be provided to allow condensed water collected in the base 13 to be drained to the outside of the housing 10.

The second drain hole $13h2$ and the third drain hole $13h3$ may be formed to allow the internal space of the housing 10 to communicate with the external space of the housing 10, more particularly, the outdoor space O. The second drain hole $13h2$ and the third drain hole $13h3$ may be disposed behind the water collector 13a.

For example, the second drain hole $13h2$ and the third drain hole $13h3$ may be arranged in the base 13. Particularly, the second drain hole $13h2$ and the third drain hole $13h3$ may be formed on the rear surface of the base 13.

For example, the second drain hole 13*h*2 may be formed above (+Z direction) the first drain hole 13*h*1. For example, the third drain hole 13*h*3 may be formed above (+Z direction) the first drain hole 13*h*1. However, the position of the second drain hole 13*h*2 and the third drain hole 13*h*3 are not limited thereto.

As shown in FIG. 1, during the process of mounting the air conditioner 3 on the mounting assembly 2, or during the process of mounting the mounting assembly 2 on the structure A, or after the installation of the air conditioner 3 is completed, the air conditioner 3 may be positioned at an angle with respect to the horizontal direction of the ground due to various reasons. In this case, when more than a certain amount of condensed water may be collected in the base 13, a level of the condensed water may reach the upper part of the base 13. When the level of the condensed water reaches the upper part of the base 13, the condensed water may overflow to the outside of the housing 10 and further flow into the indoor space I (refer to FIG. 1) that is a user's living space.

As described above, even when the air conditioner 3 is positioned at an angle with respect to the horizontal direction of the ground, the condensed water in the base 13 may be drained to the outdoor space O (refer to FIG. 1) through the second drain hole 13*h*2 or the third drain hole 13*h*3 because the base 13 is provided with the first drain hole 13*h*1, the second drain hole 13*h*2, and the third drain hole 13*h*3. For example, when the air conditioner 3 is positioned at an angle with respect to the ground to allow the right side (+Y direction) to be located lower (−Z direction) than the left side (−Y direction), the condensed water in the base 13 may be drained to the outdoor space O through the second drain hole 13*h*2 as well as the first drain hole 13*h*1. Therefore, the drainage efficiency may be increased. When the air conditioner 3 is positioned at an angle with respect to the ground to allow the left side (−Y direction) to be located lower (−Z direction) than the right side (+Y direction), the condensed water in the base 13 may be drained to the outdoor space O through the third drain hole 13*h*3 as well as the first drain hole 13*h*1. Therefore, the drainage efficiency may be increased The drain holes 13*h*1, 13*h*2, and 13*h*3 described above with reference to FIG. 9 are merely examples of drain holes provided to drain condensed water collected in the base to the outside of the housing in the air conditioner according to the disclosure, and it is not limited thereto.

Meanwhile, even when the condensed water collected in the base 13 of the air conditioner 3 is drained through the drain holes 13*h*1, 13*h*2, and 13*h*3 as described above, the drainage efficiency may not be sufficient just by draining water through the drain holes 13*h*1, 13*h*2, and 13*h*3. Further, it may be difficult to completely drain the remaining water depending on the location (height) of the drain holes 13*h*1, 13*h*2, and 13*h*3 with respect to the Z direction. Therefore, when the condensed water collected in the base 13 is not sufficiently drained, the remaining water may leak out of the housing 10 when, for example, a user removes the product from the mounting assembly 2 (refer to FIG. 1) or the structure A (refer to FIG. 1). Further, during the product storage process, scale or odor may be generated in the base 13.

In some cases, the first drain hole 13*h*1 may be opened or closed by a drain hole cover (not shown). When a user wants to drain condensed water collected in the base 13 in a state in which the air conditioner 3 is installed in the structure A by the mounting assembly 2, it may be required for the user to open the first drain hole 13*h*1 by directly removing the drain hole cover, and as the air conditioner 3 is installed on the window/window frame, it may be difficult for the user to open the first drain hole 13*h*1.

In order to ease the difficulties, the air conditioner 3 according to an embodiment of the disclosure may include a drainage device 300 or 300-1 configured to automatically drain condensed water collected in the base 13.

Hereinafter an example structure and function of the drainage devices 300 and 300-1 of the air conditioner 3 according to various will be described in greater detail below with reference to FIGS. 10, 11, 12, 13 and 14 (which may be referred to herein as FIGS. 10 to 14).

Figure 10:
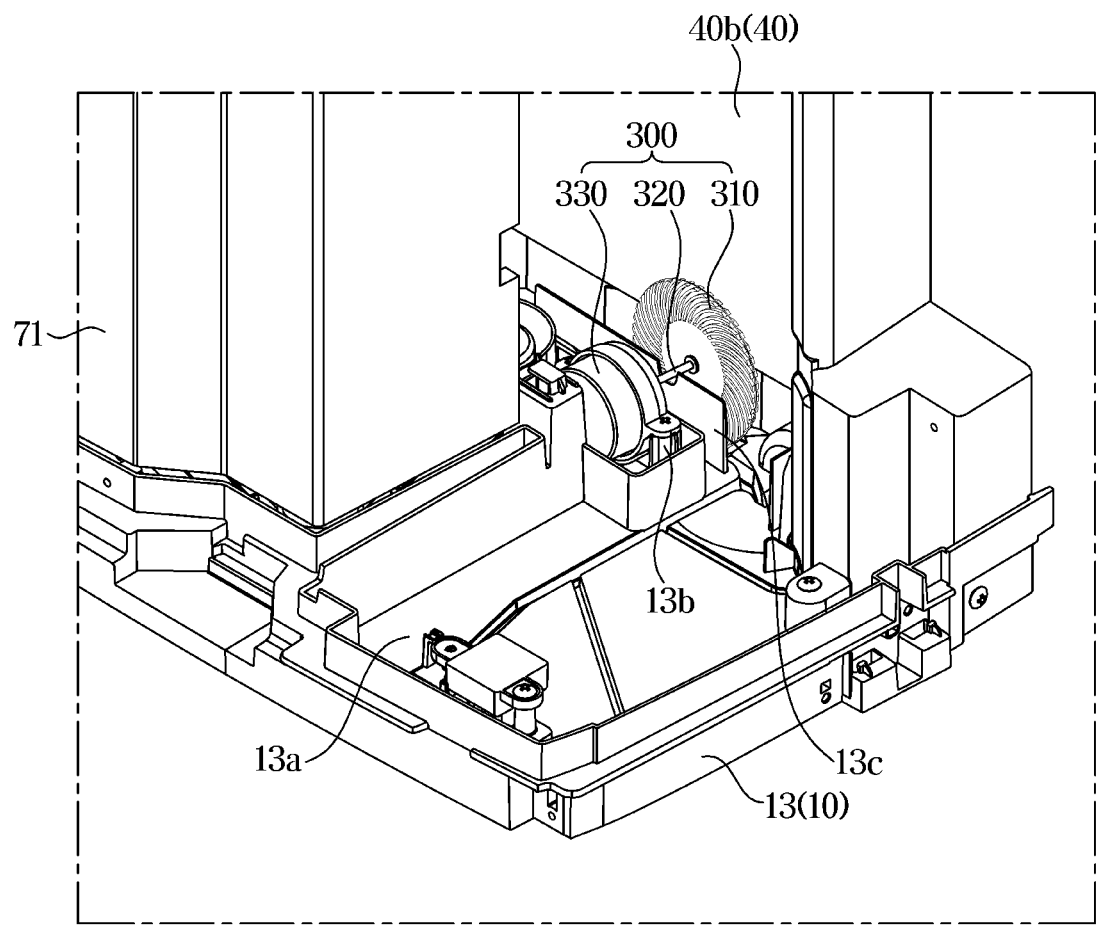
FIG. 10 is an exploded perspective view of a part of a configuration of the air conditioner according to various embodiments.
Figure 11:
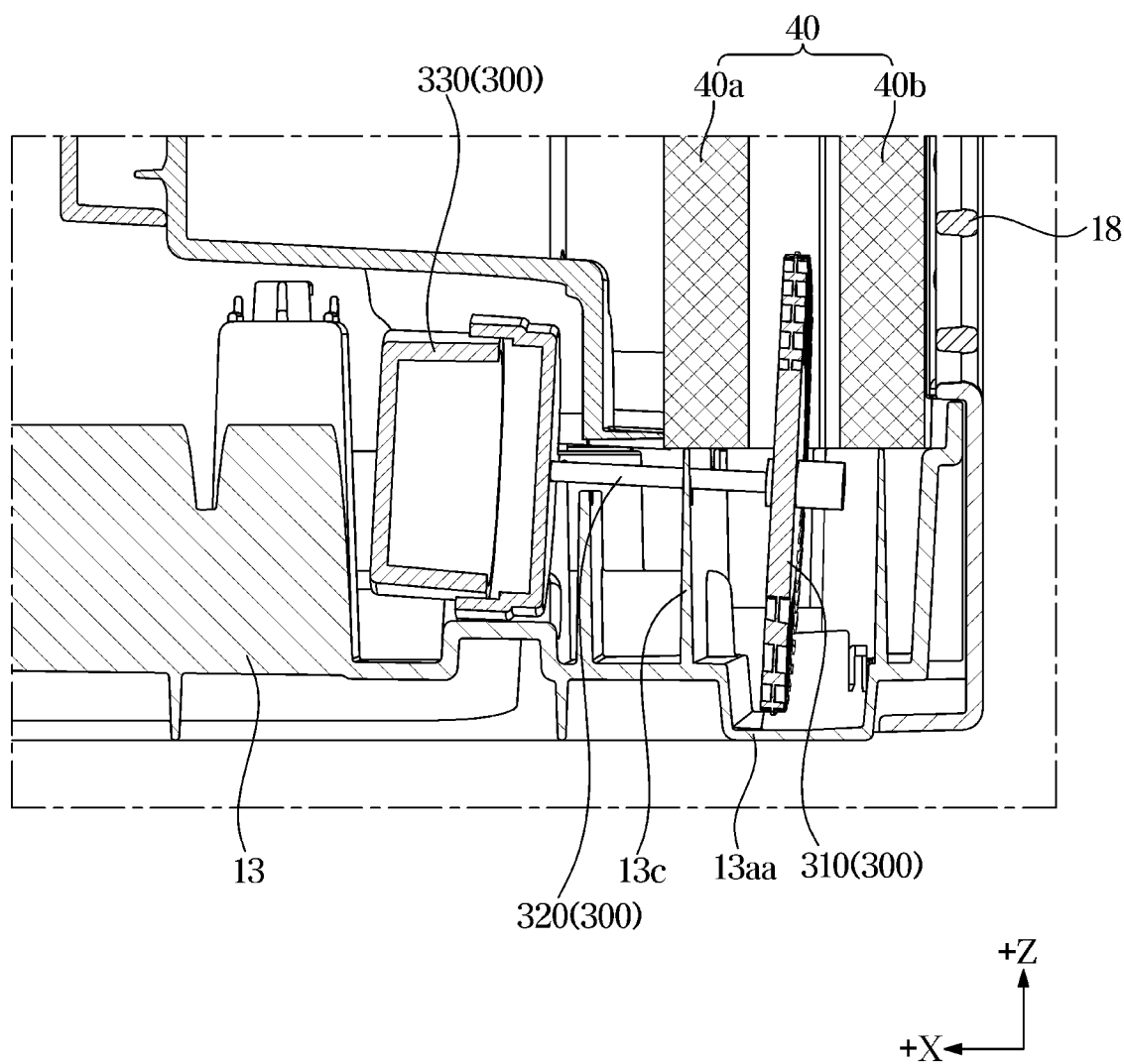
FIG. 11 is an enlarged cross-sectional view of a part of a configuration of the air conditioner according to various embodiments.
Figure 12:
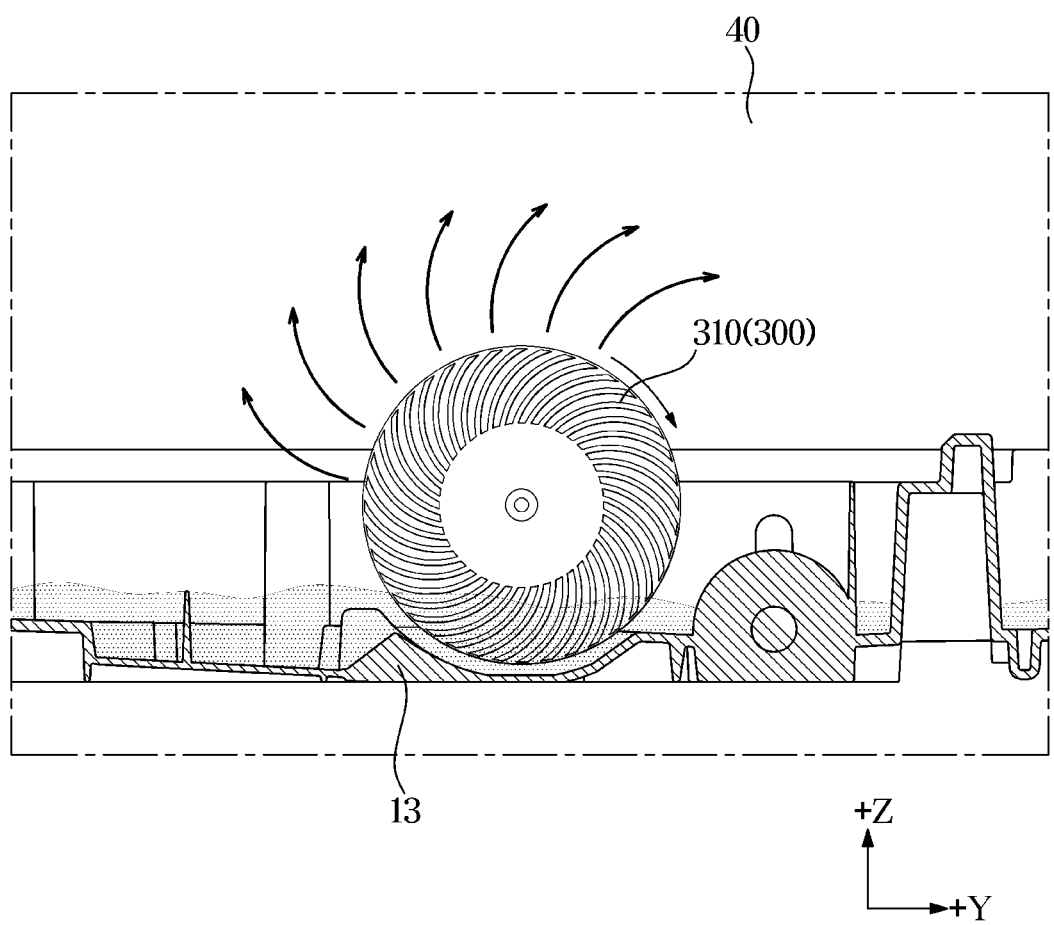
FIG. 12 is a diagram illustrating a state in which a drainage device operates in the air conditioner according to various embodiments.

FIG. 10 is an exploded perspective view of a part of a configuration of the air conditioner according to various embodiments. FIG. 11 is an enlarged cross-sectional view of a part of a configuration of the air conditioner according to various embodiments. FIG. 12 is a diagram illustrating a state in which a drainage device operates in the air conditioner according to various embodiments.

Referring to FIGS. 10, 11 and 12, the air conditioner 3 according to an embodiment of the disclosure may include the drainage device 300. The drainage device 300 may be configured to drain condensed water collected in the base 13. More particularly, the drainage device 300 may be configured to move condensed water collected in the base 13 to the first heat exchanger 40.

The drainage device 300 may be accommodated inside the housing 10. For example, the drainage device 300 may be supported by the base 13.

For example, the drainage device 300 may include a scattering wheel 310 configured to move the condensed water collected in the base 13 toward the first heat exchanger 40.

The scattering wheel 310 may be configured to be rotatable with respect to the housing 10. For example, the scattering wheel 310 may be configured to be rotatable with respect to the base 13, and as the scattering wheel rotates, the scattering wheel 310 may scatter the condensed water collected in the base 13 toward the first heat exchanger 40. The condensed water collected in the base 13 may be scattered by a part of the scattering wheel 310 (refer to FIG. 12) while the scattering wheel 310 rotates.

For example, the water collector 13*a* may be provided with a lower groove 13*aa* formed to have a relatively low height in the Z direction compared to other parts of the water collector 13*a*. The lower groove 13*aa* may be concavely formed on one side of the base 13 facing the internal space of the housing 10. The condensed water collected in the base 13 may tend to flow toward the lower groove 13*aa*.

The scattering wheel 310 may be located above the lower groove 13*aa*. As the scattering wheel 310 rotates, the scattering wheel 310 may scatter the condensed water collected in the lower groove 13*aa*. When the condensed collected in the lower groove 13*aa* is scattered by the scattering wheel 310 and moved to the first heat exchanger 40, the condensed water in other parts of the water collector 13*a* may be moved to the lower groove 13*aa*. Accordingly, the scattering wheel 310 may efficiently remove the condensed water collected in the base 13.

The scattering wheel 310 may be disposed adjacent to the first heat exchanger 40. As shown in FIGS. 10 to 12, the scattering wheel 310 may be disposed adjacent to a lower portion of the first heat exchanger 40.

For example, the first heat exchanger 40 may be arranged in multiple rows. As shown in FIG. 11, the first heat exchanger 40 may include a first row heat exchanger 40*a* and a second row heat exchanger 40*b*. At this time, the scattering wheel 310 may be disposed between the first row heat exchanger 40a and the second row heat exchanger 40b.

As the scattering wheel 310 is disposed adjacent to the first heat exchanger 40, the condensed water scattered by the scattering wheel 310 may be efficiently moved toward the first heat exchanger 40.

However, the arrangement of the scattering wheel 310 is not limited to the examples shown in FIGS. 10 to 12.

The drainage device 300 may include a wheel drive motor 330 configured to rotate the scattering wheel 310, and a rotating shaft 320 connecting the scattering wheel 310 and the wheel drive motor 330.

The wheel drive motor 330 may be configured to generate a driving force for the scattering wheel 310 to rotate. The driving force generated by the wheel drive motor 330 may be transmitted to the scattering wheel 310 through the rotating shaft 320. The wheel drive motor 330 may include various types of well-known drive motors.

Each component of the drainage device 300 may be supported on the base 13. For example, as shown in FIGS. 10 and 11, the base 13 may include a motor support 13b configured to support the wheel drive motor 330. The wheel drive motor 330 may be fixed to the motor support 13b in various ways. Further, the base 13 may include a wheel support 13c configured to rotatably support the scattering wheel 310 and the rotating shaft 320.

As shown in FIG. 11, the scattering wheel 310 may be arranged to be spaced apart from the lower groove 13aa by a predetermined distance with respect to the upside (+Z direction) to prevent and/or block the collision with the lower groove 13aa when the scattering wheel 310 rotates. The wheel support 13c may be designed to allow the scattering wheel 310, which is supported on the wheel support 13c, to be spaced apart from the lower groove 13aa by a predetermined distance with respect to the upside (+Z direction).

By the drainage device 300 including the above-described configuration, the condensed water collected in the base 13 may be moved to the first heat exchanger 40.

Figure 13:
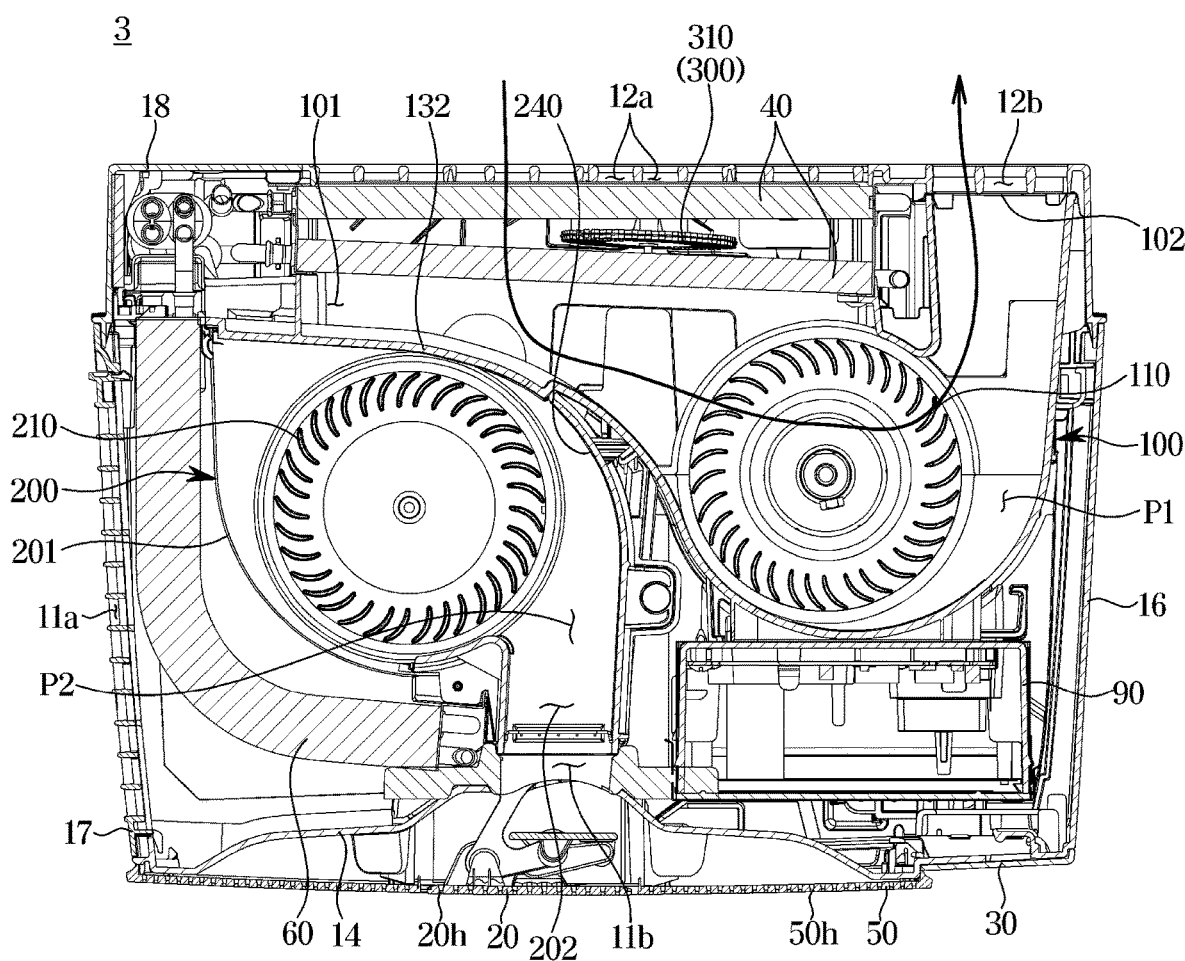
FIG. 13 is a diagram illustrating a state in which air flows when a first fan is driven in the air conditioner according to various embodiments.

FIG. 13 is a diagram illustrating a state in which air flows when a first fan is driven in the air conditioner according to various embodiments.

Referring to FIG. 13, using the first fan 110, the air conditioner 3 according to an embodiment of the disclosure may evaporate condensed water that is moved to the first heat exchanger 40 by the drainage device 300.

As shown in FIG. 13, as the first fan 110 rotates, outdoor air may flow into the first inlet 12a, flow along the first flow path P1, and then be discharged to the outdoor space O (refer to FIG. 1) through the first outlet 12b. That is, the first fan 110 may be configured to allow air to flow through the first heat exchanger 40.

The condensed water moved to the first heat exchanger 40 may be evaporated by the air flow by the first fan 110. By the air flow, the first fan 110 may evaporate condensed water moved toward the first heat exchanger 40.

Water vapor generated by evaporation of condensed water due to the air flow by the first fan 110 may flow along the first flow path P1 and be discharged to the outside of the housing 10 through the first outlet 12b.

As mentioned above, the air conditioner 3 according to an embodiment of the disclosure may remove condensed water collected in the base 13 using the drainage device 300 and the first fan 110.

Figure 14:
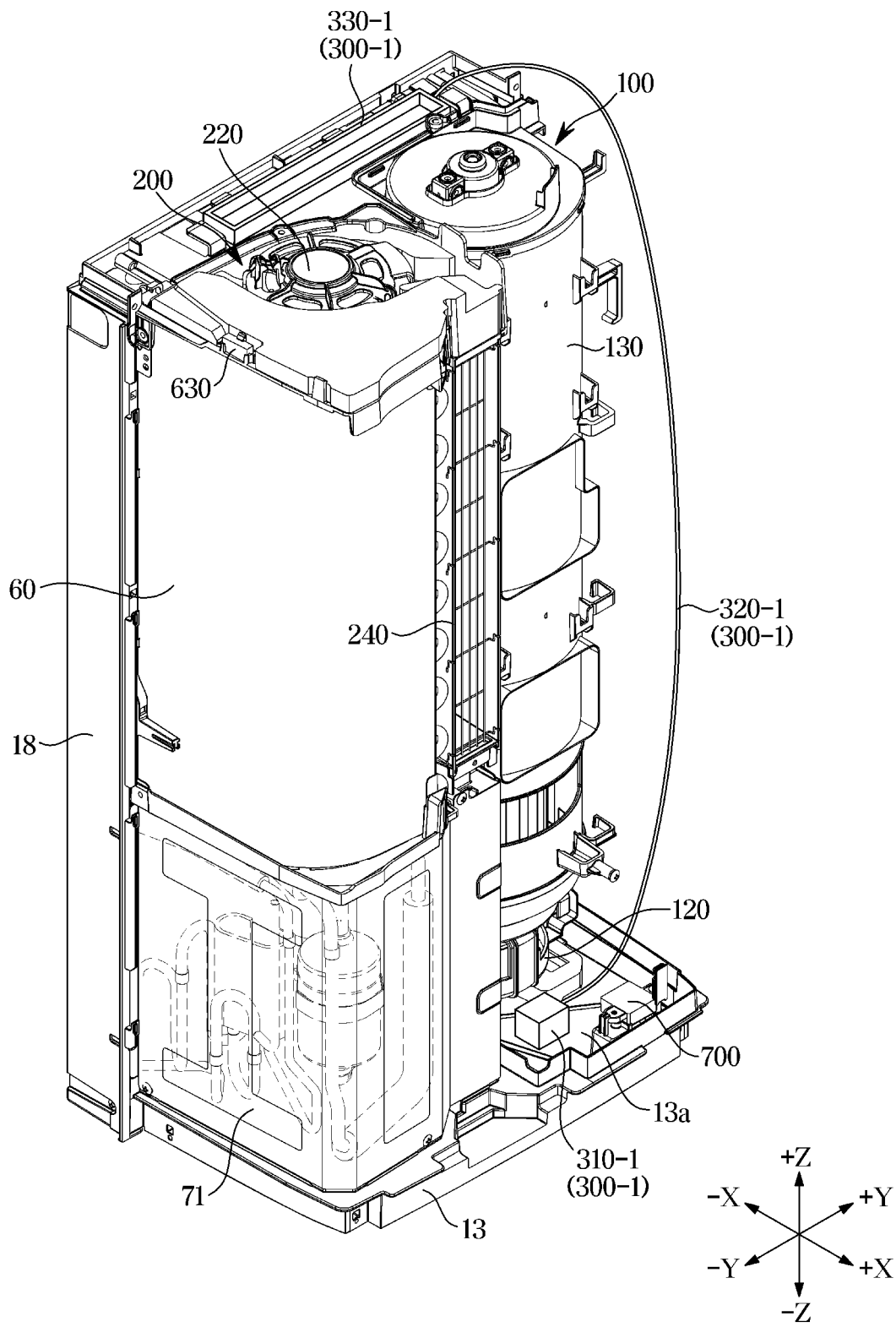
FIG. 14 is a perspective view illustrating an example of the drainage device in the air conditioner according to various embodiments.

FIG. 14 is a perspective view illustrating an example of the drainage device in the air conditioner according to various embodiments.

Referring to FIG. 14, the air conditioner 3 according to an embodiment of the disclosure may include a drainage device 300-1 that may have a different configuration than the drainage device 300 described with reference to FIGS. 10 to 12. In an embodiment of FIG. 14, the drainage device 300-1 may be configured to generate a pressure difference to move the water collected in the base 13 to the first heat exchanger 40.

For example, the drainage device 300-1 may include a pump 310-1 configured to generate a pressure difference. The pump 310-1 may be disposed in the water collector 13a of the base 13. The pump 310-1 may be provided to allow the condensed water collected in the base 13 to be moved upward (+Z direction) by a pressure difference. The pump 310-1 may be configured to generate a pressure difference that is sufficient to move the condensed water from the base 13 to the upper part of the first heat exchanger 40, and for example to a distributor 330-1, which will be described in greater detail below.

The drainage device 300-1 may include a hose 320-1 connecting the pump 310-1 and the distributor 330-1 which will be described in greater detail below. The hose 320-1 may be provided to deliver the condensed water from the pump 310-1 to the distributor 330-1. For example, the hose 320-1 may be disposed along an inner edge of the housing 10 to prevent and/or reduce the interference with components inside the housing 10.

The drainage device 300-1 may include the distributor 330-1 configured to distribute condensed water, which is delivered through the hose 320-1, to the surface of the first heat exchanger 40. For example, the distributor 330-1 may be disposed above the first heat exchanger 40. For example, the distributor 330-1 may include a plurality of holes (not shown) formed therein to face the upper portion of the first heat exchanger 40. The condensed water delivered to the distributor 330-1 may be discharged to the first heat exchanger 40 through the holes formed in the distributor 330-1. For example, the distributor 330-1 may be formed to have a length approximately corresponding to the length in the horizontal direction (Y direction) of the first heat exchanger 40 to allow the condensed water to be evenly distributed to the first heat exchanger 40.

By the drainage device 300-1 including the configurations, the condensed water collected in the base 13 may be moved to the first heat exchanger 40.

When the condensed water is moved to the first heat exchanger 40 by the drainage device 300-1, the condensed water may be evaporated and discharged to the outside of the housing 10 as the first fan 110 operates, as described above with reference to FIG. 13.

The drainage devices 300 and 300-1 described above with reference to FIGS. 10 to 14 are drainage devices that may be included in the air conditioner according to the disclosure and are merely an example of a drainage device configured to move collected condensed water toward the first heat exchanger. The air conditioner according to an embodiment may include a drainage device including various structures.

Figure 15:
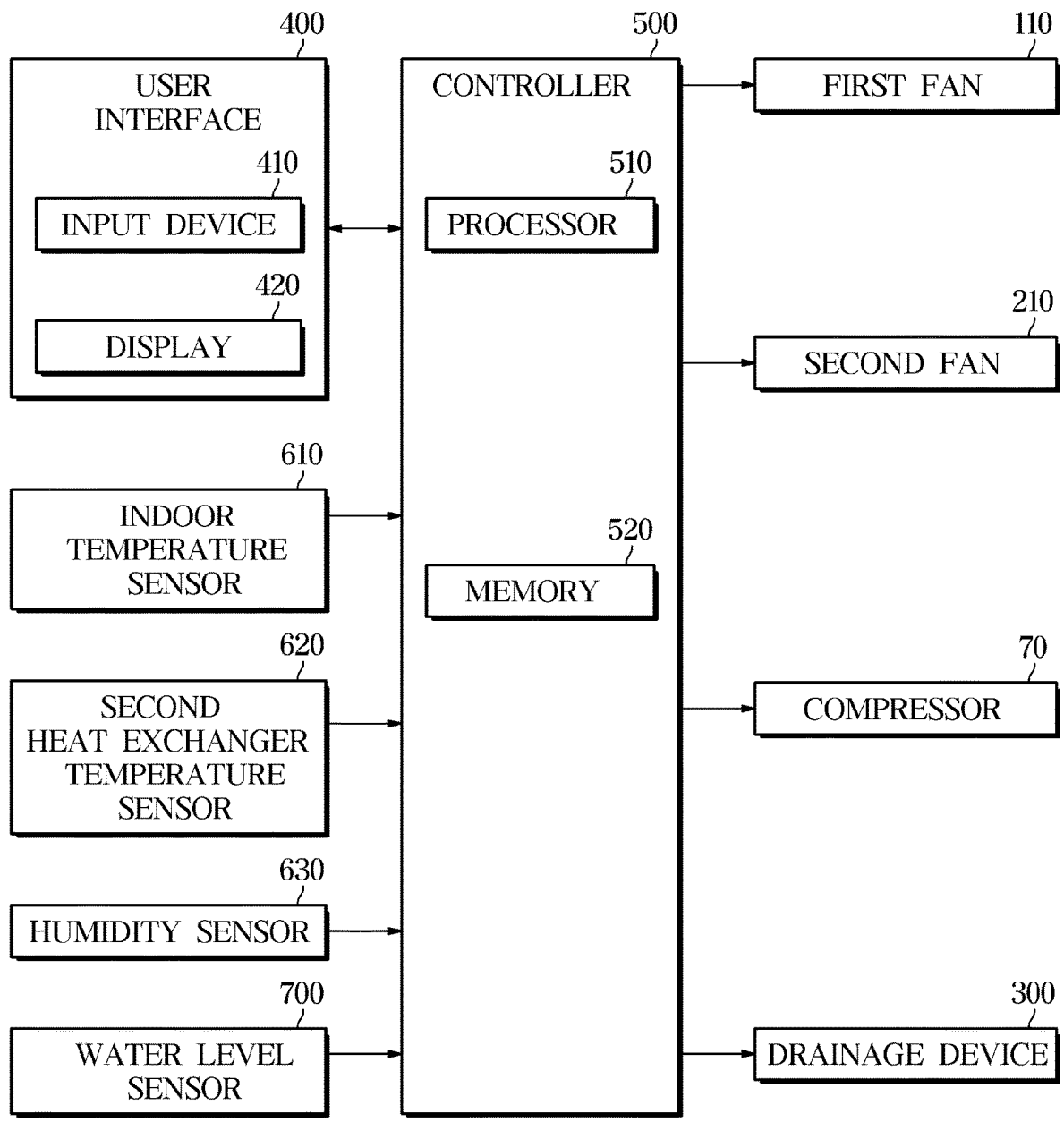
FIG. 15 is a block diagram illustrating an example configuration of the air conditioner according to various embodiments.

FIG. 15 is a block diagram illustrating an example configuration of the air conditioner according to various embodiments.

Referring to FIG. 15, the air conditioner 3 according to an embodiment of the disclosure may include a user interface (e.g., including interface circuitry) 400.

The user interface 400 may include an input device (e.g., including input circuitry) 410 for receiving a user input. The input device 410 may receive setting values related to the operation of the air conditioner 3 or various control commands from a user.

Types of user input that is obtained through the input device 410 may include turning on/off the power of the air conditioner 3, starting/stopping cooling or heating operation, setting target temperature, setting operation time, setting of wind direction, setting of driving mode (for example, wind-free mode or normal mode), etc.

The input device 410 may include various types of input devices such as a tact switch, a push switch, a slide switch, a toggle switch, a micro switch, or a touch switch.

The input device 410 may also include a type of input device (remote control, etc.) configured to remotely obtain a user input.

The input device 410 may receive a user input and output an electrical signal (voltage or current) corresponding to the user input to a controller 500. The controller 500 may receive a user input based on the output signal of the input device 410.

The user interface 400 may include a display 420 for displaying information related to the operation or state of the air conditioner 3.

Operation or state information of the air conditioner 3 that may be displayed by the display 420 may include type of operation mode, indoor temperature or humidity, target temperature, and information on the occurrence of various errors.

The display 420 may be provided to provide information to a user by including, for example, and without limitation, a light emitting diode (LED) panel, an organic light emitting diode (OLED) panel, a liquid crystal display (LCD) panel, or the like.

The display 420 may include a touch screen including a touch pad configured to detect a user's touch. The touch screen may display settings or control commands that a user can select, and may receive settings or control commands according to the user's touch input.

For example, components forming the user interface 400, such as the input device 410 and the display 420, may be implemented as the control panel 30 described above (refer to FIG. 2, etc.)

The air conditioner 3 may include an indoor temperature sensor 610. The indoor temperature sensor 610 may be configured to detect an indoor air temperature. The 'indoor air temperature' may refer to a temperature of the indoor space I (refer to FIG. 1) in which the air conditioner 3 is installed. The indoor temperature sensor 610 may output an electrical signal corresponding to the indoor air temperature.

The air conditioner 3 may include a second heat exchanger temperature sensor 620. The second heat exchanger temperature sensor 620 may be configured to detect a temperature of the second heat exchanger 60. Particularly, the second heat exchanger temperature sensor 620 may be configured to detect a surface temperature of the second heat exchanger 60. The second heat exchanger temperature sensor 620 may output an electrical signal corresponding to the temperature of the second heat exchanger 60.

The air conditioner 3 may include a humidity sensor 630. The humidity sensor 630 may be configured to detect an indoor air humidity. The 'indoor air humidity' may refer to a relative humidity in the air of the indoor space I (refer to FIG. 1) in which the air conditioner 3 is installed. The humidity sensor 630 may output an electrical signal corresponding to the indoor air humidity.

The air conditioner 3 may include a water level sensor 700. The water level sensor 700 may be configured to detect a level of water collected in the base 13. The 'level of water collected in the base 13' may refer to a remaining water level in the base 13 at the time of detection. The water level sensor 700 may output an electrical signal corresponding to the level of water collected in the base 13.

The air conditioner 3 may include the controller 500 configured to control various configurations of the air conditioner 3.

The controller 500 may include various control circuitry including, for example, a processor 510 including various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 510 may be configured to generate a control signal related to the operation of the air conditioner 3. The controller 500 may include a memory 520 configured to store a program, an application, an instruction and/or data for the operation of the air conditioner 3. The processor 510 and memory 520 may be implemented as separate semiconductor devices or as a single semiconductor device. Alternatively, the controller 500 may include a plurality of processors or a plurality of memories.

The processor 510 may include an operation circuit, a memory circuit, and/or a control circuit. The processor 510 may include one chip or a plurality of chips. Additionally, the processor 510 may include one core or a plurality of cores.

The processor 510 may be electrically connected to the memory 520. The processor 510 may process data and/or signals using a program provided from the memory 520, and may transmit control signals to each configuration of the air conditioner 3 based on the processing results. Each configuration of the air conditioner 3 may be operated based on a control signal from the processor 510.

The memory 520 may store various programs and data required for the control, and temporarily store temporary data generated during the control.

The memory 520 may include volatile memories such as Static Random Access Memory (S-RAM) and Dynamic Random Access Memory (D-RAM), and non-volatile memories such as Read Only Memory (ROM), and Erasable Programmable Read Only Memory (EPROM). The memory 520 may include one memory element or a plurality of memory elements.

The controller 500 may be electrically connected to the user interface 400. That is, the controller 500 may be electrically connected to the input device 410 to receive a user input obtained by the input device 410, and electrically connected to the display 420 to control the display 420 so as to allow the display 420 to display information related to the operation or the state of the air conditioner 3.

The controller 500 may be electrically connected to the indoor temperature sensor 610. The controller 500 may receive an electrical signal related to the indoor air temperature output from the indoor temperature sensor 610.

The controller 500 may be electrically connected to the second heat exchanger temperature sensor 620. The controller 500 may receive an electrical signal related to the temperature of the second heat exchanger 60 output from the second heat exchanger temperature sensor 620.

The controller 500 may be electrically connected to the humidity sensor 630. The controller 500 may receive an electrical signal related to the indoor air humidity output from the humidity sensor 630.

The controller 500 may be electrically connected to the water level sensor 700. The controller 500 may receive an electrical signal related to the level of water collected in the base 13 output from the water level sensor 700.

The controller 500 may be configured to control the first fan 110. For example, the controller 500 may be electrically connected to the first fan motor 120 and transmit a control command for rotating or stopping the first fan 110 or a control command related to a rotation speed of the first fan 110 to the first fan motor 120, thereby controlling the operation of the first fan 110. The first fan motor 120 may rotate the first fan 110 at a predetermined speed or stop the first fan 110 based on a control command received from the controller 500. Hereinafter for convenience of description, it will be described that the controller 500 controls the first fan 110.

The controller 500 may be configured to control the second fan 210. Particularly, the controller 500 may be electrically connected to the second fan motor 220 and transmit a control command for rotating or stopping the second fan 210 or a control command related to a rotation speed of the second fan 210 to the second fan motor 220, thereby controlling the second fan 210. The second fan motor 220 may rotate the second fan 210 at a predetermined speed or stop the second fan 210 based on a control command received from the controller 500. Hereinafter for convenience of description, it will be described that the controller 500 controls the second fan 210.

The controller 500 may be configured to control the compressor 70. The controller 500 may be electrically connected to the compressor 70 and transmit a control command to the compressor 70 to allow the compressor 70 to execute or stop the operation of compressing the refrigerant. The compressor 70 may execute or stop compressing the refrigerant based on a control command received from the controller 500.

The controller 500 may be configured to control the drainage device 300. The controller 500 may be electrically connected to the drainage device 300 and transmit a control command to the drainage device 300 to allow the drainage device 300 to execute or stop a drainage operation of moving the condensed water, which is collected in the base 13, to the first heat exchanger 40. The drainage device 300 may execute or stop the drainage operation based on a control command received from the controller 500.

The controller 500 may transmit a control command related to a drainage speed, at which the drainage device 300 moves the condensed water collected in the base 13 to the first heat exchanger 40, to the drainage device 300. The drainage device 300 may move the condensed water collected in the base 13 to the first heat exchanger 40 at a predetermined drainage speed based on a control command related to the drainage speed.

For example, the controller 500 may be electrically connected to the wheel drive motor 330. The controller 500 may control the wheel drive motor 330 to allow the scattering wheel 310 to rotate at a predetermined speed or to stop.

According to an embodiment as set forth above, for example, with reference to FIG. 14, the controller 500 may be configured to control the drainage device 300-1. The controller 500 may transmit a control command to the drainage device 300-1 to allow the drainage device 300-1 to execute or stop a drainage operation of moving the condensed water, which is collected in the base 13, to the first heat exchanger 40. The drainage device 300-1 may execute or stop the drainage operation based on a control command received from the controller 500.

For example, the controller 500 may be electrically connected to the pump 310-1. The controller 500 may control the pump 310-1 to deliver the water collected in the base 13 to the distributor 330-1 at a predetermined intensity/speed or to stop the operation.

The configuration of the air conditioner 3 described above with reference to FIG. 15 is merely an example of a part of the configuration of the air conditioner according to the disclosure, and it is not limited thereto.

Figure 16:
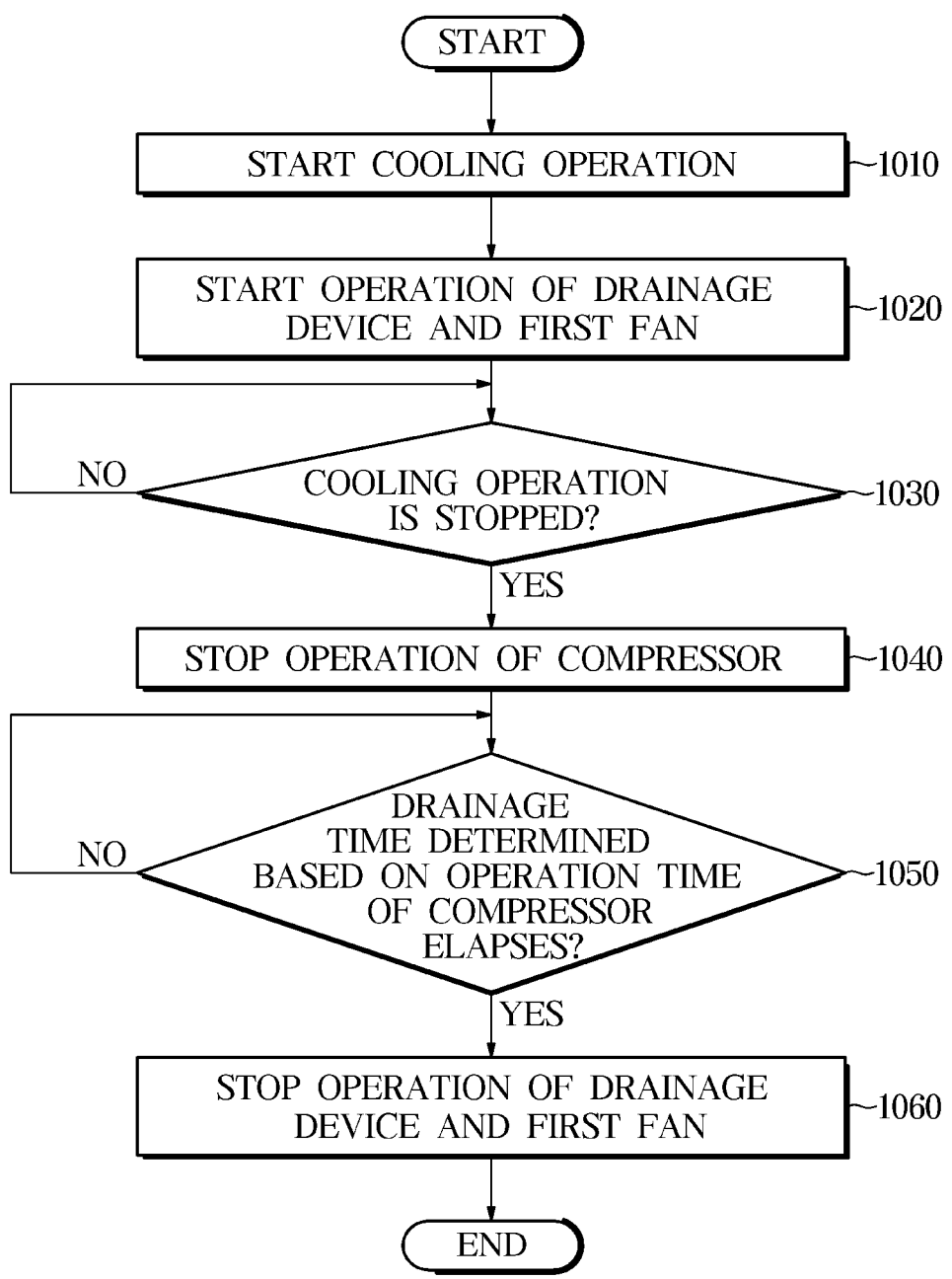
FIG. 16 is a flowchart illustrating an example method of controlling the air conditioner according to various embodiments.

FIG. 16 is a flowchart illustrating an example control method of the air conditioner according to various embodiments.

Referring to FIG. 16, after the cooling operation is stopped, the air conditioner 3 according to an embodiment of the disclosure may perform the drainage operation for a drainage time that is determined based on a period of time in which the cooling operation is performed.

For example, in the example control method of the air conditioner 3 according to an embodiment of the disclosure, the air conditioner 3 may start the cooling operation based on a predetermined condition (1010). For example, based on an electrical signal for the start of the cooling operation input through the input device 410, the controller 500 may control the compressor 70 to compress the refrigerant and control the second fan 210 to move air along the second flow path P2 (refer to FIGS. 7 and 13).

In addition, there may be the following non-limiting examples of predetermined conditions that serve as the basis for the air conditioner 3 to start the cooling operation. For example, the controller 500 may obtain setting information about a start reservation time to start the cooling operation through the input device 410, and start the cooling operation based on the elapse of the start reservation time. For example, the air conditioner 3 may include a communication circuitry that is configured to communicate with an external device such as an external server or a user's terminal device and is electrically connected to the controller 500, and the communication circuitry may receive a communication signal for starting the cooling operation from the server or the terminal device. In this case, the controller 500 may start the cooling operation based on the communication circuitry receiving a signal to start the cooling operation.

After the cooling operation starts, the operation of the drainage device 300 or 300-1 and the first fan 110 may start (1020). The controller 500 may control the drainage device 300 or 300-1 to move the condensed water collected in the base 13 to the first heat exchanger 40 based on the start of the cooling operation. Further, based on the start of the cooling operation, the controller 500 may control the first fan 110 to move air along the first flow path P1 passing through the first heat exchanger 40. Further, based on the start of the cooling operation, the controller 500 may control the second fan 210 to move air along the second flow path P1 passing through the second heat exchanger 60.

For example, based on the start of the cooling operation, the controller 500 may control the display 420 to display information that the cooling operation starts. For example, the air conditioner 3 may include a speaker configured to output a voice corresponding to the start/stop of the cooling operation, the change of operation settings, etc., and is electrically connected to the controller 500. Based on the start of the cooling operation, the controller 500 may control the speaker to output a voice corresponding to the start of the cooling operation. For example, based on the start of the cooling operation in a normal operation mode (an operation mode in which air is discharged through the opening of the discharge panel 50 at a position in which the blade 20 opens the opening of the discharge panel 50), the controller 500 may control the blade 20 to open the opening of the discharge panel 50.

The air conditioner 3 may stop the cooling operation based on the predetermined conditions. For example, the controller 500 may control the compressor 70 and the second fan 210 to stop the operation based on an electrical signal for stopping the cooling operation that is input through the input device 410.

In addition, there may be the following non-limiting examples of the predetermined conditions that serve as the basis for the air conditioner 3 to stop the cooling operation. For example, the controller 500 may obtain setting information about a stop reservation time for stopping the cooling operation through the input device 410, and may stop the cooling operation based on the elapse of the stop reservation time. For example, the air conditioner 3 may include communication circuitry configured to communicate with an external device such as an external server or a user's terminal device and is electrically connected to the controller 500, and the communication circuitry may receive a signal for stopping the cooling operation from the server or the terminal device. In this case, the controller 500 may stop the cooling operation based on the communication circuitry receiving the signal for stopping the cooling operation.

Based on the stop of the cooling operation (yes in 1030), the operation of the compressor 70 may be stopped (1040). Additionally, the operation of the second fan 210 may be stopped based on the stop of the cooling operation.

For example, based on the stop of the cooling operation, the controller 500 may control the display 420 to display information that the cooling operation is stopped. For example, based on the stop of the cooling operation, the controller 500 may control the speaker to output a voice corresponding to the stop of the cooling operation. For example, based on the stop of the cooling operation in the normal operation mode (the operation mode in which air is discharged through the opening of the discharge panel 50 at the position in which the blade 20 opens the opening of the discharge panel 50), the controller 500 may control the blade 20 to cover the opening of the discharge panel 50.

Based on the stop of the cooling operation, determining a drainage time, for which the drainage device 300 or 300-1 and the first fan 110 each continue to operate, may be performed. From a time on which the cooling operation is stopped, the drainage device 300 or 300-1 and the first fan 110 may each operate for a determined drainage time.

For example, based on the stop of the operation of the compressor 70, determining the drainage time, for which the drainage device 300 or 300-1 and the first fan 110 each continue to operate, may be performed. For example, determining the drainage time may be performed based on the stop of the operation of the second fan 210. For example, determining the drainage time may be performed based on the controller 500 receiving a signal for stopping the cooling operation through the input device 410. For example, determining the drainage time may be performed based on the communication circuitry of the air conditioner 3 receiving a communication signal for stopping the cooling operation from the server or the user's terminal device. For example determining the drainage time may be performed based on the elapse of the stop reservation time for stopping the cooling operation. For example, determining the drainage time may be performed based on the display 420 displaying information that the cooling operation is stopped. For example, determining the drainage time may be performed based on the speaker outputting a voice corresponding to the stop of the cooling operation. For example, determining the drainage time may be performed based on the blade 20 covering the opening of the discharge panel 50 after the air conditioner 3 stops the cooling operation in the normal operation mode.

For example, the drainage time may be determined based on a period of time for which the cooling operation is performed. For example, the drainage time may be determined based on an operation time for which the compressor 70 is operated. The controller 500 may determine the drainage time based on the operation time for which the compressor 70 is operated.

For example, determining the drainage time may be performed based on a period of time between a time on which the operation of the second fan 210 starts and a time on which the operation of the second fan 210 stops.

For example, the drainage time may be determined based on a period of time between a time on which the controller 500 of the air conditioner 3 receives a signal (including the start reservation time) to start the cooling operation from the input device 410, the server, or the user's terminal device, and a time on which the controller 500 of the air conditioner 3 receives a signal (including the stop reservation time) to stop the cooling operation from the input device 410, the server, or the user's terminal device.

For example, the drainage time may be determined based on a period of time between a time on which the display 420 displays information that the cooling operation starts and a time on which the display 420 displays information that the cooling operation stops.

For example, the drainage time may be determined based on a period of time between a time on which the speaker outputs the voice corresponding to the start of the cooling operation and a time on which the speaker outputs the voice corresponding to the stop of the cooling operation.

For example, when the air conditioner 3 performs the cooling operation in the normal operation mode, the drainage time may be determined based on a period of time between a time on which the blade 20 opens the opening of the discharge panel 50 and a time on which the blade 20 covers the opening of the discharge panel 50.

In addition, the drainage time may be determined based on a start time under various conditions in which the cooling operation is determined to start and a stop time under various conditions in which the cooling operation is determined to be stopped.

For example, the drainage device 300 or 300-1 and the first fan 110 may each operate during the drainage time from a time on which the operation of the compressor 70 is stopped.

For example, the drainage device 300 or 300-1 and the first fan 110 may each operate during the drainage time from a time on which the operation of the second fan 210 is stopped.

For example, the drainage device 300 or 300-1 and the first fan 110 may each operate during the drainage time from a time on which the controller 500 receives a signal for stopping the cooling operation from the input device 410, the server, or the user's terminal device.

For example, the drainage device 300 or 300-1 and the first fan 110 may each operate during the drainage time from a time on which the stop reservation time for stopping the cooling operation elapses.

For example, the drainage device 300 or 300-1 and the first fan 110 may each operate during the drainage time from a time on which the display 420 displays information that the cooling operation is stopped.

For example, the drainage device 300 or 300-1 and the first fan 110 may each operate during the drainage time from a time on which the speaker outputs a voice corresponding to the stop of the cooling operation.

For example, the drainage device 300 or 300-1 and the first fan 110 may each operate during the drainage time from a time on which the blade 20 covers the opening of the discharge panel 50 after the air conditioner 3 stops the cooling operation in the normal operation mode.

In addition, the drainage device 300 or 300-1 and the first fan 110 may continue to operate during the drainage time from the stop time under various conditions in which the cooling operation is determined to be stopped.

Hereinafter for convenience of description, it is described that a period of time, in which the cooling operation is performed, corresponds to a period of time, in which the compressor 70 is operated, and an example, in which the drainage device 300 or 300-1 and the first fan 110 each operates during the drainage time from a time on which the operation of the compressor 70 is stops, will be described in details.

An amount of water condensed in the second heat exchanger 60 may vary depending on the operation time in which the compressor 70 is operated, that is, the time in which the cooling operation is performed. For example, it may be assumed that as the operation time of the compressor 70 increases, the amount of condensed water in the second heat exchanger 60 may increase, and the amount of condensed water collected in the base 13 may increase. According to the amount of condensed water collected in the base 13, the drainage time required to sufficiently remove the condensed water may vary, and thus the operation time of the compressor 70 may serve as a relatively important factor in determining the drainage time.

The method of determining the drainage time based on the operation time of the compressor 70 may be set empirically or experimentally. For example, the drainage time corresponding to the operation time of the compressor 70 may be determined based on table information (refer to FIG. 22).

Information for determining the drainage time based on the operation time of the compressor 70 may be stored in the memory 520. The processor 510 may calculate the drainage time corresponding to the operation time of the compressor 70 based on information stored in the memory 520.

The control method of the air conditioner 3 according to an embodiment of the disclosure may include operating the drainage device 300 or 300-1 for moving condensed water collected in the base 13 to the first heat exchanger 40 for the determined drainage time after the stop of the operation of the compressor 70. Based on the stop of the cooling operation, the controller 500 may control the drainage device 300 or 300-1 for moving condensed water collected in the base 13 to the first heat exchanger 40 during the drainage time. In other words, based on the stop of the operation of the compressor 70, the controller 500 may control the drainage device 300 or 300-1 for moving condensed water collected in the base 13 to the first heat exchanger 40 during the drainage time.

In other words, in the control method of the air conditioner 3 according to an embodiment, the drainage device 300 may operate during the air conditioner 3 performs the cooling operation (1020) and also, the drainage device 300 may continue to operate for the determined drainage time even after the cooling operation is stopped (1020).

For example, based on the operation time of the compressor 70 being less than a reference operation time, the drainage device 300 or 300-1 may move the condensed water collected in the base 13 to the first heat exchanger 40 during a reference drainage time. Based on the operation time of the compressor 70 being less than the reference operation time, the controller 500 may control the drainage device 300 or 300-1 to move the condensed water collected in the base 13 to the first heat exchanger 40 during the reference drainage time.

In addition, based on the operation time of the compressor 70 being greater than or equal to the reference operation time, the drainage device 300 or 300-1 may move the condensed water collected in the base 13 to the first heat exchanger 40 during a drainage time that is increased from the reference drainage time. Based on the operation time of the compressor 70 being greater than or equal to the reference operation time, the controller 500 may control the drainage device 300 or 300-1 to move the condensed water collected in the base 13 to the first heat exchanger 40 during the drainage time that is increased from the reference drainage time.

As mentioned above, according to an embodiment, when the operation time of the compressor 70 increases, the drainage time for the drainage device 300 or 300-1 to operate may increase.

For example, based on the stop of the operation of the compressor 70, the controller 500 may control the wheel drive motor 330 to allow the scattering wheel 310 to rotate during the drainage time.

For example, based on the stop of the operation of the compressor 70, the controller 500 may control the pump 310-1 to move the condensed water to the distributor 330-1 during the drainage time.

Additionally, the control method of the air conditioner 3 may include operating the first fan 110 to move air for a determined drainage time after the operation of the compressor 70 is stopped. Based on the stop of the cooling operation, the controller 500 may control the first fan 110 to move air during the drainage time. In other words, based on the stop of the operation of the compressor 70, the controller 500 may control the first fan 110 to move air during the drainage time.

In other words, in the control method of the air conditioner 3 according to an embodiment, the first fan 110 may operate not only while the air conditioner 3 performs the cooling operation, but also after the cooling operation is stopped, the first fan 110 may continue to operate for the determined drainage time.

For example, based on the operation time of the compressor 70 being less than the reference operation time, the first fan 110 may move air during the reference drainage time. The controller 500 may control the first fan 110 to move air based on the operation time of the compressor 70 being less than the reference operation time.

Further, based on the operation time of the compressor 70 being greater than or equal to the reference operation time, the first fan 110 may move air during a drainage time that is increased from the reference drainage time. Based on the operation time of the compressor 70 being greater than or equal to the reference operation time, the controller 500 may control the first fan 110 to move air during the drainage time that is increased from the reference drainage time.

As mentioned above, according to an embodiment, when the operation time of the compressor 70 increases, the drainage time for the first fan 110 to operate may increase.

The drainage device 300 or 300-1 and the first fan 110 may each continue to operate until the drainage time determined based on the operation time of the compressor 70 elapses (no in 1050). Thereafter, based on the elapse of the drainage time determined based on the operation time of the compressor 70 (yes in 1050), the operation of the drainage device 300 or 300-1 and the first fan 110 may be stopped (1060). For example, the controller 500 may control the drainage device 300 or 300-1 and the first fan 110 to stop based on the elapse of the drainage time after the operation of the compressor 70 is stopped.

According to an embodiment, a drainage time of the drainage devices 300, and 300-1 (a time for the drainage device 300 and 300-1 to operate additionally after the operation of the compressor 70 is stopped) and a drainage time of the first fan 110 (a time for the first fan 110 to operate additionally after the operation of the compressor 70 is stopped) may be determined to be approximately the same. Accordingly, when the determined drainage time elapses, the operation of the drainage device 300 or 300-1 and the first fan 110 may be stopped almost simultaneously.

However, according to an embodiment, the drainage time of the drainage device 300 or 300-1 and the drainage time of the first fan 110 may be determined differently, and the operation of the drainage device 300 or 300-1 and the first fan 110 may be determined to stop at different times. For example, the operation of the drainage device 300 or 300-1 may be stopped first and the operation of the first fan 110 may be stopped after a predetermined time elapses.

By the control method of the air conditioner 3, it is possible to effectively remove the condensed water collected in the base 13 using the drainage device 300 or 300-1 and the first fan 110 after the cooling operation of the air conditioner 3 is stopped.

Figure 17:
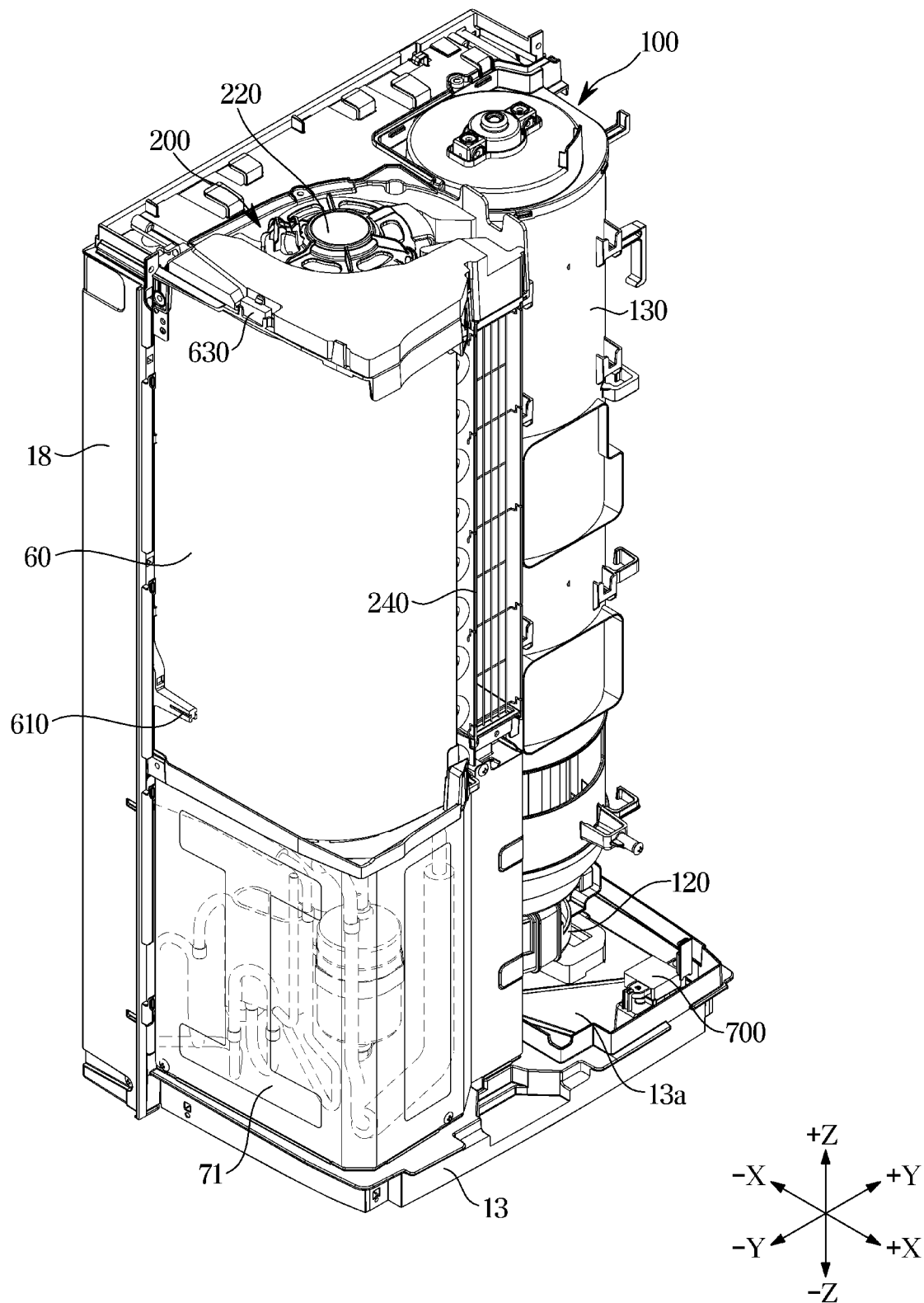
FIG. 17 is a perspective view illustrating a part of a configuration of the air conditioner according to various embodiments.

FIG. 17 is a perspective view illustrating a part of a configuration of the air conditioner according to various embodiments.

Referring to FIG. 17, the air conditioner 3 according to an embodiment of the disclosure may include the indoor temperature sensor 610 configured to detect the indoor air temperature. The functions and operations of the indoor temperature sensor 610 are substantially the same as those described above with reference to FIG. 15.

For example, the indoor temperature sensor 610 may be disposed inside the housing 10, but may be disposed adjacent to the outside of the housing 10. The indoor temperature sensor 610 may be disposed on the second flow path P2. For example, the indoor temperature sensor 610 may be disposed between the second heat exchanger 60 and the second inlet 11*a*. Accordingly, before indoor air, which is introduced through the second inlet 11*a* from the indoor space I (refer to FIG. 1), passes through the second heat exchanger 60, the indoor temperature sensor 610 may detect the indoor air temperature, and thus a detection accuracy of the indoor temperature sensor 610 may be improved.

Further, the air conditioner 3 according to an embodiment of the disclosure may include the humidity sensor 630 configured to detect the humidity of indoor air. The function and operation of the humidity sensor 630 are substantially the same as described above with reference to FIG. 15.

For example, the humidity sensor 630 may be disposed inside the housing 10, but may be disposed adjacent to the outside of the housing 10. The humidity sensor 630 may be disposed outside the second flow path P2. For example, as shown in FIG. 17, the humidity sensor 630 may be disposed above the second heat exchanger 60 (and the second inlet 11*a*). Accordingly, the humidity sensor 630 may prevent and/or reduce the detection of humidity from being affected by the wind flowing along the second flow path P2 when the second fan 210 is driven, and the detection accuracy of the humidity sensor 630 may be improved.

Additionally, as described above with reference to FIG. 15, the air conditioner 3 according to an embodiment of the disclosure may include the second heat exchanger temperature sensor 620. The second heat exchanger temperature sensor 620 may be disposed adjacent to the surface of the second heat exchanger 60. For example, the second heat exchanger temperature sensor 620 may be disposed inside the housing 10 rather than the second heat exchanger 60 and may be arranged to be in contact with one surface of the second heat exchanger 60. Accordingly, the second heat exchanger temperature sensor 620 may detect the surface temperature of the second heat exchanger 60, which is distinct from the room temperature, and the detection accuracy of the temperature of the second heat exchanger 60 may be improved.

The description described above with reference to FIG. 17 is only an example of the positions in which the indoor temperature sensor 610, the second heat exchanger sensor 620, and the humidity sensor 630 are each disposed, and the disclosure is not limited thereto.

Figure 18:
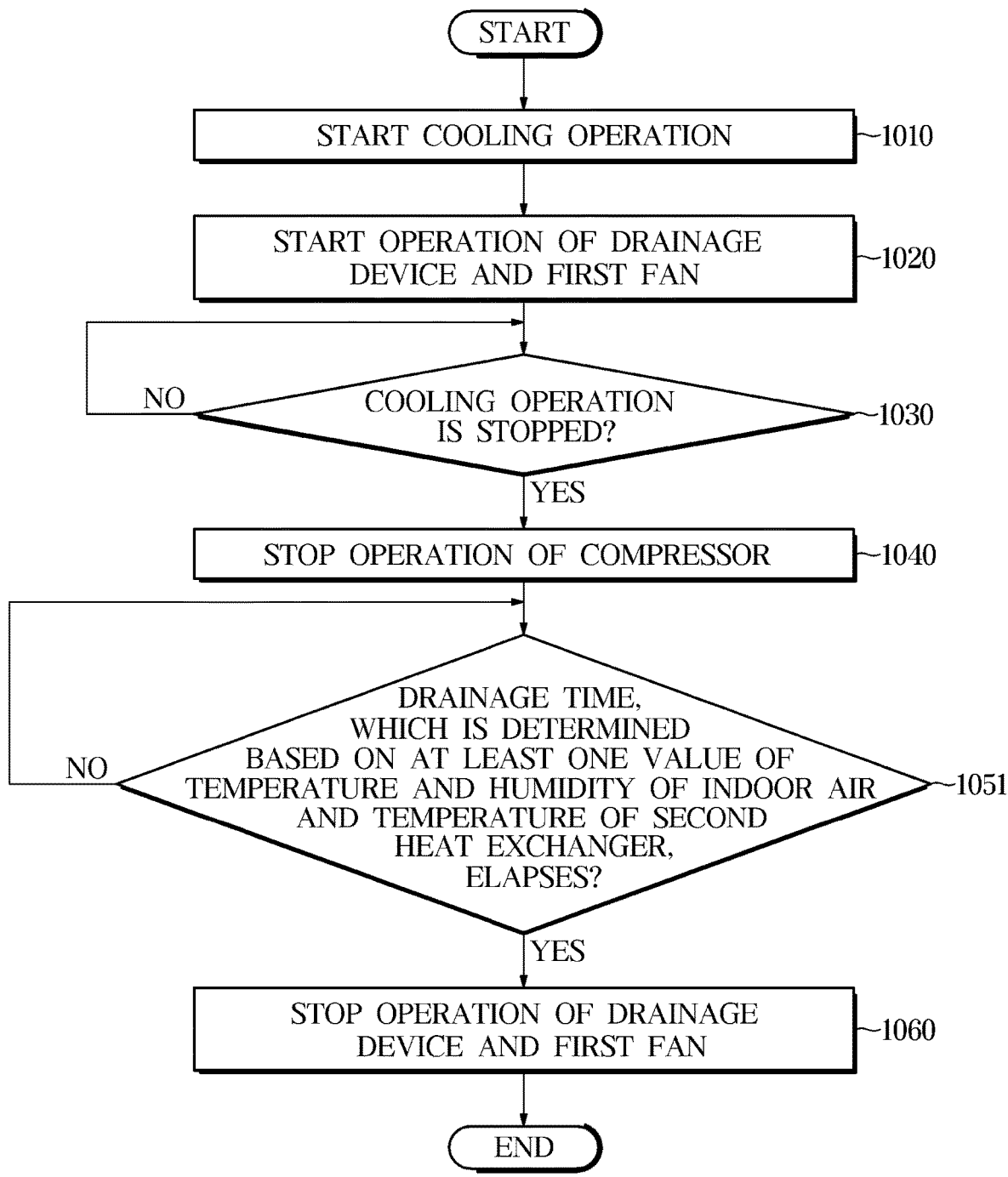
FIG. 18 is a flowchart illustrating an example method of controlling the air conditioner according to various embodiments.

FIG. 18 is a flowchart illustrating an example method of controlling the air conditioner according to various embodiments.

In describing the control method of the air conditioner 3 according to an embodiment of the disclosure with reference to FIG. 18, the same reference numerals may be assigned to the same operations as the control method of the air conditioner 3 described with reference to FIG. 16, and descriptions thereof may not be repeated here.

In FIG. 18, in the control method of the air conditioner 3, a method of determining the drainage time for the drainage device 300 or 300-1 and the first fan 110 to operate, from a time on which the operation of the compressor 70 is stopped will be described.

Referring to FIG. 18, after the operation of the compressor 70 is stopped, the air conditioner 3 according to an embodiment of the disclosure may perform the drainage operation during the drainage time that is determined based on the operation time of the compressor 70 and one or more values of a temperature of indoor air, a humidity of indoor air, and a temperature of the second heat exchanger 60.

For example, the control method of the air conditioner 3 according to an embodiment of the disclosure may include detecting at least one physical quantity of the temperature of the indoor air, the humidity of the indoor air, and the temperature of the second heat exchanger.

For example, as described above, the indoor temperature sensor 610 may detect the temperature of the indoor air. For example, as described above, the second heat exchanger sensor 620 may detect the temperature of the second heat exchanger 60. For example, as described above, the humidity sensor 630 may detect the humidity of the indoor air.

The control method of the air conditioner 3 may include determining a drainage time based on the operation time of the compressor 70 and at least one physical quantity of the temperature of the indoor air, the humidity of the indoor air, and the temperature of the second heat exchanger.

For example, the controller 500 may determine the drainage time based on the operation time of the compressor 70 and the temperature of the indoor air.

For example, the controller 500 may determine the drainage time based on the operation time of the compressor 70 and the temperature of the second heat exchanger 60.

For example, the controller 500 may determine the drainage time based on the operation time of the compressor 70 and the temperature difference between the temperature of the indoor air and the second heat exchanger 60.

For example, the controller 500 may determine the drainage time based on the operation time of the compressor 70 and the humidity of the indoor air.

The method of determining the drainage time based on the operation time of the compressor 70 and at least one physical quantity of the temperature of the indoor air, the humidity of the indoor air, or the temperature of the second heat exchanger 60 may be set empirically or experimentally. For example, the drainage time corresponding to the operation time of the compressor 70 and at least one physical quantity of the temperature of the indoor air, the humidity of the indoor air, or the temperature of the second heat exchanger 60 may be determined based on the table information (refer to FIG. 22).

Information for determining the drainage time based on the operation time of the compressor 70 and at least one physical quantity of the temperature of the indoor air, the humidity of the indoor air, or the temperature of the second heat exchanger 60 may be stored in the memory 520. Based on the information stored in the memory 520, the processor 510 may calculate the drainage time corresponding to the operation time of the compressor 70 and at least one physical quantity of the temperature of the indoor air, the humidity of the indoor air, or the temperature of the second heat exchanger 60.

For example, the drainage time may be determined based on at least one physical quantity of the temperature of the indoor air, the humidity of the indoor air, or the temperature of the second heat exchanger 60 that is detected on a time on which the operation of the compressor 70 is stopped, or immediately before or after the operation of the compressor 70 is stopped. For example, the controller 500 may determine the drainage time based on at least one of an output value of the indoor temperature sensor 610, an output value of the second heat exchanger temperature sensor 620, and an output value of the humidity sensor 630 that is detected on a time on which the operation of the compressor 70 is stopped, or immediately before or after the operation of the compressor 70 is stopped.

Accordingly, the drainage time may be determined by reflecting more meaningful information as the basis for determining the drainage time.

Based on the elapse of the drainage time determined based on the operation time of the compressor 70 and one or more physical quantities of the temperature of the indoor air, the humidity of the indoor air, and the temperature of the second heat exchanger 60 (yes in 1051), the operation of the drainage device 300 or 300-1 and the first fan 110 may be stopped (1060).

Through the control method of the air conditioner 3, it is possible to determine the drainage time based on more detailed conditions, and it is possible to more effectively remove the condensed water collected in the base 13 using the drainage device 300 or 300-1 and the first fan 110 after the cooling operation of the air conditioner 3 is stopped.

In the control method of the air conditioner 3 according to an embodiment, the drainage time for the drainage device 300 or 300-1 and the first fan 110 to operate may be determined based on the operation time of the compressor 70 and one physical quantity of the temperature of the indoor air, the humidity of the indoor air, or the temperature of the second heat exchanger 60 or based on the operation time of the compressor 70 and two of the physical quantities, or based on the operation time of the compressor 70 and all of the physical quantities. Further, the disclosure does not exclude that the drainage time is determined by additionally considering conditions other than the physical quantities mentioned above.

Hereinafter an embodiment in which the drainage time is determined based on the operation time of the compressor 70 and physical quantities of the temperature of the indoor air, the humidity of the indoor air, or the temperature of the second heat exchanger 60 will be described in greater detail below with reference to FIGS. 19, 20, 21 and 22 (which may be referred to herein as FIGS. 19 to 22).

Figure 19:
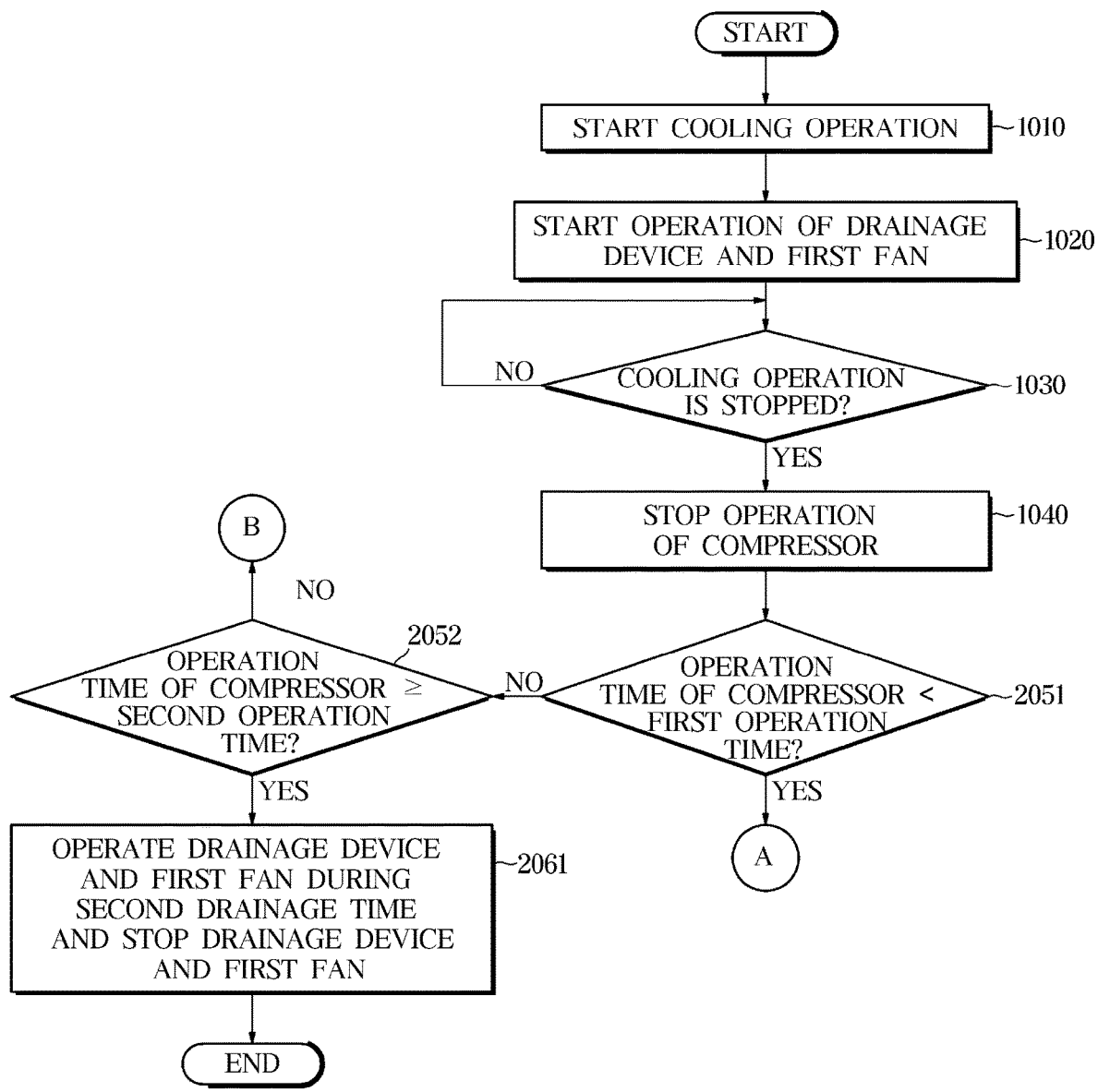
FIG. 19 is a flowchart illustrating an example method of controlling the air conditioner according to various embodiments.
Figure 20:
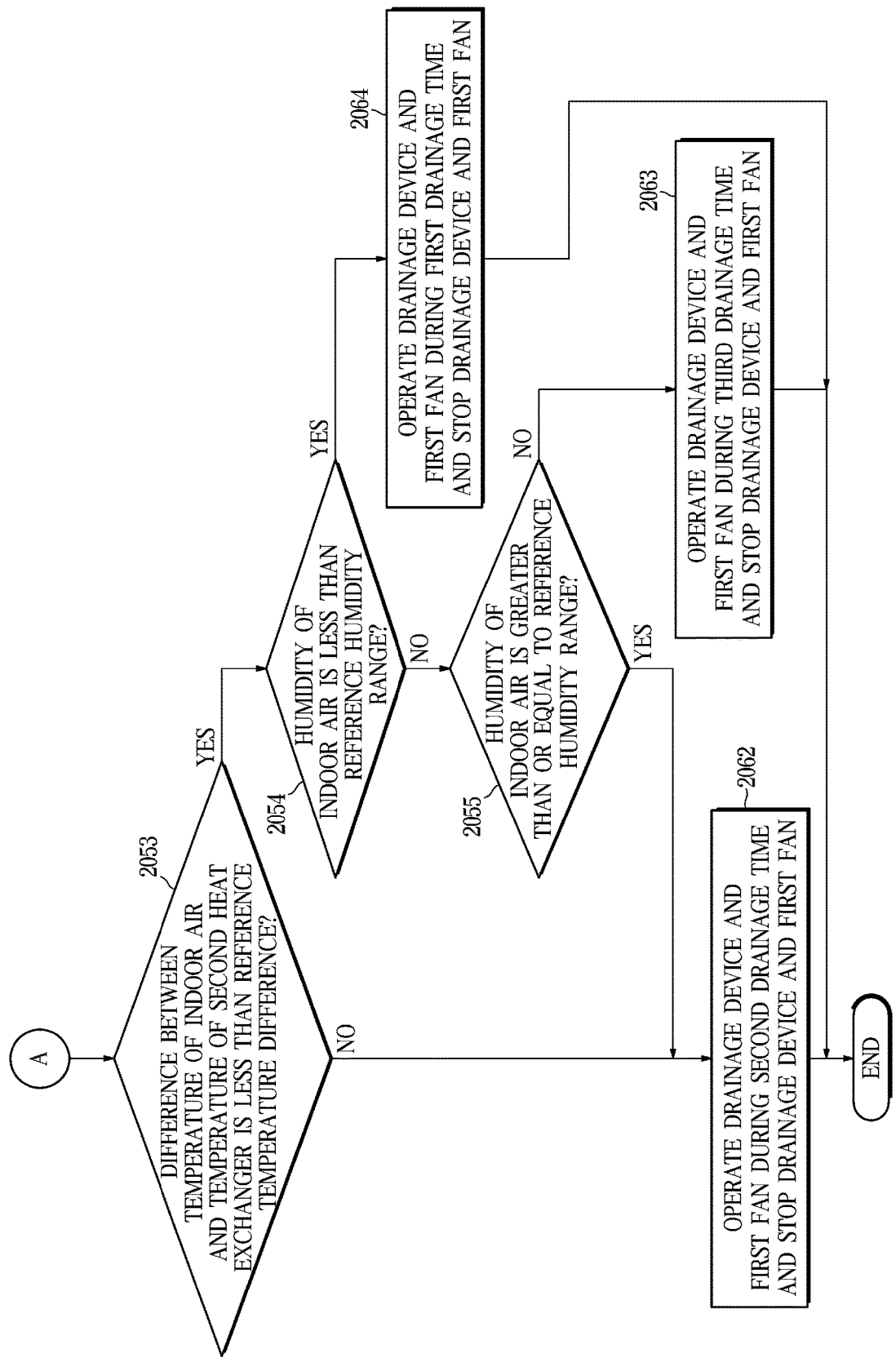
FIG. 20 is a flowchart continuing the example method of controlling the air conditioner according to FIG. 19 according to various embodiments.
Figure 21:
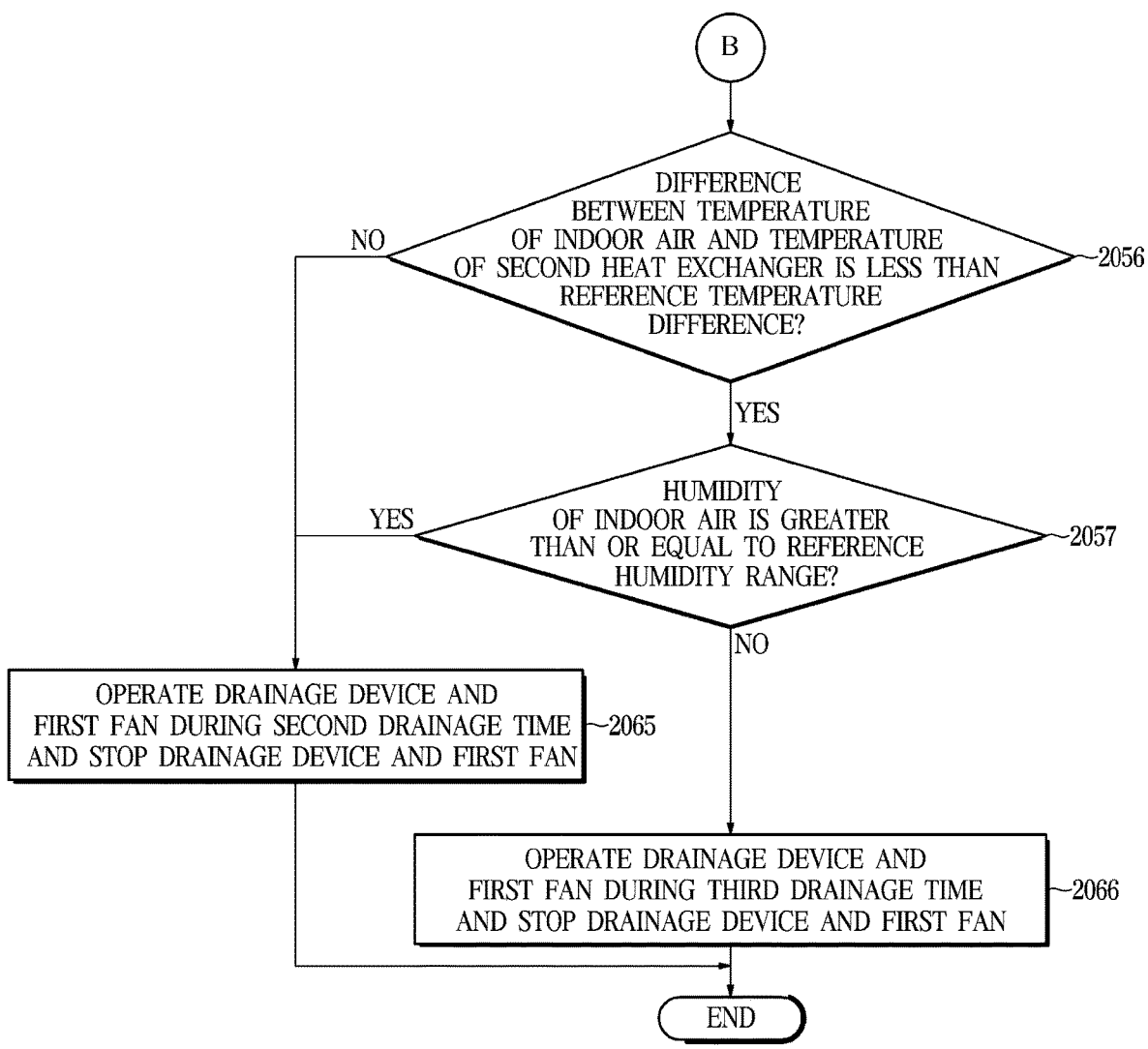
FIG. 21 is a flowchart continuing the example method of controlling the air conditioner according to FIG. 19 according to various embodiments.

FIG. 19 is a flowchart illustrating an example method of controlling the air conditioner according to various embodiments. FIG. 20 is a flowchart continuing the method of controlling the air conditioner according to FIG. 19 according to various embodiments. FIG. 21 is a flowchart continuing the method of controlling the air conditioner according to FIG. 19 according to various embodiments. FIG. 22 is a table illustrating an example of a drainage time determined according to each condition in the air conditioner according to various embodiments.

In describing the control method of the air conditioner 3 according to an embodiment of the disclosure with reference to FIGS. 19 to 22, the same reference numerals may be assigned to the same operations as the control method of the air conditioner 3 described with reference to FIGS. 16 to 18, and descriptions thereof may not be repeated.

Referring to FIGS. 19 to 22, the air conditioner 3 according to an embodiment of the disclosure may perform the drainage operation during the drainage time that is determined based on the operation time of the compressor 70, the temperature difference between the temperature of the indoor air and the temperature of the second heat exchanger 60, and the humidity of the indoor air after the operation of the compressor 70 is stopped.

The controller 500 may control the drainage device 300 or 300-1 and the first fan 110 respectively, to operate during the drainage time that is determined based on the operation time of the compressor, the temperature difference between the temperature of the indoor air and the temperature of the second heat exchanger, and the humidity of the indoor air. In other words, the controller 500 may control the drainage device 300 or 300-1 to move the condensed water collected in the base 13 to the first heat exchanger 40 and control the first fan 110 to move air during the drainage time that is determined based on the operation time of the compressor, the temperature difference between the temperature of the indoor air and the temperature of the second heat exchanger, and the humidity of the indoor air.

As described above, as the cooling operation time increases, a period of time in which water is condensed in the second heat exchanger 60 may increase. Accordingly, the operation time of the compressor 70 may act as a relatively important factor affecting the amount of condensed water.

As the difference between the temperature of the indoor air and the temperature of the second heat exchanger 60 increases, the amount of water, which is generated in such a way that vapor in the indoor air is condensed on the surface of the second heat exchanger 60, may increase. Therefore, the difference between the temperature of the indoor air and the temperature of the second heat exchanger 60 may act as a relatively important factor affecting the amount of condensed water.

As the humidity of the indoor air increases, the amount of water, which is generated in such a way that vapor in the indoor air is condensed on the surface of the second heat exchanger 60, may increase. Therefore, the humidity of the indoor air may act as a relatively important factor affecting the amount of condensed water.

Therefore, as shown in FIGS. 19 to 22, when the drainage time is determined based on the temperature difference between the indoor air and the second heat exchanger 60, and the humidity of the indoor air, as well as the operation time of the compressor 70, it is possible to determine the drainage time for more effectively removing the condensed water using the drainage device 300 or 300-1 and the first fan 110.

For example, the drainage time may be determined based on the temperature and the humidity of the indoor air and the temperature of the second heat exchanger 60 that is detected on a time on which the operation of the compressor 70 is stopped, or immediately before or after the operation of the compressor 70 is stopped.

That is, the controller 500 may determine the drainage time based on an output value of the indoor temperature sensor 610, an output value of the second heat exchanger temperature sensor 620, and an output value of the humidity sensor 630 that is detected on a time on which the operation of the compressor 70 is stopped, or immediately before or after the operation of the compressor 70 is stopped.

For example, referring to FIGS. 19 to 22, the drainage time may be determined based on whether the operation time of the compressor 70 is less than a first operation time, whether the operation time of the compressor 70 is greater than or equal to a second operation time that is greater than the first operation time, and whether the operation time is greater than or equal to the first operation time but less than the second operation time.

For example, the first operation time may be set to approximately 10 minutes, and the second operation time may be set to approximately 30 minutes, but are not limited thereto.

Further, referring to FIGS. 19 to 22, the drainage time may be determined based on whether the difference between the temperature of the indoor air and the temperature of the second heat exchanger 60 is less than a reference temperature difference or greater than or equal to the reference temperature difference.

For example, the reference temperature difference may be set to approximately 3 degrees Celsius, but is not limited thereto.

Further, referring to FIGS. 19 to 22, the drainage time may be determined based on whether the humidity of the indoor air is less than a reference humidity range, whether the humidity of the indoor air is within the reference humidity range, or whether the humidity of the indoor air is greater than or equal to the reference humidity range. 'Less than the reference humidity range' may refer, for example, to a humidity being less than a minimum value of the reference humidity range, 'greater than or equal to the reference humidity range' may refer, for example, to a humidity being greater than or equal to a maximum value of the reference humidity range, and 'within the reference humidity range' may refer, for example, to a humidity being between the minimum and maximum values of the reference humidity range.

For example, the reference humidity range may be set to approximately 60% to 75%, but is not limited thereto.

The drainage time determined according to the operations of FIGS. 19 to 22 may be classified into a first drainage time, a second drainage time, and a third time that is greater than the first drainage time but less than the second drainage time.

Referring to FIGS. 19, 20, and 22, based on the operation time of the compressor 70 being less than the first operation time (yes in 2051), the difference between the temperature of the indoor air and the temperature of the second heat exchanger 60 being less than the reference temperature difference (yes in 2053), and the humidity of the indoor air being less than the reference humidity range (yes in 2054), the controller 500 may control the drainage device 300 or 300-1 to move the condensed water collected in the base 13 to the first heat exchanger 60 during the first drainage time. The controller 500 may control the first fan 110 to move air during the first drainage time. In response to the elapse of the first drainage time, the operation of the drainage device 300 or 300-1 and the first fan 110 may be stopped (2064).

Referring to FIGS. 19, 20, and 22, based on the operation time of the compressor 70 being less than the first operation time (yes in 2051), the difference between the temperature of the indoor air and the temperature of the second heat exchanger 60 being less than the reference temperature difference (yes in 2053), and the humidity of the indoor air being within the reference humidity range (no in 2054 and no in 2055), the controller 500 may control the drainage device 300 or 300-1 to move the condensed water collected in the base 13 to the first heat exchanger 60 during the third drainage time. Further, the controller 500 may control the first fan 110 to move air during the third drainage time. In response to the elapse of the third drainage time, the operation of the drainage device 300 or 300-1 and the first fan 110 may be stopped (2063).

Referring to FIGS. 19, 20, and 22, based on the operation time of the compressor 70 being less than the first operation time (yes in 2051), the difference between the temperature of the indoor air and the temperature of the second heat exchanger 60 being less than the reference temperature difference (yes in 2053), and the humidity of the indoor air being greater than or equal to the reference humidity range (no in 2054 and yes in 2055), the controller 500 may control the drainage device 300 or 300-1 to move the condensed water collected in the base 13 to the first heat exchanger 60 during the second drainage time. Further, the controller 500 may control the first fan 110 to move air during the second drainage time. In response to the elapse of the second drainage time, the operation of the drainage device 300 or 300-1 and the first fan 110 may be stopped (2062).

Referring to FIGS. 19, 20, and 22, based on the operation time of the compressor 70 being less than the first operation time (yes in 2051), and the difference between the temperature of the indoor air and the temperature of the second heat exchanger 60 being greater than or equal to the reference temperature difference (no in 2053), the controller 500 may control the drainage device 300 or 300-1 to move the condensed water collected in the base 13 to the first heat exchanger 60 during the second drainage time. Further, the controller 500 may control the first fan 110 to move air during the second drainage time. In response to the elapse of the second drainage time, the operation of the drainage device 300 or 300-1 and the first fan 110 may be stopped (2062).

Referring to FIGS. 19, 20, and 22, based on the operation time of the compressor 70 being greater than or equal to the first operation time but less than the second operation time (no in 2051 and no in 2052), the difference between the temperature of the indoor air and the temperature of the second heat exchanger 60 being less than the reference temperature difference (yes in 2056), and the humidity of the indoor air being within the reference humidity range or being less than the reference humidity range (that is, the humidity of the indoor air being less than or equal to a maximum humidity range in the reference humidity range) (no in 2057), the controller 500 may control the drainage device 300 or 300-1 to move the condensed water collected in the base 13 to the first heat exchanger 60 during the third drainage time. Further, the controller 500 may control the first fan 110 to move air during the third drainage time. In response to the elapse of the third drainage time, the operation of the drainage device 300 or 300-1 and the first fan 110 may be stopped (2066).

Referring to FIGS. 19, 20, and 22, based on the operation time of the compressor 70 being greater than or equal to the first operation time but less than the second operation time (no in 2051 and no in 2052), the difference between the temperature of the indoor air and the temperature of the second heat exchanger 60 being less than the reference temperature difference (yes in 2056), and the humidity of the indoor air being greater than or equal to the reference humidity range (yes in 2057), the controller 500 may control the drainage device 300 or 300-1 to move the condensed water collected in the base 13 to the first heat exchanger 60 during the second drainage time. Further, the controller 500 may control the first fan 110 to move air during the second drainage time. In response to the elapse of the second drainage time, the operation of the drainage device 300 or 300-1 and the first fan 110 may be stopped (2065).

Referring to FIGS. 19, 20, and 22, based on the operation time of the compressor 70 being greater than or equal to the first operation time but less than the second operation time (no in 2051 and no in 2052), and the difference between the temperature of the indoor air and the temperature of the second heat exchanger 60 being greater than or equal to the reference temperature difference (no in 2056), the controller 500 may control the drainage device 300 or 300-1 to move the condensed water collected in the base 13 to the first heat exchanger 60 during the second drainage time. Further, the controller 500 may control the first fan 110 to move air during the second drainage time. In response to the elapse of the second drainage time, the operation of the drainage device 300 or 300-1 and the first fan 110 may be stopped (2065).

Referring to FIGS. 19 and 22, based on the operation time of the compressor 70 being greater than or equal to the second operation time (no in 2051 and yes in 2052), the controller 500 may control the drainage device 300 or 300-1 to move the condensed water collected in the base 13 to the first heat exchanger 60 during the second drainage time. Further, the controller 500 may control the first fan 110 to move air during the second drainage time. In response to the elapse of the second drainage time, the operation of the drainage device 300 or 300-1 and the first fan 110 may be stopped (2061).

In summary, based on the operation time of the compressor 70 being less than the first operation time, the difference between the temperature of the indoor air and the temperature of the second heat exchanger 60 being less than the reference temperature difference, and the humidity of the indoor air being less than the reference humidity range, the drainage time may be determined as the first drainage time.

Further, based on the operation time of the compressor 70 being greater than or equal to the second operation time, the difference between the temperature of the indoor air and the temperature of the second heat exchanger 60 being greater than or equal to the reference temperature difference, or the humidity of the indoor air being greater than or equal to the reference humidity range, the drainage time may be determined as the second drainage time.

Further, based on the operation time of the compressor 70 being less than the second operation time, the difference between the temperature of the indoor air and the temperature of the second heat exchanger 60 being less than the reference temperature difference, and the humidity of the indoor air being within the reference humidity range, the drainage time may be determined as the third drainage time.

Further, based on the operation time of the compressor 70 being greater than or equal to the first operation time but less than the second operation time, the difference between the temperature of the indoor air and the temperature of the second heat exchanger 60 being less than the reference temperature difference, and the humidity of the indoor air being less than or equal to the maximum humidity range in the reference humidity range, the drainage time may be determined as the third drainage time.

Through the control method of the air conditioner 3, it is possible to determine the drainage time based on more detailed conditions, and it is possible to more effectively remove the condensed water collected in the base 13 using the drainage device 300 or 300-1 and the first fan 110 after the cooling operation of the air conditioner 3 is stopped.

Figure 23:
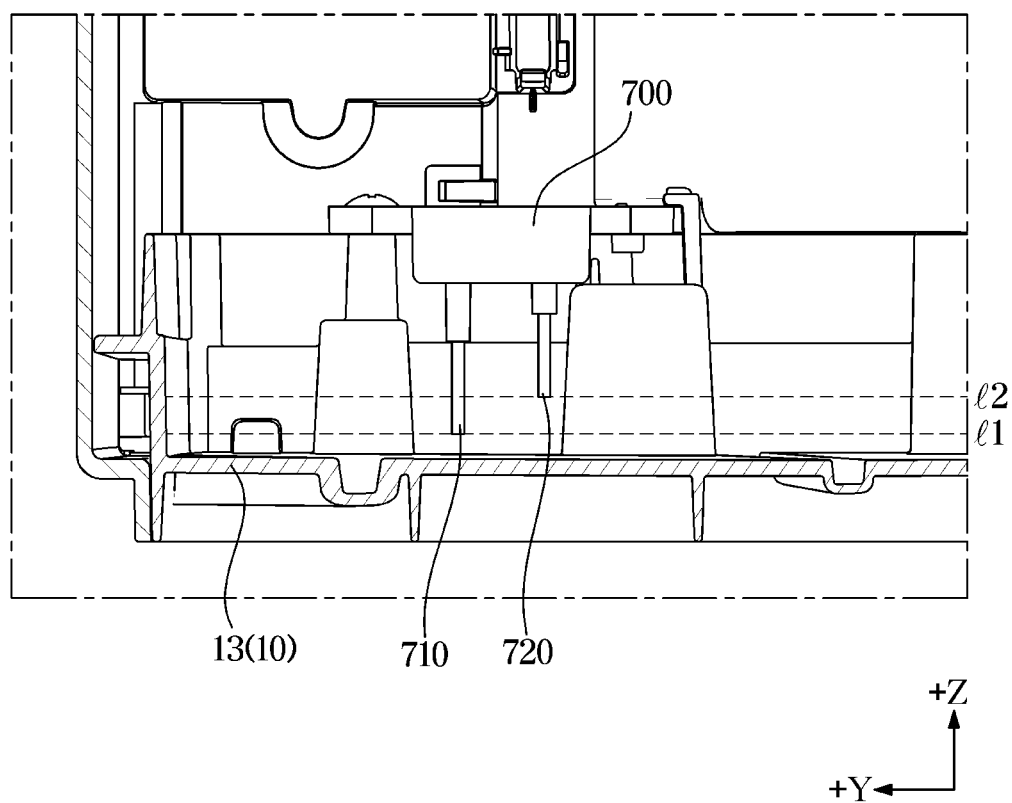
FIG. 23 is a diagram illustrating an enlarged view of a part of a configuration, including a water level sensor, of the air conditioner according to various embodiments.

FIG. 23 is a diagram illustrating an enlarged view of a part of a configuration, such as the water level sensor, of the air conditioner according to various embodiments.

Referring to FIG. 23, the air conditioner 3 according to an embodiment of the disclosure may include the water level sensor 700 configured to detect the level of condensed water collected in the base 13. The water level sensor 700 may output an electrical signal corresponding to the level of water collected in the base 13, and transmit the electrical signal to the controller 500.

The water level sensor 700 may be disposed inside the housing 10. For example, the water level sensor 700 may be supported by the base 13.

The water level sensor 700 may be disposed adjacent to the base 13. For example, the water level sensor 700 may be disposed at a position spaced apart from the base 13 by a predetermined distance with respect to the upside (+Z direction).

However, the disclosure is not limited thereto, and the water level sensor 700 may be disposed in various ways within the housing 10.

For example, the water level sensor 700 may include a first water level detector 710 configured to detect whether the remaining water level in the base 13 is greater than or equal to a first water level 11. In response to the level of the condensed water in the base 13 being greater than or equal to the first water level 11, the first water level detector 710 may output an electrical signal corresponding the water level. The first water level sensor 710 may include various types of sensors, such as a float switch.

Further, the water level sensor 700 may include a second water level detector 720 configured to detect whether the remaining water level in the base 13 is greater than or equal to a second water level 12. In response to the level of the condensed water in the base 13 being greater than or equal to the second water level 12, the second water level detector 720 may output an electrical signal corresponding the water level. The second water level sensor 720 may include various types of sensors, such as a float switch.

The configuration of the water level sensor 700 described above with reference to FIG. 23 is merely an example of a water level sensor configured to detect the level of the condensed water collected in the base in the air conditioner according to the disclosure, but is not limited thereto. For example, the water level sensor of the air conditioner according to an embodiment may be configured to only detect whether the water level of the condensed water collected in the base is greater than or equal to the first water level, or may be configured to detect continuous water level of the condensed water.

Figure 24:
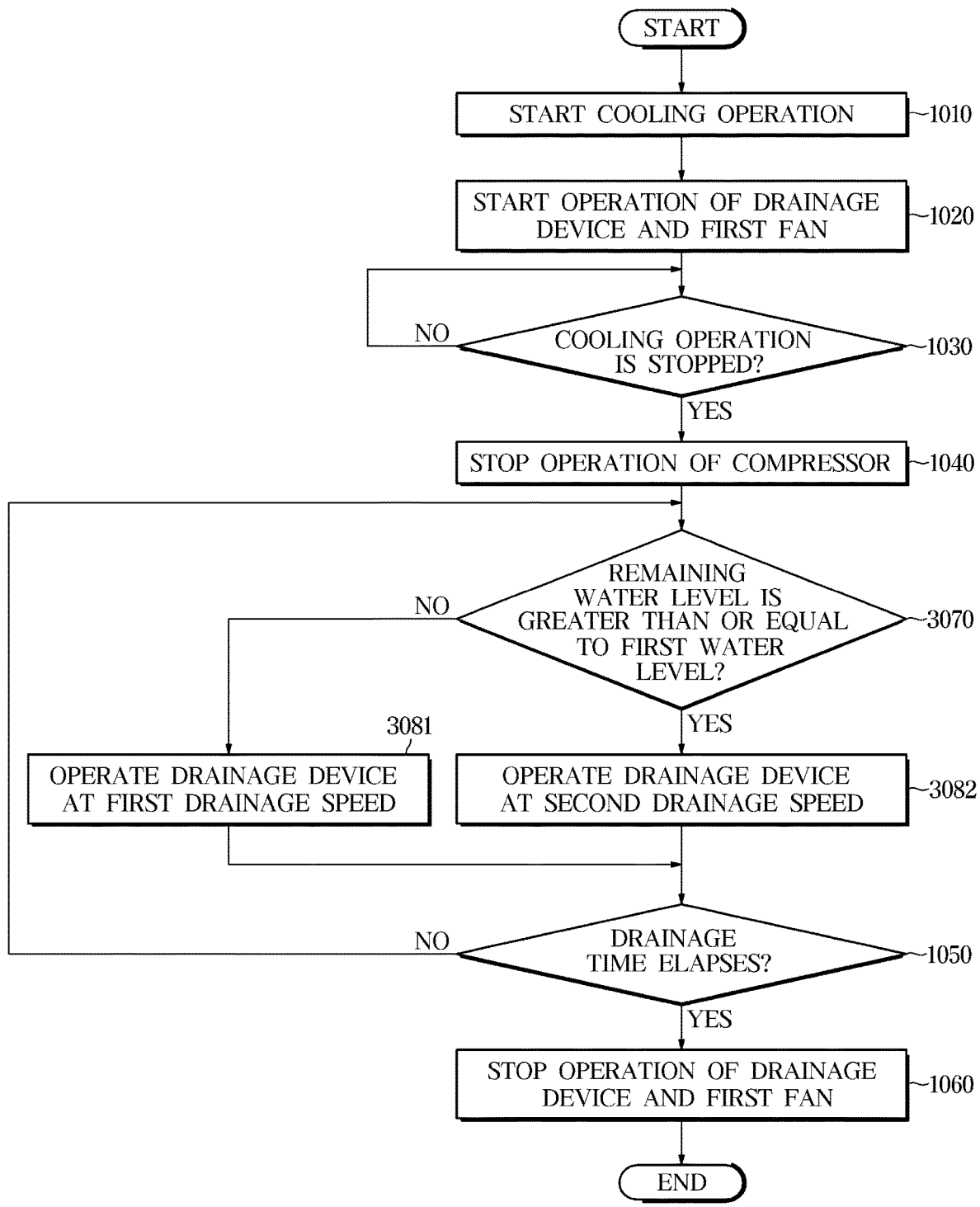
FIG. 24 is a flowchart illustrating an example method of controlling the air conditioner according to various embodiments.

FIG. 24 is a flowchart illustrating an example method of controlling the air conditioner according to various embodiments.

In describing the control method of the air conditioner 3 according to an embodiment of the disclosure with reference to FIG. 24, the same reference numerals may be assigned to the same operations as the control method of the air conditioner 3 described with reference to FIGS. 16 to 22, and descriptions thereof may not be repeated.

In FIG. 24, in the control method of the air conditioner 3, a method of determining a drainage speed at which the drainage device 300 or 300-1 moves the condensed water collected in the base 13 to the first heat exchanger 40 is described.

Referring to FIG. 24, in the air conditioner 3 according to an embodiment of the disclosure, the drainage device 300 or 300-1 may operate at a drainage speed determined based on the level of condensed water collected in the base 13.

For example, the control method of the air conditioner 3 according to an embodiment of the disclosure may include detecting the level of the condensed water collected in the base 13 using the water level sensor 700. For example, the water level sensor 700 may continuously output an electrical signal corresponding to the level of the condensed water collected in the base 13.

The control method of the air conditioner 3 may include determining the drainage speed of the drainage device 300 or 300-1 based on the level of the condensed water collected in the base 13.

Based on the remaining water level in the base 13 being less than the first water level (no in 3070), the drainage device 300 or 300-1 may operate to move the condensed water collected in the base 13 to the first heat exchanger 40 at a first drainage speed (3081). That is, based on the water level of the condensed water collected in the base 13 being less than the first water level (no in 3070), the controller 500 may control the drainage device 300 or 300-1 to move the condensed water collected in the base 13 to the first heat exchanger 40 at the first drainage speed (3081).

Based on the remaining water level in the base 13 being greater than or equal to the first water level (yes in 3070), the drainage device 300 or 300-1 may operate to move the condensed water collected in the base 13 to the first heat exchanger 40 at a second drainage speed greater than the first drainage speed (3082). For example, based on the water level of the condensed water collected in the base 13 being greater than or equal to the first water level (yes in 3070), the controller 500 may control the drainage device 300 or 300-1 to move the condensed water collected in the base 13 to the first heat exchanger 40 at the second drainage speed (3082).

For example, based on the level of the condensed water collected in the base 13 being less than the first water level, the controller 500 may control the wheel drive motor 330 to rotate the scattering wheel 310 at a first wheel rotation speed. Conversely, based on the level of the condensed water collected in the base 13 being greater than or equal to the first water level, the controller 500 may control the wheel drive motor 330 to rotate the scattering wheel 310 at a second wheel rotation speed greater than the first wheel rotation speed.

For example, based on the level of the condensed water collected in the base 13 being less than the first water level, the controller 500 may control the pump 310-1 to move the condensed water in the base 13 to the distributor 330-1 at a first pressure intensity. Based on the level of the condensed water collected in the base 13 being greater than or equal to the first water level, the controller 500 may control the pump 310-1 to move the condensed water in the base 13 to the distributor 330-1 at a second pressure intensity greater than the first pressure intensity.

The above operations may be continuously repeated until the drainage time determined based on the conditions described above with reference to FIGS. 16 to 22 elapses (no in 1050).

Thereafter, based on the elapse of the drainage time determined based on the conditions described with reference to FIGS. 16 to 22 (yes in 1050), the operation of the drainage device 300 or 300-1 and the first fan 110 may be stopped (1060).

In the control method of the air conditioner 3, the condensed water collected in the base 13 may be removed more efficiently because the drainage speed of the drainage device 300 or 300-1 is determined based on the level of the condensed water.

Figure 25:
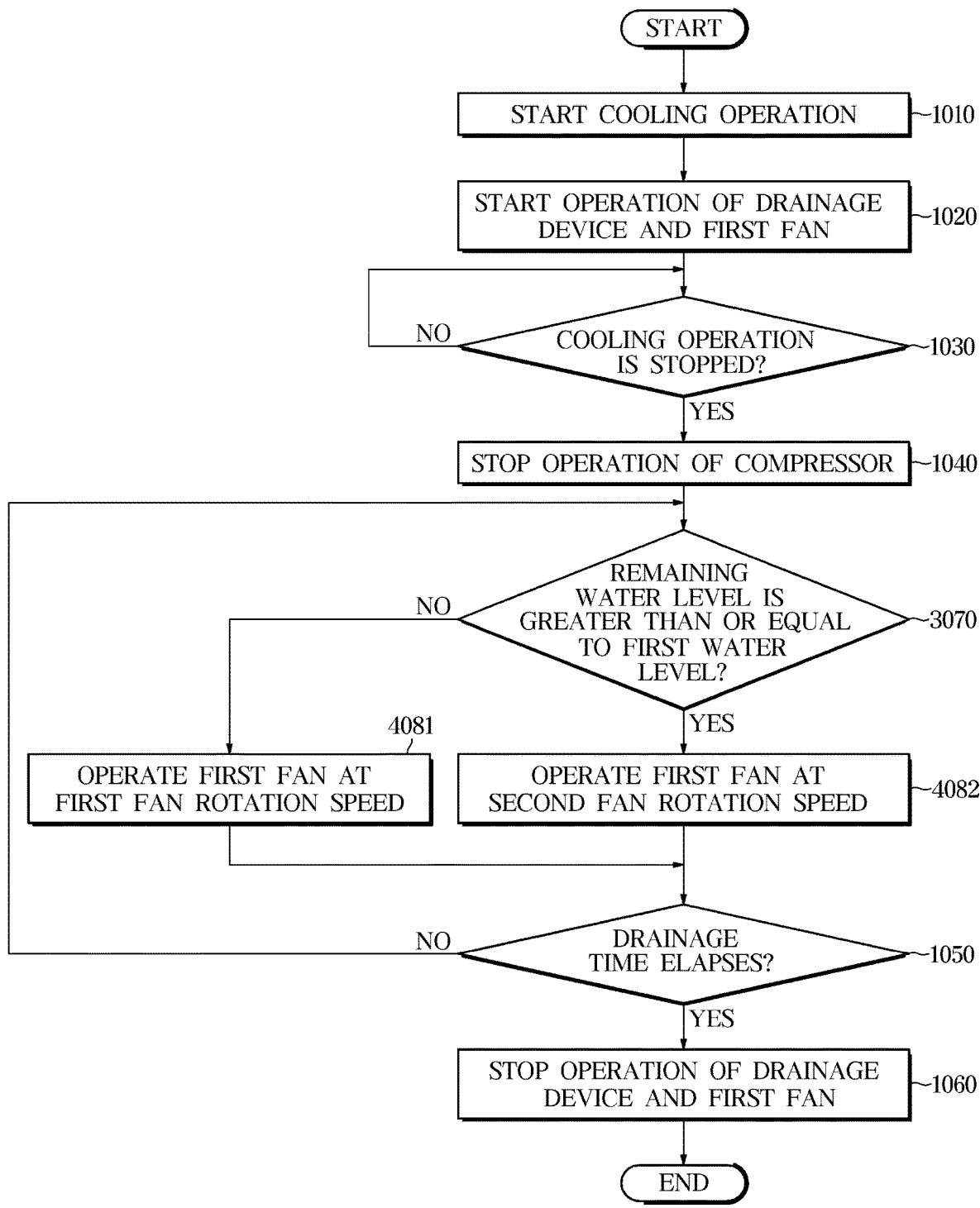
FIG. 25 is a flowchart illustrating an example method of controlling the air conditioner according to various embodiments.

FIG. 25 is a flowchart illustrating an example method of controlling the air conditioner according to various embodiments.

In describing the control method of the air conditioner 3 according to an embodiment of the disclosure with reference to FIG. 25, the same reference numerals may be assigned to the same operations as the control method of the air conditioner 3 described with reference to FIGS. 16 to 22, and descriptions thereof may not be repeated.

In FIG. 25, a method of determining the rotation speed of the first fan 110 in the control method of the air conditioner 3 is described.

Referring to FIG. 25, in the air conditioner 3 according to an embodiment of the disclosure, the first fan 110 may operate at a rotation speed determined based on the level of the condensed water collected in the base 13.

The control method of the air conditioner 3 according to an embodiment of the disclosure may include determining the rotation speed of the first fan 110 based on the level of the condensed water collected in the base 13.

Based on the remaining water level in the base 13 being less than the first water level (no in 3070), the first fan 110 may operate to rotate at a first fan rotation speed (4081). For example, based on the level of the condensed water collected in the base 13 being less than the first water level (no in 3070), the controller 500 may control the first fan 110 to rotate at the first fan rotation speed (4081).

Based on the remaining water level on the base 13 being greater than or equal to the first water level (yes in 3070), the first fan 110 may operate to rotate at a second fan rotation speed greater than the first fan rotation speed (4082). For example, based on the level of the condensed water collected in the base 13 being greater than or equal to the first water level (yes in 3070), the controller 500 may control the first fan 110 to rotate at the second fan rotation speed greater than the first fan rotation speed (4082).

The above operations may be continuously repeated until the drainage time determined based on the conditions described with reference to FIGS. 16 to 22 elapses (no in 1050).

Thereafter, based on the elapse of the drainage time determined based on the conditions described with reference to FIGS. 16 to 22 (yes in 1050), the operation of the drainage device 300 or 300-1 and the first fan 110 may be stopped (1060).

In the control method of the air conditioner 3, the rotation speed of the first fan 110 may be determined based on the level of the condensed water, and thus the condensed water collected in the base 13 may be removed more efficiently.

Figure 26:
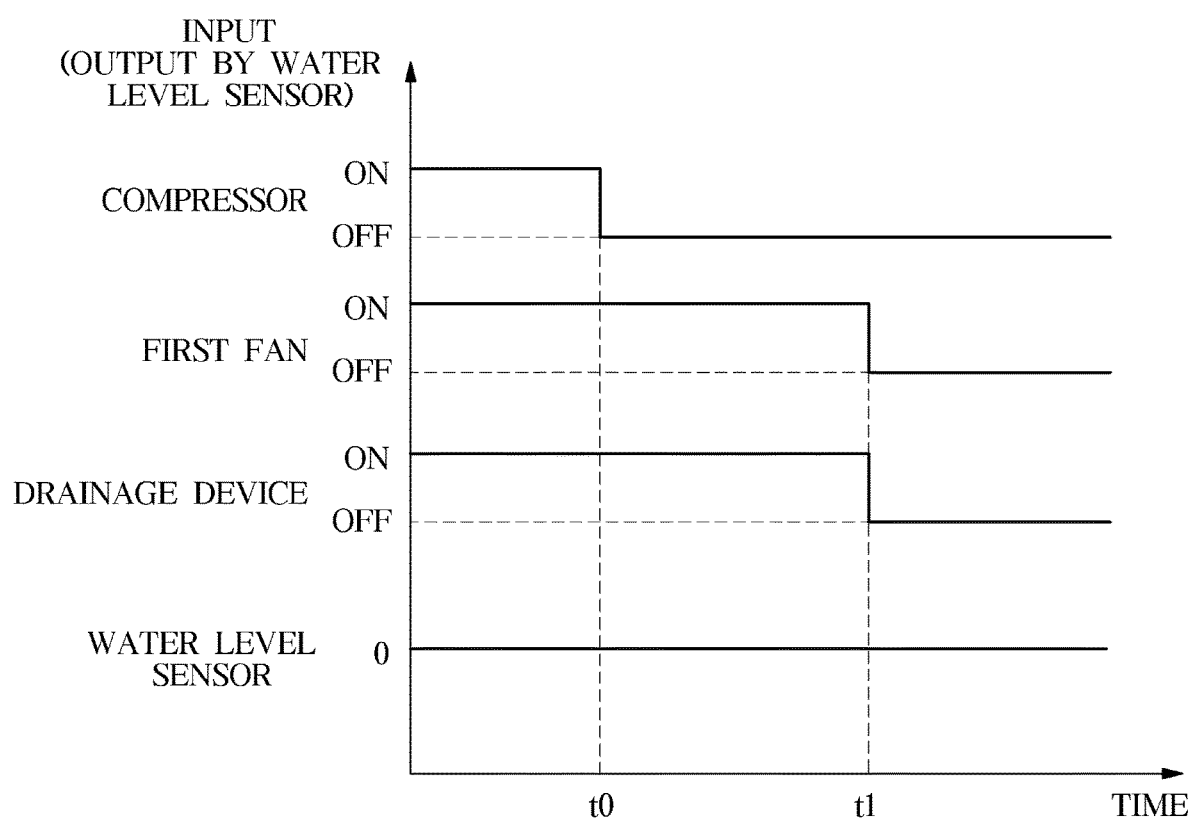
FIG. 26 is a graph illustrating power input to a compressor, the first fan and the drainage device and an electrical signal output by a water level sensor, respectively, over time based on the water level sensor not detecting a remaining water level, in the air conditioner according to various embodiments.
Figure 27:
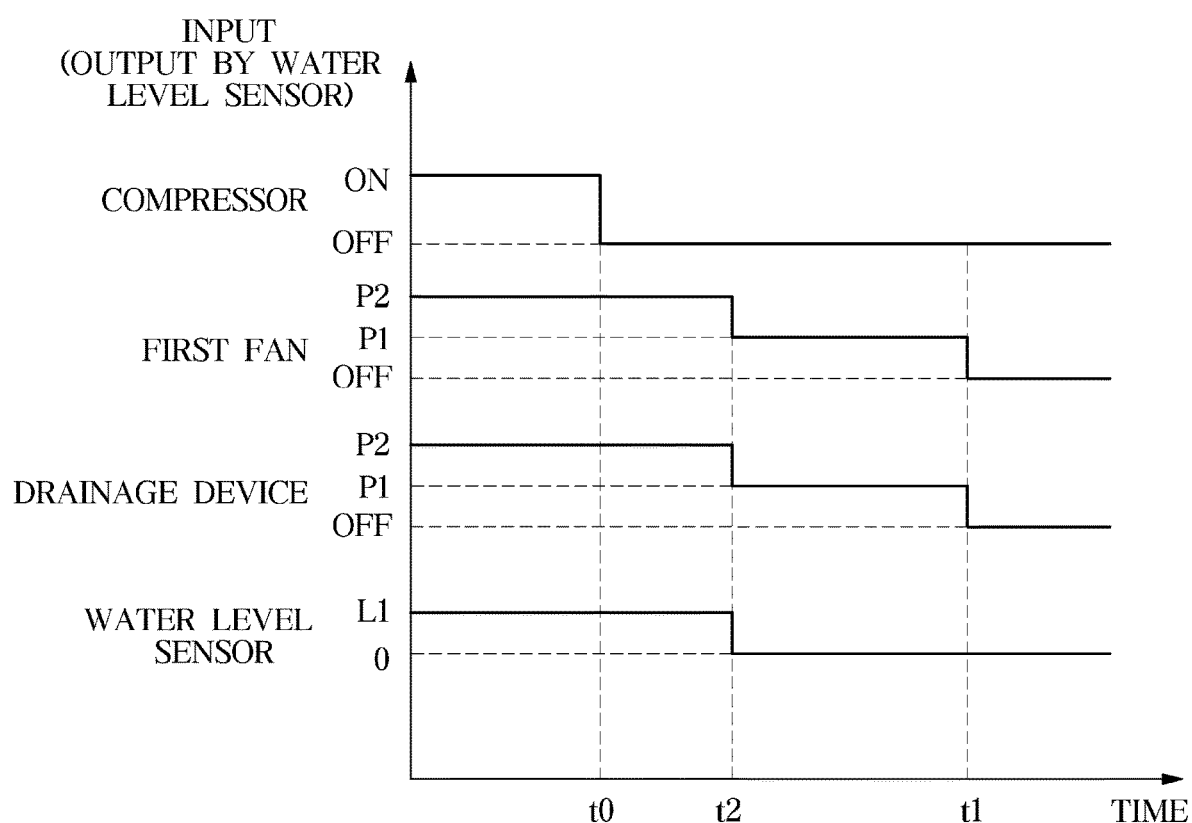
FIG. 27 is a graph illustrating power input to the compressor, the first fan and the drainage device and an electrical signal output by the water level sensor, respectively, over time based on the water level sensor detecting that a remaining water level is greater than or equal to a first water level, in the air conditioner according to various embodiments.

FIG. 26 is a graph illustrating power input to the compressor, the first fan and the drainage device and an electrical signal output by the water level sensor, respectively, over time based on the water level sensor not detecting the remaining water level, in the air conditioner according to various embodiments. FIG. 27 is a graph illustrating power input to the compressor, the first fan and the drainage device and an electrical signal output by the water level sensor, respectively, over time based on the water level sensor detecting that a remaining water level is greater than or equal to the first water level, in the air conditioner according to various embodiments.

The graphs shown in FIGS. 26 and 27 illustrate the power that is input to each of the compressor, the first fan, and the drainage device of the air conditioner according to an embodiment of the disclosure over time, and the electrical signal that is output in response to the water level sensor detecting the water level over time.

Referring to FIGS. 26 and 27, in response to a cooling operation stop condition occurring in the air conditioner 3 according to an embodiment of the disclosure, the power input to the compressor 70 may be cut off and the compressor 70 may be stopped (time t0). Even at this time, the power may continue to be supplied to the first fan 110 and the drainage device 300 or 300-1 to remove the condensed water collected in the base 13 and thus the first fan 110 and the drainage device 300 or 300-1 may each continue to operate.

The drainage time (time t1-t0) for each of the first fan 110 and the drainage device 300 or 300-1 to operate may be determined based on the conditions described above. In response to the elapse of the drainage time (time t1), the power input to the first fan 110 and the drainage device 300 or 300-1 may be cut off, and the operation of the first fan 110 and the drainage device 300 or 300-1 may be stopped.

In response to the water level sensor 700 not detecting that the water level of the condensed water collected in the base 13 is greater than or equal to the first water level, a first amount of power P1 may be input to the first fan 110 to allow the first fan 110 to rotate at the first fan rotation speed, and the first amount of power P1 may be input to the drainage device 300 or 300-1 to move the condensed water to the first heat exchanger 40 at the first drainage speed.

In response to the water level sensor 700 detecting that the water level of the condensed water collected in the base 13 is greater than or equal to the first water level (outputting signal L1), a second amount of power P2 may be input to the first fan 110 to allow the first fan 110 to rotate at the second fan rotation speed greater than the first fan rotation speed, and the second amount of power P2 may be input to the drainage device 300 or 300-1 to move the condensed water to the first heat exchanger 40 at the second drainage speed greater than the first drainage speed.

Referring to FIG. 27, based on the water level sensor 700 outputting a signal L1 indicating that the water level of the condensed water collected in the base 13 is greater than or equal to the first water level, the second amount of power P2 may be input to the first fan 110 and the drainage device 300 or 300-1. Thereafter, in response to the water level sensor 700 not detecting that the water level of the condensed water collected in the base 13 is greater than or equal to the first water level (time t2) as the water level of the base 13 is reduced to be less than the first water level, the first amount of power P1 may be input to the first fan 110 and the drainage device 300 or 300-1.

Figure 28:
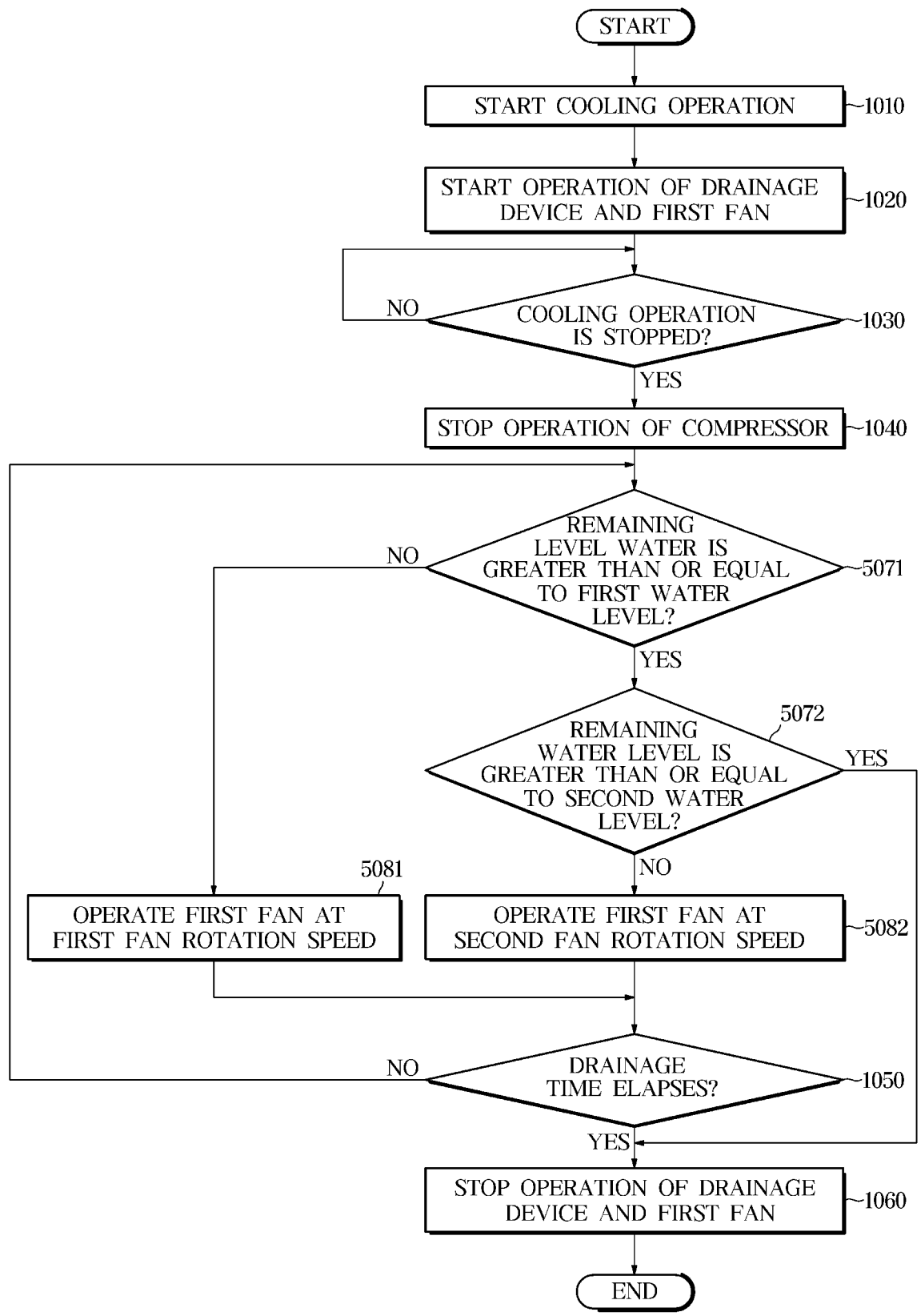
FIG. 28 is a flowchart illustrating an example method of controlling the air conditioner according to various embodiments.

FIG. 28 is a flowchart illustrating an example method of controlling the air conditioner according to various embodiments.

In describing the control method of the air conditioner 3 according to an embodiment of the disclosure with reference to FIG. 28, the same reference numerals may be assigned to the same operations as the control method of the air conditioner 3 described with reference to FIGS. 16 to 25, and descriptions thereof may not be repeated.

In FIG. 28, in the control method of the air conditioner 3, specific operations for controlling the drainage device 300 or 300-1 and the first fan 110 according to the level of condensed water collected in the base 13 are described.

Referring to FIG. 28, in the air conditioner 3 according to an embodiment of the disclosure, the drainage device 300 or 300-1 may operate at a drainage speed determined based on the level of the condensed water collected in the base 13. Further, the first fan 110 may operate at a rotation speed determined based on the level of the condensed water collected in the base 13. This corresponds to the description previously described with reference to FIGS. 24 and 25.

Based on the remaining water level in the base 13 being less than the first water level (no in 5071), the drainage device 300 or 300-1 may operate to move the condensed water collected in the base 13 to the first heat exchanger 40 at the first drainage speed, and the first fan 110 may operate to rotate at the first fan rotation speed (5081). For example, based on the water level of the condensed water collected in the base 13 being less than the first water level (no in 5071), the controller 500 may control the drainage device 300 or 300-1 to move the condensed water collected in the base 13 to the first heat exchanger 40 at the first drainage speed, and control the first fan 110 to rotate at the first fan rotation speed (5081).

Based on the remaining water level in the base 13 being greater than or equal to the first water level but less than the second water level (yes in 5071 and no in 5072), the drainage device 300 or 300-1 may operate to move the condensed water collected in the base 13 to the first heat exchanger 40 at the second drainage speed greater than the first drainage speed, and the first fan 110 may operate to rotate at the second fan rotation speed greater than the first fan rotation speed (5082). For example, based on the level of the condensed water collected in the base 13 being greater than or equal to the first water level but less than the second water level (yes in 5071 and no in 5072), the controller 500 may control the drainage device 300 or 300-1 to move the condensed water collected in the base 13 to the first heat exchanger 40 at the second drainage speed and control the first fan 110 to rotate at the second fan rotation speed (5082).

In response to the remaining water level in the base 13 being greater than or equal to the second water level, the condensed water may overflow out of the housing 10. Accordingly, based on the remaining water level in the base 13 being greater than or equal to the second water level, the air conditioner 3 may stop the operation of the entire product while outputting an error notification. For example, based on the remaining water level in the base 13 being greater than or equal to the second water level, the controller 500 may control the display 420 to output a notification about an error while stopping the operation of the entire product.

As mentioned above, based on the remaining water level in the base 13 being greater than or equal to the second water level (yes in 5071 and yes in 5072), the operation of the drainage device 300 or 300-1 and the first fan 110 may be stopped regardless of the elapse of the drainage time (1060). That is, based on the remaining water level in the base 13 being greater than or equal to the second water level, the controller 500 may control the drainage device 300 or 300-1 and the first fan 110 to stop the operation thereof.

The above operations may be continuously repeated unless the drainage time determined based on the conditions described with reference to FIG. 16 to 22 elapses or the remaining water level is greater than or equal to the second water level (no in 1050). Thereafter, based on the elapse of the drainage time determined based on the conditions described with reference to FIGS. 16 to 22 (yes in 1050), the operation of the drainage device 300 or 300-1 and the first fan 110 may be stopped (1060).

Accordingly, the condensed water collected in the base 13 may be removed more efficiently because the drainage speed of the drainage device 300 or 300-1 and the rotation speed of the first fan 110 are determined based on the level of the condensed water. Further, because it is possible to stop the operation of the product and to output an error notification in response to the level of the condensed water being extremely high, it is possible to prevent and/or reduce the condensed water from overflowing into the user's indoor space or to prevent and/or reduce damage to the product.

An air conditioner according to an example embodiment may include: a housing including a base, a first heat exchanger disposed inside the housing and configured to exchange heat with outdoor air, a second heat exchanger disposed inside the housing and configured to exchange heat with indoor air, a compressor configured to compress a refrigerant for a heat exchange operation performed by the first heat exchanger and the second heat exchanger, a first fan disposed inside the housing and configured to move air along the flow path passing through the first heat exchanger, a drainage device including a drain configured to move condensed water condensed on the second heat exchanger inside the housing and collected in the base to the first heat exchanger and a controller including at least one processor comprising processing circuitry, configured to: based on the stop of the operation of the compressor, control the drainage device to move the condensed water collected in the base to the first heat exchanger during the drainage time determined based on an operation time of the compressor, and control the first fan to move air during the drainage time. According to an example embodiment of the disclosure, the air conditioner may automatically remove the condensed water collected in the base using the drainage device and the first fan. In addition, according to the disclosure, the air conditioner may efficiently remove the condensed water by operating the drainage device and the first fan even after the operation is terminated. In addition, according to the disclosure, based on the operation time of the compressor, the air conditioner may set the drainage time for operating the drainage device and the first fan after the operation is terminated, and thus the air conditioner may efficiently remove the condensed water.

The controller, according to an example embodiment, may be configured to control the drainage device and the first fan to stop based on an elapse of the drainage time after the operation of the compressor is stopped.

Based on the operation time being less than the reference operation time, the controller may be configured to control the drainage device to move the condensed water collected in the base to the first heat exchanger during the reference drainage time, and control the first fan to move air during the reference drainage time. Based on the operation time being greater than or equal to the reference operation time, the controller may be configured to control the drainage device to move the condensed water collected in the base to the first heat exchanger during the drainage time increased from the reference drainage time, and may be configured to control the first fan to move air during the increased drainage time.

The air conditioner according to an example embodiment may further include an indoor temperature sensor configured to detect a temperature of the indoor air and electrically connected to the controller. The controller may be configured to determine the drainage time based on the operation time and the temperature of the indoor air. According to an example embodiment of the disclosure, the air conditioner may be configured to set the drainage time for operating the drainage device and the first fan after the operation is terminated, based on detailed conditions including the operation time of the compressor and the temperature of the indoor air, wherein the air conditioner may more efficiently remove the condensed water.

The air conditioner, according to an example embodiment, may further include the second heat exchanger temperature sensor configured to detect a temperature of the second heat exchanger and electrically connected to the controller. The controller may be configured to determine the drainage time based on the operation time and the temperature of the second heat exchanger. According to an example embodiment of the disclosure, the air conditioner may be configured to set the drainage time for operating the drainage device and the first fan after the operation is terminated, based on conditions including the operation time of the compressor and the temperature of the second heat exchanger, and thus the air conditioner may more efficiently remove the condensed water.

The air conditioner, according to an example embodiment, may further include a humidity sensor configured to detect a humidity of the indoor air and electrically connected to the controller. The controller may be configured to determine the drainage time based on the operation time and the humidity of the indoor air. According to an example embodiment of the disclosure, the air conditioner may be configured to set the drainage time for operating the drainage device and the first fan after the operation is terminated, based on detailed conditions including the operation time of the compressor and the humidity of the indoor air, and thus the air conditioner may more efficiently remove the condensed water.

The air conditioner, according to an example embodiment, may further include an indoor temperature sensor configured to detect a temperature of the indoor air, a second heat exchanger temperature sensor configured to detect a temperature of the second heat exchanger, and a humidity sensor configured to detect a humidity of the indoor air. The controller may be electrically connected to the indoor temperature sensor, the second heat exchanger temperature sensor, and the humidity sensor. Based on the operation time being less than the first operation time, the difference between the temperature of the indoor air and the temperature of the second heat exchanger being less than the reference temperature difference, and the humidity of the indoor air being less than the reference humidity range, the controller may be configured to control the drainage device to move the condensed water collected in the base to the first heat exchanger during the first drainage time and to control the first fan to move air during the first drainage time. Based on the operation time being greater than or equal to the second operation time greater than the first operation time, or based on the difference between the temperature of the indoor air and the temperature of the second heat exchanger being greater than or equal to the reference temperature difference, or based on the humidity of the indoor air being greater than or equal to the reference humidity range, the controller may be configured to control the drainage device to move the condensed water collected in the base to the first heat exchanger during a second drainage time greater than the first drainage time and may control the first fan to move air during the second drainage time.

Based on the operation time being less than the second operation time, the difference between the temperature of the indoor air and the temperature of the second heat exchanger being less than the reference temperature difference, and the humidity of the indoor air being within the reference humidity range, the controller may be configured to control the drainage device to move the condensed water collected in the base to the first heat exchanger during the third drainage time greater than the first drainage time but less than the second drainage time, and may control the first fan to move air during the third drainage time.

Based on the operation time being greater than or equal to the first operation time but less than the second operation time, the difference between the temperature of the indoor air and the temperature of the second heat exchanger being less than the reference temperature difference, and the humidity of the indoor air being less than or equal to the maximum humidity range in the reference humidity range, the controller may be configured to control the drainage device to move the condensed water collected in the base to the first heat exchanger during the third drainage time greater than the first drainage time but less than the second drainage time, and may control the first fan to move air during the third drainage time.

The air conditioner may further include an indoor temperature sensor configured to detect a temperature of the indoor air and electrically connected to the controller, a second heat exchanger temperature sensor configured to detect a temperature of the second heat exchanger and electrically connected to the controller, and a humidity sensor configured to detect a humidity of the indoor air and electrically connected to the controller. The controller may be configured to determine the drainage time based on an output value of the indoor temperature sensor, an output value of the second heat exchanger temperature sensor, and an output value of the humidity sensor based on a time on which the operation of the compressor is stopped. According to the disclosure, the air conditioner may determine the drainage time by reflecting more meaningful information as the basis for determining the drainage time, and thus the removal efficiency of the condensed water that uses the drainage device and the first fan may be improved.

The drainage device may further include a scattering wheel configured to be rotatable inside the housing and configured to, according to the rotation thereof, scatter the condensed water collected in the base toward the first heat exchanger, and a wheel drive motor configured to rotate the scattering wheel. The controller may be configured to control the wheel drive motor to allow the scattering wheel to rotate during the drainage time.

The air conditioner may further include a water level sensor configured to detect a water level of the condensed water collected in the base and electrically connected to the controller. Based on the water level of the condensed water collected in the base being less than the first water level, the controller may be configured to control the drainage device to move the condensed water collected in the base to the first heat exchanger at the first drainage speed. Based on the water level of the condensed water collected in the base being greater than or equal to the first water level, the controller may be configured to control the drainage device to move the condensed water collected in the base to the first heat exchanger at the second drainage speed greater than the first drainage speed. According to the disclosure, the air conditioner may more efficiently remove the condensed water collected in the base by determining the drainage speed of the drainage device based on the water level of the condensed water.

The drainage device may further include a scattering wheel configured to be rotatable inside the housing and configured to, based on a rotation thereof, scatter the condensed water collected in the base toward the first heat exchanger, and a wheel drive motor configured to rotate the scattering wheel. Based on the water level of the condensed water collected in the base being less than the first water level, the controller may be configured to control the wheel drive motor to allow the scattering wheel to rotate at the first wheel rotation speed. Based on the water level of the condensed water collected in the base being greater than or equal to the first water level, the controller may be configured to control the wheel drive motor to allow the scattering wheel to rotate at the second wheel rotation speed greater than the first wheel rotation speed.

The air conditioner may further include a water level sensor configured to detect a water level of the condensed water collected in the base and electrically connected to the controller. Based on the water level of the condensed water collected in the base being less than the first water level, the controller may be configured to control the first fan to rotate at the first fan rotation speed. Based on the water level of the condensed water collected in the base being greater than or equal to the first water level, the controller may be configured to control the first fan to rotate at the second fan rotation speed greater than the first fan rotation speed. According to the disclosure, the air conditioner may more efficiently remove the condensed water collected in the base by determining the rotation speed of the first fan based on the water level of the condensed water.

A method of controlling the air conditioner, including a first heat exchanger configured to exchange heat with outdoor air, a second heat exchanger configured to exchange heat with indoor air, a compressor configured to compress a refrigerant, and a housing provided to accommodate the first heat exchanger, the second heat exchanger and the compressor, according to an example embodiment, may include: stopping an operation of the compressor, operating the drainage device to move condensed water collected in the housing to the first heat exchanger during the drainage time determined based on the operation time of the compressor, and operating the first fan to move air along a flow path passing through the first heat exchanger during the drainage time.

The operating the drainage device to move condensed water collected in the housing to the first heat exchanger during the drainage time and the operating the first fan to move air during the drainage time may include, based on the operation time being less than the reference operation time, operating the drainage device to move the condensed water collected in the housing to the first heat exchanger during the reference drainage time, and operating the first fan to move air during the reference drainage time, and based on the operation time being greater than or equal to the reference operation time, operating the drainage device to move the condensed water collected in the housing to the first heat exchanger during the drainage time increased from the reference drainage time, and operating the first fan to move air during the increased drainage time.

The method of controlling the air conditioner may further include detecting at least one physical quantity of the temperature of the indoor air, the humidity of the indoor air, and the temperature of the second heat exchanger, using the sensor, and determining the drainage time based on the operation time and the at least one of the temperature of the indoor air, the humidity of the indoor air, and the temperature of the second heat exchanger.

The method of controlling the air conditioner may further include detecting a level of condensed water collected in the housing using the water level sensor disposed inside the housing. The operating the drainage device to move condensed water collected in the housing to the first heat exchanger during the drainage time may include, based on the water level of the condensed water collected in the housing being less than the first water level, operating the drainage device to move the condensed water collected in the housing to the first heat exchanger at the first drainage speed, and based on the water level of the condensed water collected in the housing being greater than or equal to the first water level, operating the drainage device to move the condensed water collected in the housing to the first heat exchanger at the second drainage speed greater than the first drainage speed.

The method of controlling the air conditioner may further include detecting a level of condensed water collected in the housing using the water level sensor disposed inside the housing. The operating the first fan to move air along the flow path passing through the first heat exchanger during the drainage time may include, based on the water level of the condensed water collected in the housing being less than the first water level, operating the first fan to rotate at the first fan rotation speed, and, based on the water level of the condensed water collected in the housing being greater than or equal to the first water level, operating the first fan to rotate at the second fan rotation speed greater than the first fan rotation speed.

The air conditioner according an example embodiment may include a housing including a base, an outdoor heat exchanger disposed inside the housing and configured to exchange heat with outdoor air, a compressor configured to compress for the cooling operation, an outdoor fan disposed inside the housing and configured to move air along the flow path passing through the outdoor heat exchanger, a drainage device including a drain disposed inside the housing and configured to move water collected in the base to the outdoor heat exchanger, and a controller including at least one processor, comprising processing circuitry, individually and/or collectively, configured to control an operation of the compressor, the outdoor fan and the drainage device. Based on the start of the cooling operation, the controller may be configured to control the drainage device to move the water collected in the base to the outdoor heat exchanger. Based on the stop of the cooling operation, the controller may be configured to control the drainage device to move the water collected in the base to the outdoor heat exchanger during the drainage time determined based on a period of time in which the cooling operation is performed. The controller may be configured to control the outdoor fan to move air during the drainage time.

The disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes various recording media in which instructions which can be decoded by a computer are stored. For example, there may be a Read Only Memory (ROM), a Random Access Memory (RAM), a magnetic tape, a magnetic disk, a flash memory, and an optical data storage device.

Storage medium readable by machine, may be provided in the form of a non-transitory storage medium. "Non-transitory" may refer to the storage medium being a tangible device and not including a signal (e.g., electromagnetic wave), and this term includes a case in which data is semi-permanently stored in a storage medium and a case in which data is temporarily stored in a storage medium.

The method according to the various disclosed embodiments may be provided by being included in a computer program product. Computer program products may be traded between sellers and buyers as commodities. Computer program products are distributed in the form of a device-readable storage medium (e.g., compact disc read only memory (CD-ROM)), or are distributed directly or online (e.g., downloaded or uploaded) between two user devices (e.g., smartphones) through an application store (e.g., Play Store™). In the case of online distribution, at least a portion of the computer program product (e.g., downloadable app) may be temporarily stored or created temporarily in a device-readable storage medium such as the manufacturer's server, the application store's server, or the relay server's memory.

As is apparent from the above description, an air conditioner may automatically remove water collected in a housing using a drainage device and a first fan.

The air conditioner may efficiently remove water collected in a housing using a drainage device and a first fan.

The air conditioner may efficiently remove water collected in a housing by operating a drainage device and a first fan even after an operation is terminated.

The air conditioner may set a drainage time for operating a drainage device and a first fan after an operation is terminated, based on conditions such as an operation time of a compressor, a temperature and a humidity of indoor air and a temperature of a second heat exchanger, and may efficiently remove water collected in a housing.

The air conditioner may more efficiently remove water collected in a base by determining a drainage speed of a drainage device based on a level of condensed water.

The air conditioner may more efficiently remove water collected in a base by determining a rotation speed of a first fan based on a level of condensed water.

Although various example embodiments of the disclosure have been shown and described, it would be appreciated by those skilled in the art that changes may be made in these embodiments without departing from the principles and spirit of the disclosure, including the appended claims and their equivalents. It will also be understood that any of the embodiment(s) described herein may be used in conjunction with any other embodiment(s) described herein.

What is claimed is:

1. An air conditioner comprising:
a housing comprising a base;
a first heat exchanger disposed inside the housing and configured to exchange heat with outdoor air;
a second heat exchanger disposed inside the housing and configured to exchange heat with indoor air;
a compressor configured to compress a refrigerant for a heat exchange operation performed by the first heat exchanger and the second heat exchanger;
a first fan disposed inside the housing and configured to move air along a flow path passing through the first heat exchanger;
a drainage device configured to move condensed water condensed on the second heat exchanger inside the housing and collected in the base to the first heat exchanger; and
a controller including at least one processor, comprising processing circuitry, individually or collectively, configured to, based on the stop of the operation of the compressor, control the drainage device to move the condensed water collected in the base to the first heat exchanger during a drainage time determined based on an operation time of the compressor, and to control the first fan to move air during the drainage time.

2. The air conditioner of claim 1, wherein
at least one processor of the controller, individually or collectively, is configured to control the drainage device and the first fan to stop based on the drainage time after the stop of the operation of the compressor elapsing.

3. The air conditioner of claim 1, wherein
based on the operation time being less than a reference operation time, at least one processor of the controller, individually or collectively, is configured to control the drainage device to move the condensed water collected in the base to the first heat exchanger during a reference drainage time, and to control the first fan to move air during the reference drainage time; and
based on the operation time being greater than or equal to the reference operation time, at least one processor of the controller, individually and/or collectively, is configured to control the drainage device to move the condensed water collected in the base to the first heat exchanger during a drainage time increased from the reference drainage time, and to control the first fan to move air during the increased drainage time.

4. The air conditioner of claim 1, further comprising:
an indoor temperature sensor configured to detect a temperature of the indoor air and electrically connected to the controller,
wherein at least one processor of the controller, individually or collectively, is configured to determine the drainage time based on the operation time and the temperature of the indoor air.

5. The air conditioner of claim 1, further comprising:
a second heat exchanger temperature sensor configured to detect a temperature of the second heat exchanger and electrically connected to the controller,
wherein at least one processor of the controller, individually or collectively, is configured to determine the drainage time based on the operation time and the temperature of the second heat exchanger.

6. The air conditioner of claim 1, further comprising:
a humidity sensor configured to detect a humidity of the indoor air and electrically connected to the controller,
wherein at least one processor of the controller, individually or collectively, is configured to determine the drainage time based on the operation time and the humidity of the indoor air.

7. The air conditioner of claim 1, further comprising:
an indoor temperature sensor configured to detect a temperature of the indoor air;
a second heat exchanger temperature sensor configured to detect a temperature of the second heat exchanger; and
a humidity sensor configured to detect a humidity of the indoor air,
wherein at least one processor of the controller, individually or collectively, is electrically connected to the indoor temperature sensor, the second heat exchanger temperature sensor, and the humidity sensor,
wherein, based on the operation time being less than a first operation time, a temperature difference between the temperature of the indoor air and the temperature of the second heat exchanger being less than a reference temperature difference, and the humidity of the indoor air being less than a reference humidity range, at least one processor of the controller, individually or collectively, is configured to control the drainage device to move the condensed water collected in the base to the first heat exchanger during a first drainage time and configured to control the first fan to move air during the first drainage time; and
based on the operation time being greater than or equal to a second operation time greater than the first operation time, or based on the temperature difference between the temperature of the indoor air and the temperature of the second heat exchanger being greater than or equal to the reference temperature difference, or based on the humidity of the indoor air being greater than or equal to the reference humidity range, at least one processor of the controller, individually or collectively, is configured to control the drainage device to move the condensed water collected in the base to the first heat exchanger during a second drainage time greater than the first drainage time and configured to control the first fan to move air during the second drainage time.

8. The air conditioner of claim 7, wherein
based on the operation time being less than the second operation time, the temperature difference between the temperature of the indoor air and the temperature of the second heat exchanger being less than the reference temperature difference, and the humidity of the indoor air being within the reference humidity range, at least one processor of the controller, individually or collectively, is configured to control the drainage device to move the condensed water collected in the base to the first heat exchanger during a third drainage time greater than the first drainage time but less than the second drainage time, and to control the first fan to move air during the third drainage time.

9. The air conditioner of claim 7, wherein
based on the operation time being greater than or equal to the first operation time but less than the second operation time, the temperature difference between the temperature of the indoor air and the temperature of the second heat exchanger being less than the reference temperature difference, and the humidity of the indoor air being less than or equal to a maximum humidity range in the reference humidity range, at least one processor of the controller, individually or collectively, is configured to control the drainage device to move the condensed water collected in the base to the first heat exchanger during a third drainage time greater than the first drainage time but less than the second drainage time, and to control the first fan to move air during the third drainage time.

10. The air conditioner of claim 1, further comprising:
an indoor temperature sensor configured to detect a temperature of the indoor air and electrically connected to the controller;
a second heat exchanger temperature sensor configured to detect a temperature of the second heat exchanger and electrically connected to the controller; and
a humidity sensor configured to detect a humidity of the indoor air and electrically connected to the controller,
wherein at least one processor of the controller, individually or collectively, is configured to determine the drainage time based on an output value of the indoor temperature sensor, an output value of the second heat exchanger temperature sensor, and an output value of the humidity sensor at a time on which the operation of the compressor is stopped.

11. The air conditioner of claim 1, wherein the drainage device comprises:
a scattering wheel configured to be rotatable inside the housing and configured to, based on rotation thereof, scatter the condensed water collected in the base toward the first heat exchanger; and
a wheel drive motor configured to rotate the scattering wheel,
wherein at least one processor of the controller, individually or collectively, is configured to control the wheel drive motor to allow the scattering wheel to rotate during the drainage time.

12. The air conditioner of claim 1, further comprising:
a water level sensor configured to detect a water level of the condensed water collected in the base and electrically connected to the controller,
wherein, based on the water level of the condensed water collected in the base being less than a first water level, at least one processor of the controller, individually or collectively, is configured to control the drainage device to move the condensed water collected in the base to the first heat exchanger at a first drainage speed; and
based on the water level of the condensed water collected in the base being greater than or equal to the first water level, at least one processor of the controller, individually or collectively, is configured to control the drainage device to move the condensed water collected in the base to the first heat exchanger at a second drainage speed greater than the first drainage speed.

13. The air conditioner of claim 12, wherein the drainage device comprises:
a scattering wheel configured to be rotatable inside the housing and configured to, based on a rotation thereof, scatter the condensed water collected in the base toward the first heat exchanger; and
a wheel drive motor configured to rotate the scattering wheel,
wherein, based on the water level of the condensed water collected in the base being less than the first water level, at least one processor of the controller, individually or collectively, is configured to control the wheel drive motor to allow the scattering wheel to rotate at a first wheel rotation speed; and based on the water level of the condensed water collected in the base being greater than or equal to the first water level, at least one processor of the controller, individually or collectively, is configured to control the wheel drive motor to allow the scattering wheel to rotate at a second wheel rotation speed greater than the first wheel rotation speed.

14. The air conditioner of claim 1, further comprising:
a water level sensor configured to detect a water level of the condensed water collected in the base and electrically connected to the controller,
wherein, based on the water level of the condensed water collected in the base being less than a first water level, at least one processor of the controller, individually or collectively, is configured to control the first fan to rotate at a first fan rotation speed; and
based on the water level of the condensed water collected in the base being greater than or equal to the first water level, at least one processor of the controller, individually or collectively, is configured to control the first fan to rotate at a second fan rotation speed greater than the first fan rotation speed.

15. A method of controlling an air conditioner comprising a first heat exchanger configured to exchange heat with outdoor air; a second heat exchanger configured to exchange heat with indoor air; a compressor configured to compress a refrigerant; and a housing provided to accommodate the first heat exchanger, the second heat exchanger and the compressor, the method comprising:
stopping an operation of the compressor;
operating a drainage device to move condensed water collected in the housing to the first heat exchanger during a drainage time determined based on an operation time of the compressor; and
operating a first fan to move air along a flow path passing through the first heat exchanger during the drainage time.

16. The method of claim 15, wherein the operating the drainage device to move condensed water collected in the housing to the first heat exchanger during the drainage time and the operating the first fan to move air during the drainage time includes:
based on the operation time being less than the reference operation time, operating the drainage device to move the condensed water collected in the housing to the first heat exchanger during the reference drainage time, and operating the first fan to move air during the reference drainage time, and
based on the operation time being greater than or equal to the reference operation time, operating the drainage device to move the condensed water collected in the housing to the first heat exchanger during the drainage time increased from the reference drainage time, and operating the first fan to move air during the increased drainage time.

17. The method of claim 15, wherein further comprising:
detecting at least one physical quantity of the temperature of the indoor air, the humidity of the indoor air, and the temperature of the second heat exchanger, using the sensor, and
determining the drainage time based on the operation time and the at least one of the temperature of the indoor air, the humidity of the indoor air, and the temperature of the second heat exchanger.

18. The method of claim 15, wherein further comprising:
detecting a level of condensed water collected in the housing using the water level sensor disposed inside the housing, and
wherein the operating the drainage device to move condensed water collected in the housing to the first heat exchanger during the drainage time includes:
based on the water level of the condensed water collected in the housing being less than the first water level, operating the drainage device to move the condensed water collected in the housing to the first heat exchanger at the first drainage speed, and
based on the water level of the condensed water collected in the housing being greater than or equal to the first water level, operating the drainage device to move the condensed water collected in the housing to the first heat exchanger at the second drainage speed greater than the first drainage speed.

19. The method of claim 15, wherein further comprising:
detecting a level of condensed water collected in the housing using the water level sensor disposed inside the housing,
wherein the operating the first fan to move air along the flow path passing through the first heat exchanger during the drainage time include:
based on the water level of the condensed water collected in the housing being less than the first water level, operating the first fan to rotate at the first fan rotation speed, and
based on the water level of the condensed water collected in the housing being greater than or equal to the first water level, operating the first fan to rotate at the second fan rotation speed greater than the first fan rotation speed.

20. An air conditioner comprising:
a housing including a base;
an outdoor heat exchanger disposed inside the housing and configured to exchange heat with outdoor air;
a compressor configured to compress for the cooling operation;
an outdoor fan disposed inside the housing and configured to move air along a flow path passing through the outdoor heat exchanger;
a drainage device including a drain disposed inside the housing and configured to move water collected in the base to the outdoor heat exchanger; and
a controller including at least one processor, comprising processing circuitry, individually or collectively, configured to control an operation of the compressor, the outdoor fan and the drainage device, and
wherein based on the start of the cooling operation, at least one processor of the controller is configured to control the drainage device to move the water collected in the base to the outdoor heat exchanger,
based on the stop of the cooling operation, at least one processor of the controller is configured to control the drainage device to move the water collected in the base to the outdoor heat exchanger during the drainage time determined based on a period of time in which the cooling operation is performed, and to control the outdoor fan to move air during the drainage time.

* * * * *